(12) United States Patent
Aoki et al.

(10) Patent No.: US 12,164,188 B2
(45) Date of Patent: Dec. 10, 2024

(54) ELECTRONIC DEVICE

(71) Applicant: Japan Display Inc., Tokyo (JP)

(72) Inventors: Yoshiro Aoki, Tokyo (JP); Akio Takimoto, Tokyo (JP); Nobuyuki Suzuki, Tokyo (JP); Yoshiomi Yoshii, Tokyo (JP); Hirondo Nakatogawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 128 days.

(21) Appl. No.: 17/873,310

(22) Filed: Jul. 26, 2022

(65) Prior Publication Data
US 2022/0365389 A1 Nov. 17, 2022

Related U.S. Application Data

(63) Continuation of application No. PCT/JP2020/049264, filed on Dec. 28, 2020.

(30) Foreign Application Priority Data

Jan. 27, 2020 (JP) .................................. 2020-011254

(51) Int. Cl.
*G02F 1/1335* (2006.01)
*F21V 8/00* (2006.01)
(Continued)

(52) U.S. Cl.
CPC .. *G02F 1/133512* (2013.01); *G02F 1/133626* (2021.01); *G02F 1/134309* (2013.01);
(Continued)

(58) Field of Classification Search
CPC . H04M 1/0264; H04N 23/57; G02F 1/133512
See application file for complete search history.

(56) References Cited

U.S. PATENT DOCUMENTS

| 2013/0176512 A1 | 7/2013 | Posner et al. |
| 2015/0271392 A1 | 9/2015 | Musgrave et al. |

(Continued)

FOREIGN PATENT DOCUMENTS

| CN | 108919545 A | 11/2018 |
| CN | 109239997 A | 1/2019 |

(Continued)

OTHER PUBLICATIONS

International Search Report mailed on Mar. 30, 2021 for the corresponding PCT Application No. PCT/JP2020/049264, with English translation.

(Continued)

*Primary Examiner* — Jessica M Merlin
(74) *Attorney, Agent, or Firm* — Michael Best & Friedrich LLP

(57) ABSTRACT

According to one embodiment, an electronic device includes a liquid crystal panel and a camera. The liquid crystal panel includes a display area, an incident light control area, and an emitted light control area. The camera includes a light-entering surface and a light source. The liquid crystal panel is configured to selectively transmit visible light emitted from the light source in the emitted light control area and to selectively transmit visible light from outside in order to cause visible light to enter the camera from the outside in the incident light control area.

13 Claims, 37 Drawing Sheets

(51) Int. Cl.
   *G02F 1/1343*    (2006.01)
   *H04M 1/02*      (2006.01)
   *H04N 23/57*     (2023.01)
(52) U.S. Cl.
   CPC .......... *H04M 1/0264* (2013.01); *H04N 23/57* (2023.01); *G02B 6/0068* (2013.01); *G02F 2203/11* (2013.01)

(56) References Cited

U.S. PATENT DOCUMENTS

| | | | |
|---|---|---|---|
| 2016/0161664 A1 | 6/2016 | Ishida et al. | |
| 2017/0053592 A1 | 2/2017 | Shin et al. | |
| 2018/0191879 A1* | 7/2018 | Evans, V | H04N 23/51 |
| 2018/0314096 A1 | 11/2018 | Yang et al. | |
| 2019/0266376 A1 | 8/2019 | He et al. | |
| 2019/0285850 A1 | 9/2019 | Tan et al. | |
| 2020/0127066 A1 | 4/2020 | Zhang et al. | |
| 2021/0072594 A1* | 3/2021 | Zhang | G02F 1/133603 |
| 2022/0026771 A1* | 1/2022 | Yan | G02B 6/0088 |

FOREIGN PATENT DOCUMENTS

| | | |
|---|---|---|
| JP | H09-80581 A | 3/1997 |
| JP | 2006-071955 A | 3/2006 |

OTHER PUBLICATIONS

English translation of the Chinese Office Action dated Sep. 1, 2023, for the corresponding Chinese Patent Application No. 202080093393.9.

* cited by examiner

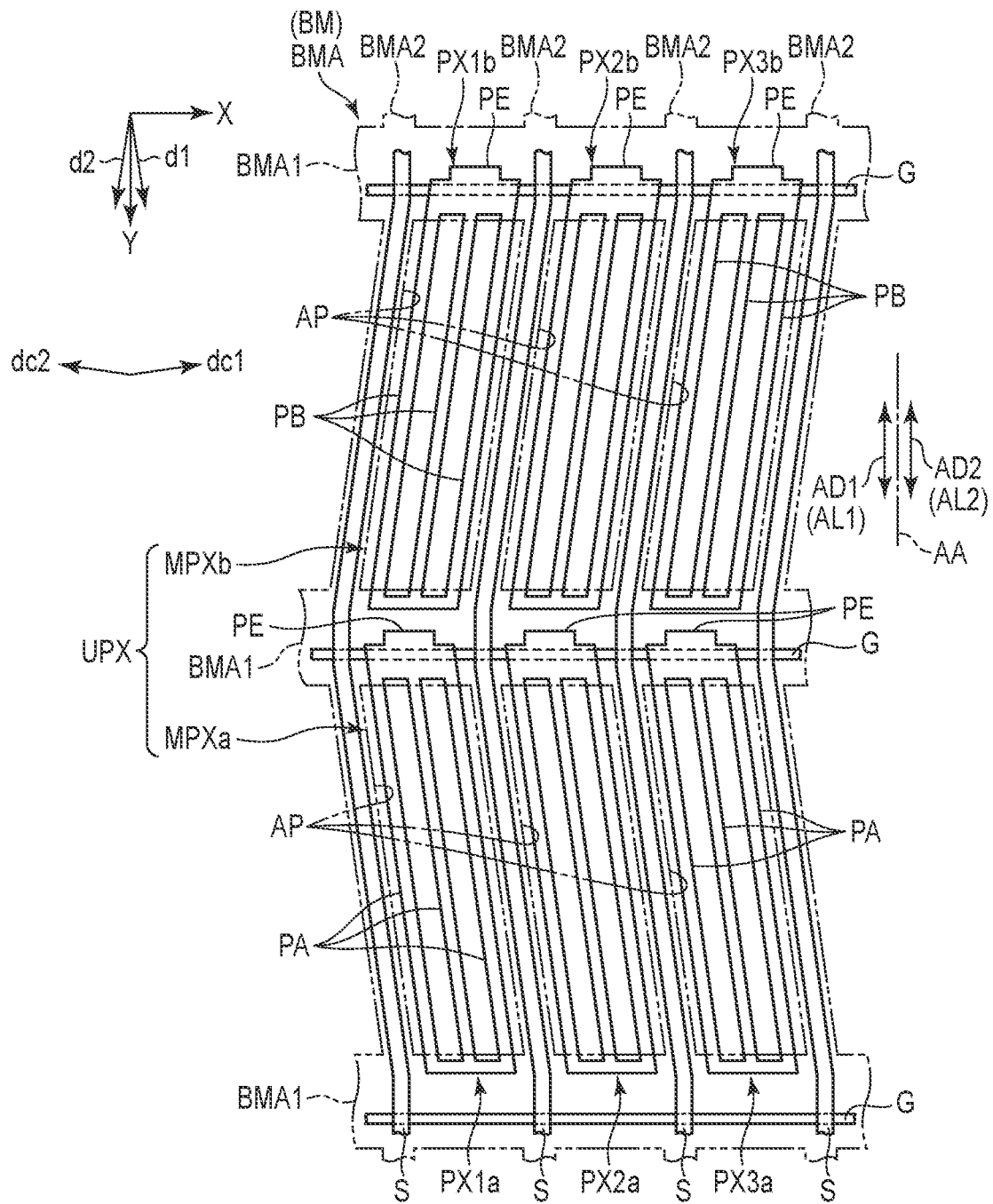
F I G. 5

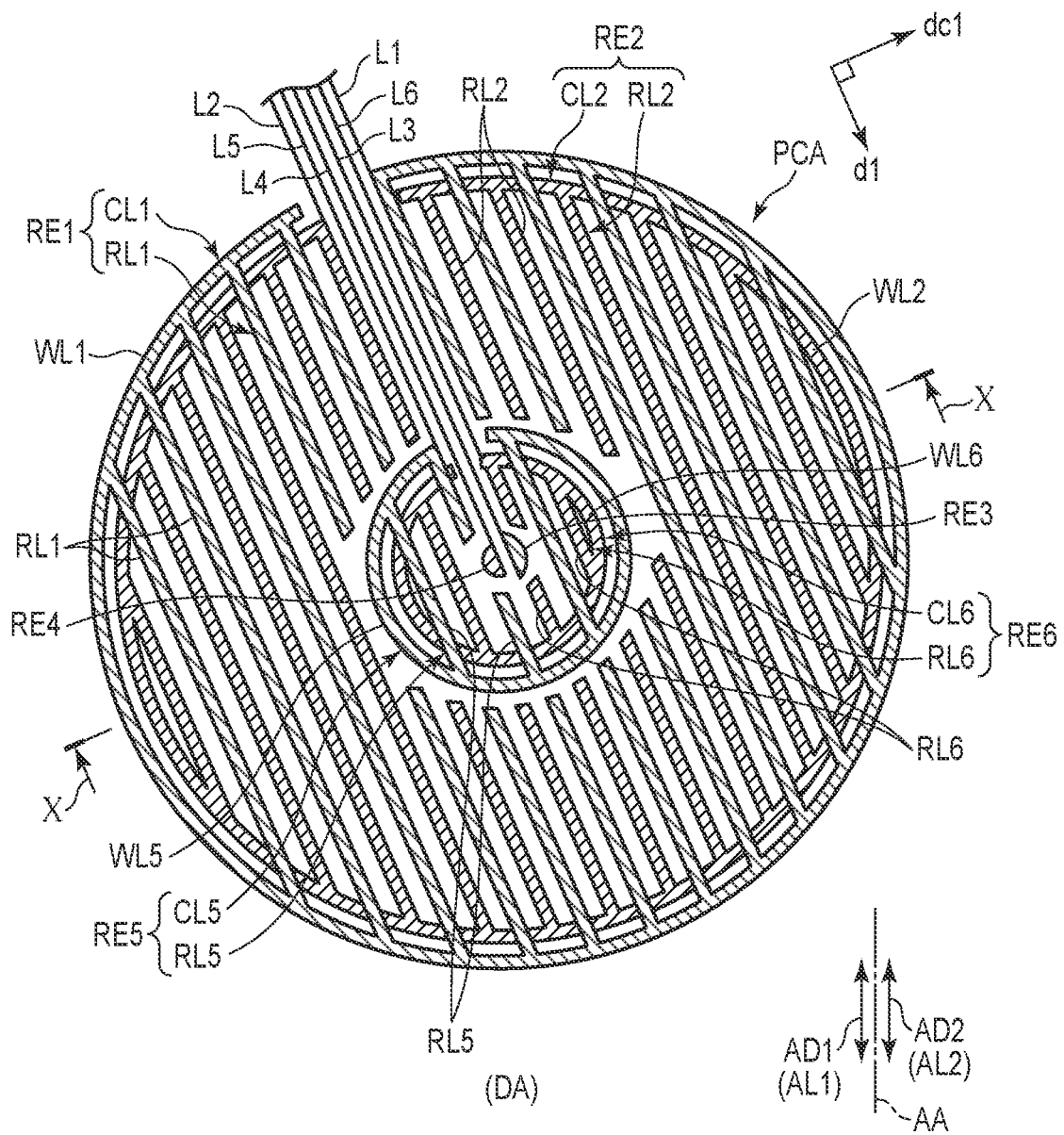
F I G. 9

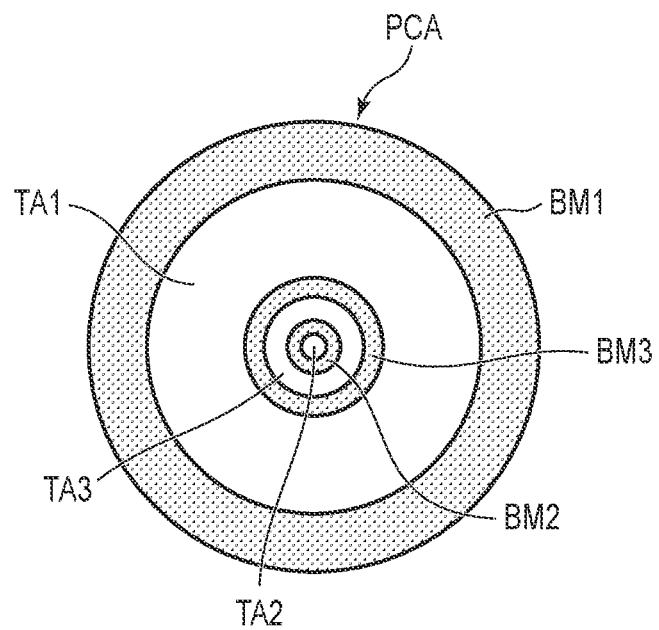
F I G. 11
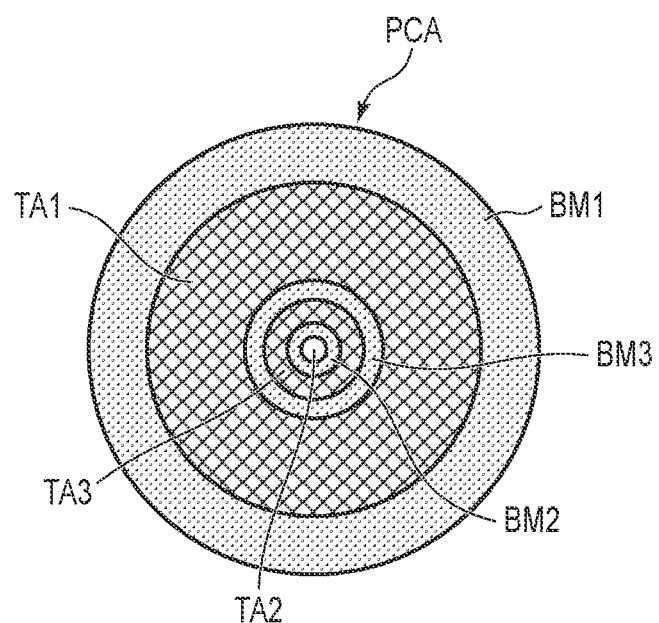
F I G. 12

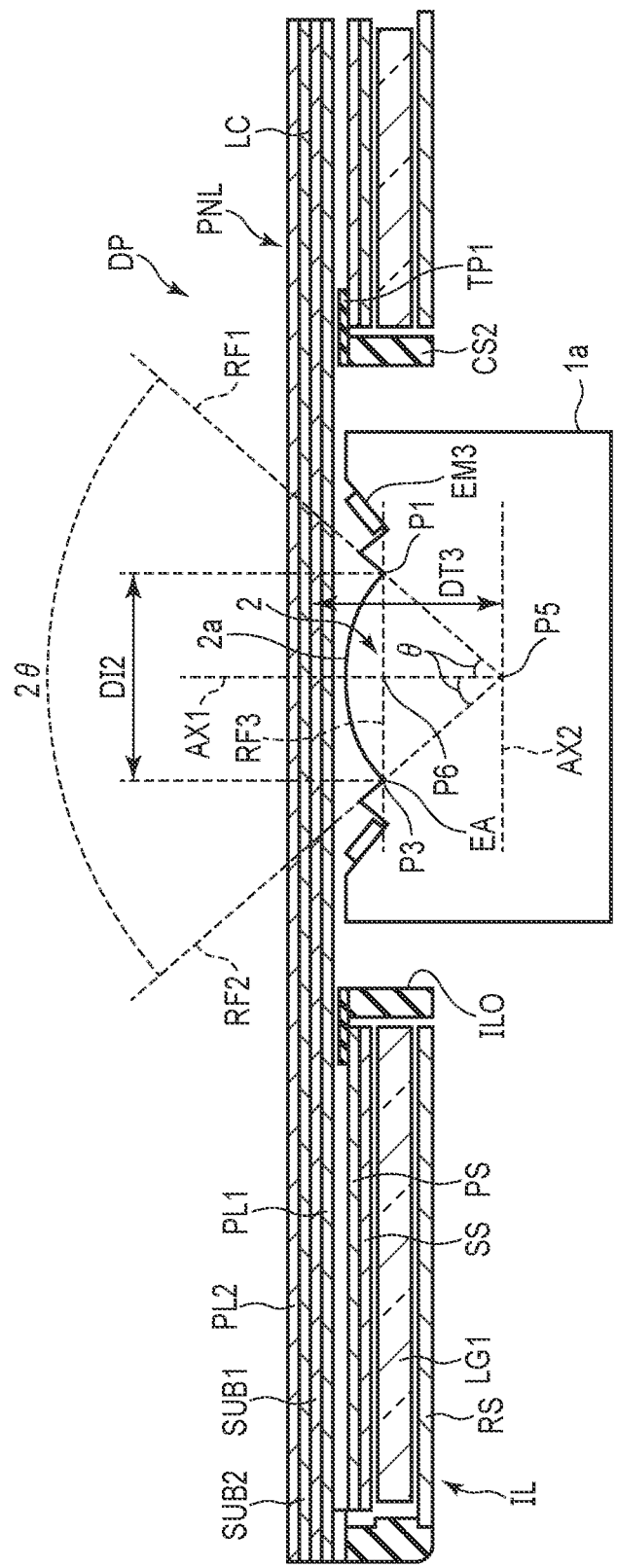
F I G. 20

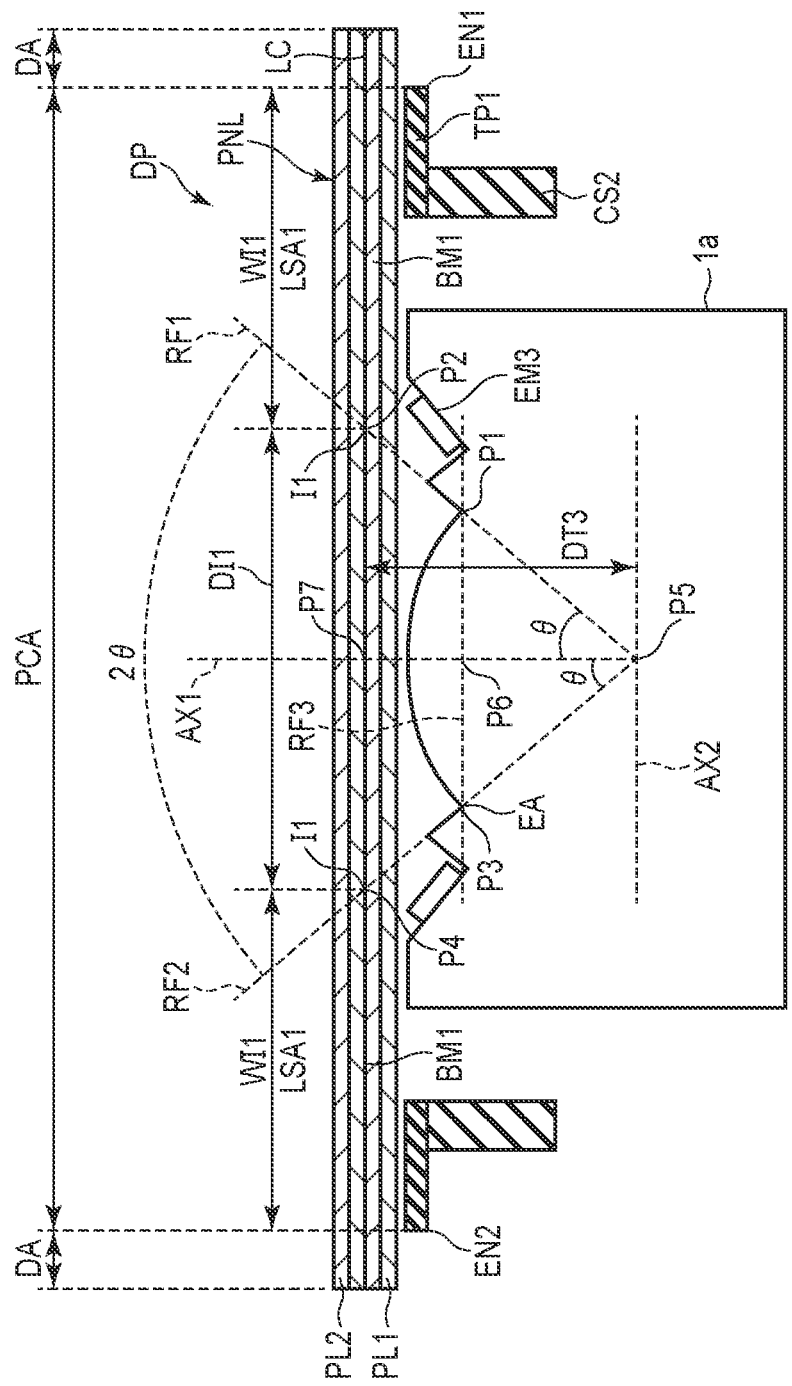
F I G. 21

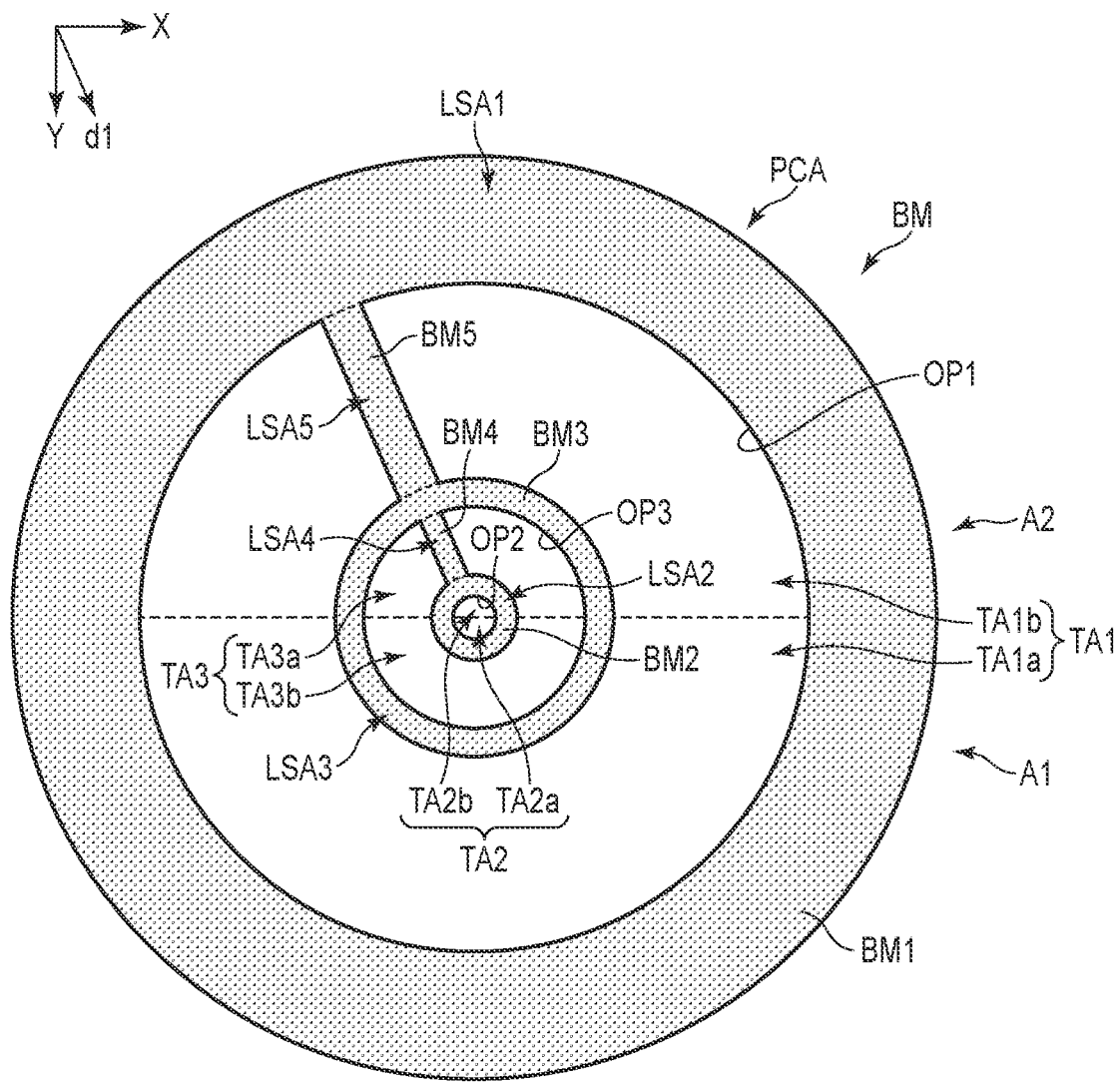
F I G. 31

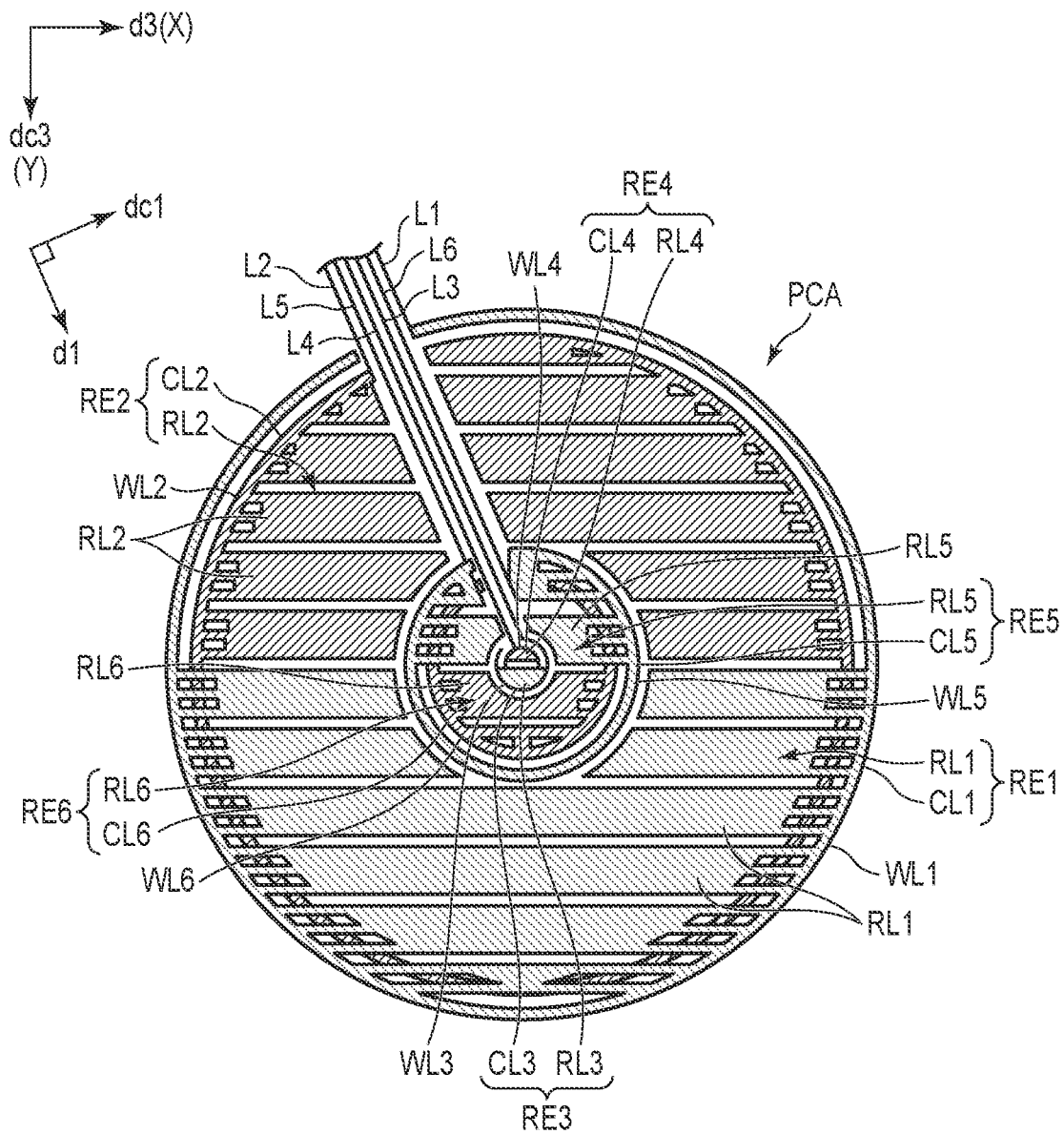
F I G. 32

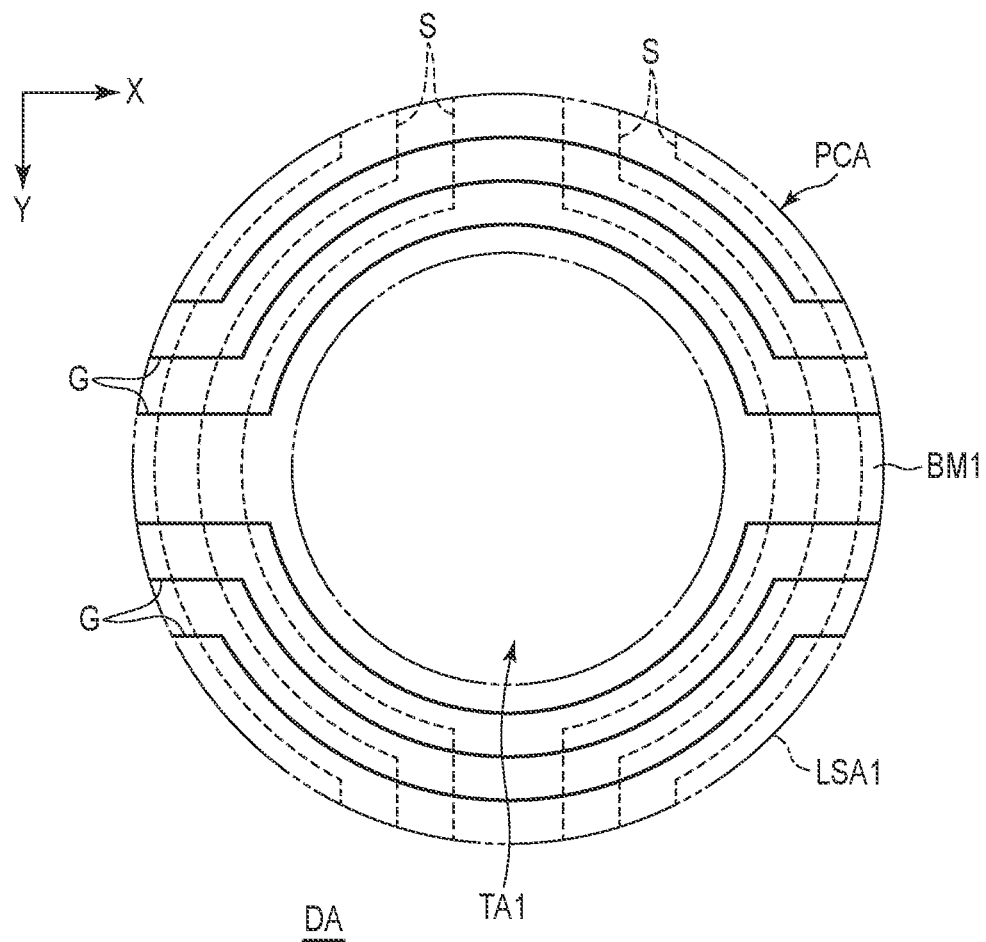
F I G. 45

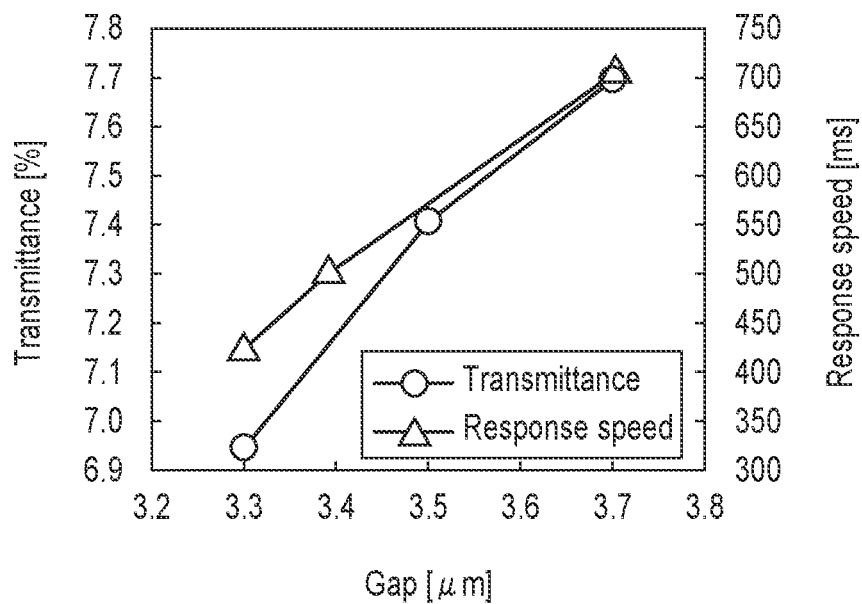
F I G. 46
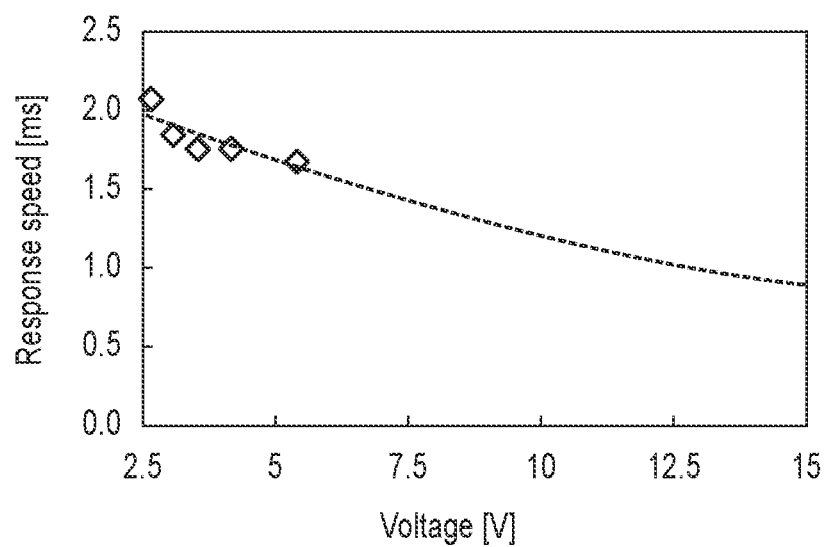
F I G. 47

ELECTRONIC DEVICE

CROSS-REFERENCE TO RELATED APPLICATIONS

This application is a Continuation application of PCT Application No. PCT/JP2020/049264, filed Dec. 28, 2020 and based upon and claiming the benefit of priority from Japanese Patent Application No. 2020-011254, filed Jan. 27, 2020, the entire contents of all of which are incorporated herein by reference.

FIELD

Embodiments described herein relate generally to an electronic device.

BACKGROUND

In recent years, electronic devices such as a smartphone including a display unit and a light-receiving unit on the same surface side have widely been put into practical use. The electronic devices each include a liquid crystal panel and a camera positioned outside the liquid crystal panel. The electronic devices are desired to capture clear images.

BRIEF DESCRIPTION OF THE DRAWINGS

FIG. 5 is a plan view showing one unit pixel of the liquid crystal panel and also showing scanning lines, signal lines, pixel electrodes and a light-shielding portion.

FIG. 9 is a plan view showing a plurality of control electrode structures and a plurality of lead lines of the liquid crystal panel.

FIG. 11 is a plan view showing an incident light control area when the liquid crystal panel is driven under a first condition.

FIG. 12 is a plan view showing an incident light control area when the liquid crystal panel is driven under a second condition.

FIG. 20 is a sectional view showing part of the liquid crystal panel, part of an illumination device and the camera according to the second embodiment.

FIG. 21 is another sectional view showing part of the liquid crystal panel, part of an illumination device and the camera according to the second embodiment.

FIG. 31 is a plan view showing a light-shielding layer in the incident light control area of the liquid crystal panel according to the third embodiment.

FIG. 32 is a plan view showing a plurality of control electrode structures and a plurality of lead lines of a first substrate according to the third embodiment.

FIG. 45 is a plan view showing scanning lines and signal lines in an incident light control area of the liquid crystal panel of the electronic device according to a seventh embodiment.

FIG. 46 is a graph showing a change in transmittance of light to a gap of a liquid crystal layer and a change in response speed of liquid crystal to the gap in the liquid crystal panel of the electronic device according to a eighth embodiment.

FIG. 47 is a graph showing variations in response speed of liquid crystal with respect to a voltage applied to the liquid crystal layer in the eighth embodiment.

DETAILED DESCRIPTION

Figure 1:
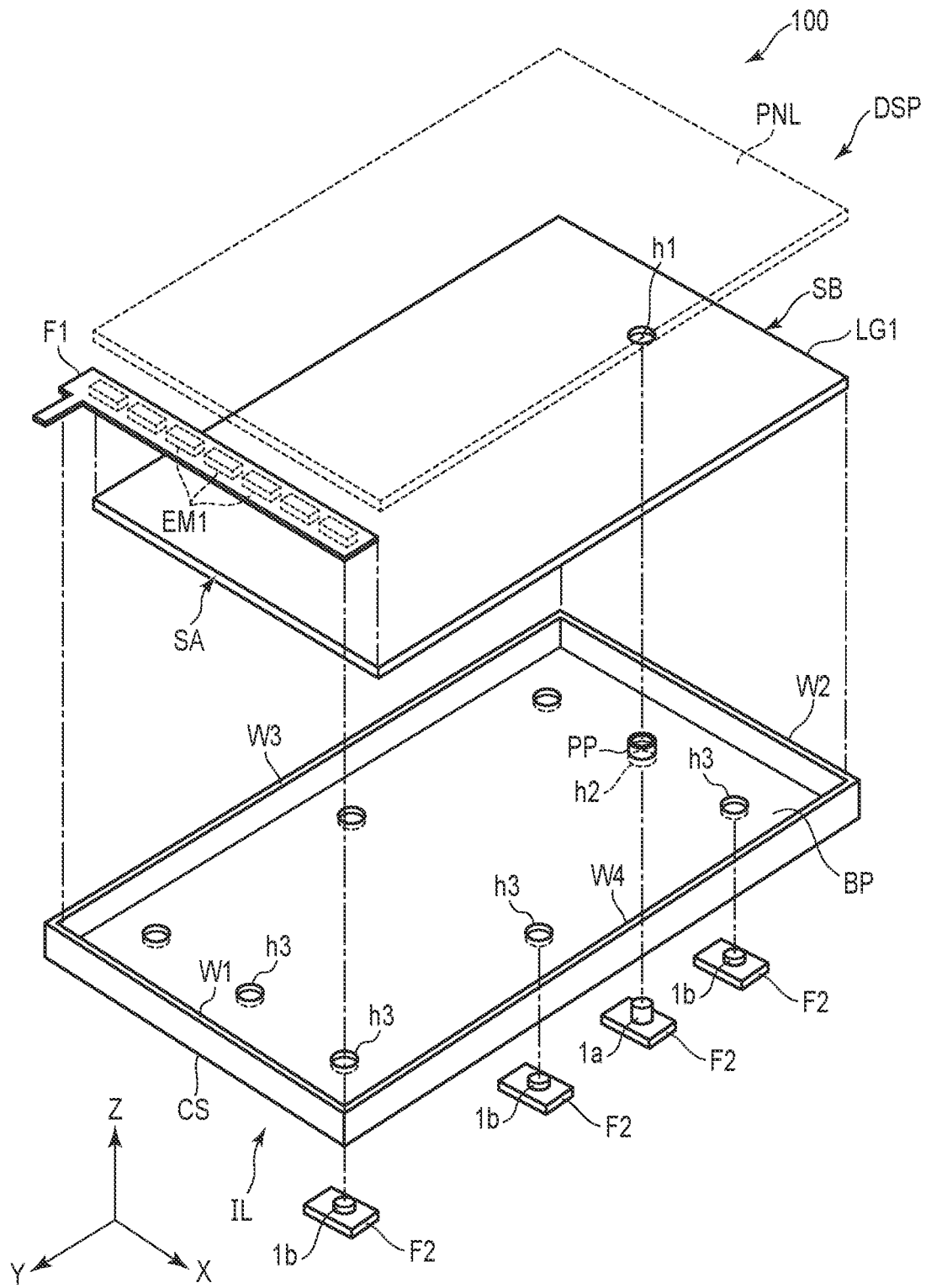
FIG. 1 is an exploded perspective view showing an example of a configuration of an electronic device according to a first embodiment.

In general, according to one embodiment, there is provided an electronic device comprising: a liquid crystal panel including a display area, an incident light control area including an outer periphery that is in contact with the display area, and an emitted light control area; and a camera including a light-entering surface overlapping the incident light control area and a light source overlapping the emitted light control area. The liquid crystal panel is configured to selectively transmit visible light emitted from the light source in the emitted light control area and to selectively transmit visible light from outside in order to cause visible light to enter the camera from the outside in the incident light control area.

According to another embodiment, there is provided an electronic device comprising: a liquid crystal panel including a first substrate, a second substrate, a liquid crystal layer held between the first substrate and the second substrate, a display area, an incident light control area including an outer periphery that is in contact with the display area, and an emitted light control area; and a camera including an light-entering surface overlapping the incident light control area and a light source overlapping the emitted light control area. The display area, the incident light control area, and the emitted light control area each overlap the first substrate, the second substrate and the liquid crystal layer. The liquid crystal panel is configured to selectively transmit visible light from the light source in the emitted light control area and to selectively transmit visible light from outside in order to cause visible light to enter the camera from the outside in the incident light control area.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

First, a first embodiment will be described. FIG. 1 is an exploded perspective view showing an example of a configuration of an electronic device 100 according to the first embodiment.

As shown in FIG. 1, directions X, Y and Z are orthogonal to each other, but may intersect at an angle other than 90°.

The electronic device 100 includes a liquid crystal display device DSP as a display device, and a camera 1. The liquid crystal display device DSP includes a liquid crystal panel PNL as a display panel, and an illumination device (backlight) IL. The camera 1 includes a camera (camera unit) 1a as a first camera and one or more cameras (camera units) 1b as one or more second cameras. Although not all of the cameras 1b are shown in the present embodiment, the electronic device 100 includes seven cameras 1b.

Note that the camera 1 may include only the camera 1a. Alternatively, the camera 1 may include only the cameras 1b.

The illumination device IL includes a light guide LG1, light sources EM1 and a casing CS. This illuminating device IL illuminates the liquid crystal panel PNL shown simply by dashed lines in FIG. 1, for example.

The light guide LG1 is formed in the shape of a flat plate parallel to the X-Y plane defined by the directions X and Y. The light guide LG1 is opposed to the liquid crystal panel PNL. The light guide LG1 has a side surface SA, a side surface SB that is the opposite side of the side surface SA, and a through hole h1 surrounding the camera 1a. The light guide LG1 is opposed to the cameras 1b. The side surfaces SA and SB extend in the direction X. For example, the side surfaces SA and SB are planes parallel to the X-Z plane defined by the directions X and Z. The through hole h1 penetrates the light guide LG1 in the direction Z. The through hole h1 is located between the side surfaces SA and SB in the direction Y, and is closer to the side surface SB than the side surface SA.

The light sources EM1 are arranged at intervals in the direction X. Each of the light sources EM1 is mounted on a wiring substrate F1 and electrically connected to the wiring substrate F1. The light sources EM1 are, for example, light-emitting diodes (LEDs) and emit white illumination light. The illumination light emitted from the light sources EM1 enters the light guide LG1 from the side surface SA, and travels inside the light guide LG1 from the side surface SA toward the side surface SB.

The light guide LG1 and the light sources EM1 are accommodated in the casing CS. The casing CS has side walls W1 to W4, a bottom plate BP, a through hole h2, a protruding portion PP and one or more through holes h3. The side walls W1 and W2 extend in the direction X and are opposed in the direction Y. The side walls W3 and W4 extend in the direction Y and are opposed in the direction X. The through hole h2 overlaps the through hole h1 in the direction Z. The protruding portion PP is fixed to the bottom plate BP. The protruding portion PP protrudes from the bottom plate BP toward the liquid crystal panel PNL along the direction Z and surrounds the through hole h2.

In the present embodiment, the casing CS has seven through holes h3 the number of which is the same as the number of cameras 1b. The through holes h3 penetrates the bottom plate BP in the direction Z. In planar view, the through holes h3 are dispersed together with the through hole h2. When the bottom plate BP is formed of a material that transmits infrared light, the through holes h3 need not be formed in the bottom plate BP. From the viewpoint of reducing the thickness of the electronic device 100 in the direction Z, it is preferable that the through holes h3 be formed in the bottom plate BP and the through holes h3 surround the cameras 1b.

The light guide LG1 overlaps the liquid crystal panel PNL.

The cameras 1a and 1b are mounted on the wiring substrate F2 and electrically connected to the wiring substrate F2. The camera 1a is opposed to the liquid crystal panel PNL through the through hole h2, the inside of the protruding portion PP and the through hole h1. The cameras 1b are opposed to the light guide LG1 through the through holes h3.

Figure 2:
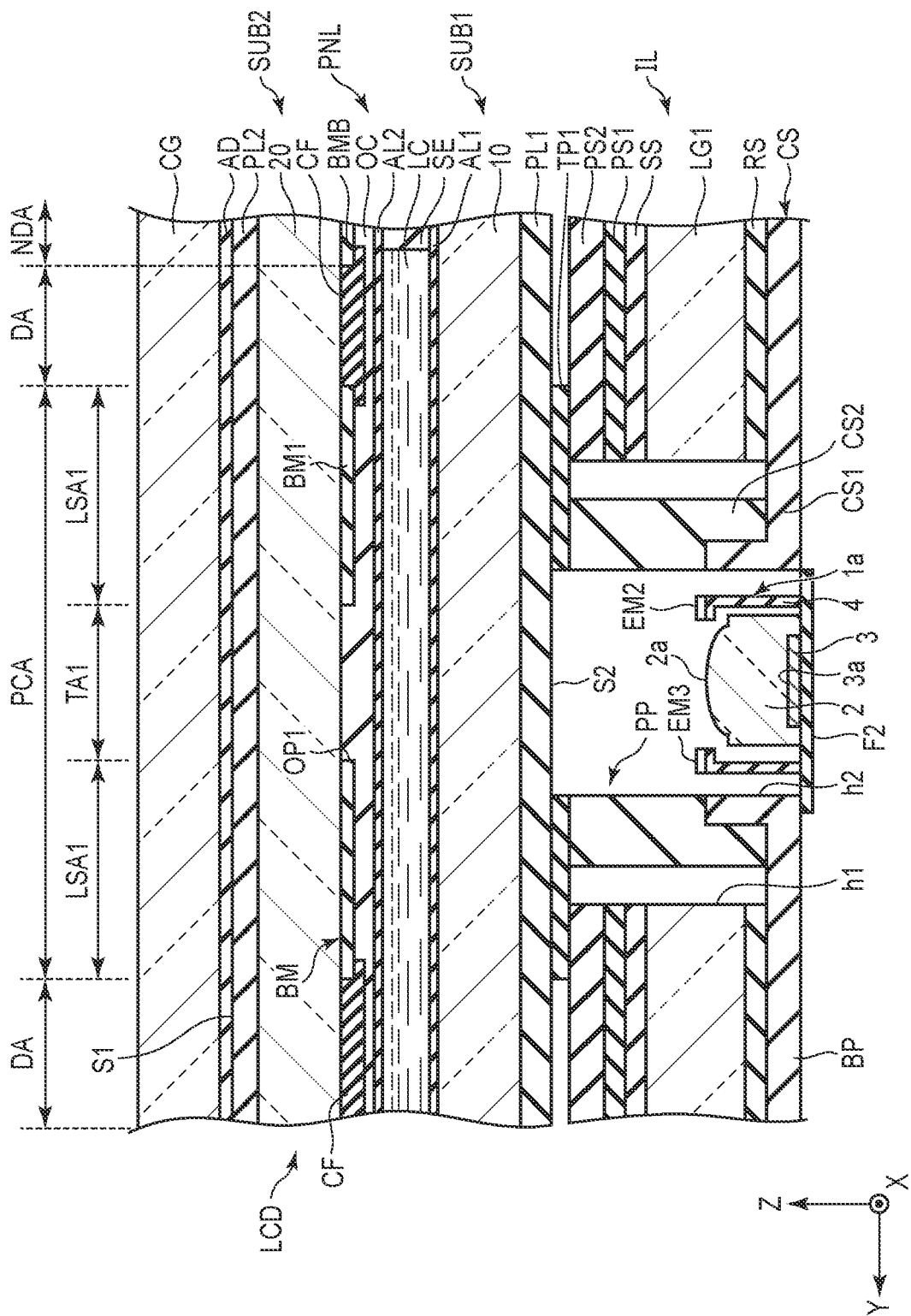
FIG. 2 is a sectional view showing the periphery of a camera of the electronic device.

FIG. 2 is a sectional view showing the periphery of the camera 1a of the electronic device 100.

As shown in FIG. 2, the illumination device IL further includes a light reflection sheet RS, a light diffusion sheet SS and prism sheets PS1 and PS2.

The light reflection sheet RS, light guide LG1, light diffusion sheet SS, prism sheet PS1 and prism sheet PS2 are arranged in this order in the direction Z and are accommodated in the casing CS. The casing CS includes a metal casing CS1 and a resin light-shielding wall CS2 as a peripheral member. The light-shielding wall CS2 is adjacent to the camera 1 and forms the protruding portion PP together with the casing CS1. The light-shielding wall CS2 is located between the camera 1 and the light guide LG1 and formed in a cylindrical shape. The light-shielding wall CS2 is formed of a light-absorbing resin such as a black resin. The light diffusion sheet SS, prism sheet PS1 and prism sheet PS2 each have a through hole that overlaps the through hole h1. The protruding portion PP is located inside the through hole h1.

The liquid crystal panel PNL further includes polarizers PL1 and PL2. The liquid crystal panel PNL and a cover glass CG as a cover member are arranged in the direction Z to constitute a liquid crystal element LCD having an optical switch function for light traveling in the direction Z. The liquid crystal element LCD is stuck to the illumination device IL by an adhesive tape TP1. The adhesive tape TP1 is adhered to the protruding portion PP, prism sheet PS2 and polarizer PL1.

The liquid crystal panel PNL may have any configuration corresponding to a display mode using a lateral electric field along a main surface of the substrate, a display mode using a longitudinal electric field along the normal of the main surface, a display mode using an inclined electric field which is tilted obliquely with respect to the main surface, and a display mode using the lateral electric field, longitudinal electric field and inclined electric field in an appropriate combination. The main surface is a plane parallel to the X-Y plane.

The liquid crystal panel PNL includes a display area DA for displaying an image, a non-display area NDA outside the display area DA and an incident light control area PCA surrounded by the display area DA and having a circular shape. The liquid crystal panel PNL includes a first substrate SUB1, a second substrate SUB2, a liquid crystal layer LC and a sealing member SE. The sealing member SE is located in the non-display area NDA to join the first and second substrates SUB1 and SUB2 together. The liquid crystal layer LC is located in the display area DA and the incident light control area PCA and held between the first and second substrates SUB1 and SUB2. The liquid crystal layer LC is formed in a space surrounded by the the first and second substrates SUB1 and SUB2 and the sealing member SE.

The liquid crystal panel PNL controls the transmission amount of light emitted from the illumination device IL to display an image in the display area DA. The user of the electronic device 100 is located in the direction Z side of the cover glass CG (on the upper side of the figure) and views the light emitted from the liquid crystal panel PNL as an image.

On the other hand, the liquid crystal panel PNL also controls the transmission amount of light in the incident light control area PCA, but the light enters the camera 1 from the direction Z side of the cover glass CG through the liquid crystal panel PNL.

In the present specification, the light traveling from the illumination device IL toward the cover glass CG side through the liquid crystal panel PNL is referred to as emitted light, and the light traveling from the cover glass CG side toward the camera 1 through the liquid crystal panel PNL is referred to as incident light.

The main part of each of the first and second substrates SUB1 and SUB2 will be described below.

The first substrate SUB1 includes an insulating substrate 10 and an alignment film AL1. The second substrate SUB2 includes an insulating substrate 20, a color filter CF, a light-shielding layer BM, a transparent layer OC and an alignment film AL2.

The insulating substrates 10 and 20 are transparent substrates such as glass substrates and flexible resin substrates. The alignment films AL1 and AL2 are in contact with the liquid crystal layer LC.

The color filter CF, light-shielding layer BM and transparent layer OC are located between the insulating substrate 20 and the liquid crystal layer LC. In the illustrated example, the color filter CF is provided on the second substrate SUB2, but may be provided on the first substrate SUB1. The color filter CF is located in the display area DA.

The incident light control area PCA includes at least a first light-shielding area LSA1 located on the outermost periphery and having an annular shape, and a first incident light control area TA1 surrounded by the first light-shielding area LSA1 and being in contact with the first light-shielding area LSA1.

The light-shielding layer BM includes a light-shielding portion located in the display area DA to partition a pixel and a frame-shaped light-shielding portion BMB located in the non-display area NDA. In the incident light control area PCA, the light-shielding layer BM includes at least a first light-shielding portion BM1 located in the first light-shielding area LSA1 and having an annular shape, and a first opening OP1 located in the first incident light control area TA1.

The boundary between the display area DA and the non-display area NDA is defined, for example, by an inner end of the light-shielding portion BMB (an end portion thereof alongside the display area DA). The sealing member SE overlaps the light-shielding portion BMB.

The transparent layer OC is in contact with the color filter CF in the display area DA, in contact with the light-shielding portion BMB in the non-display area NDA, in contact with the first light-shielding portion BM1 in the first light-shielding area LSA1, and in contact with the insulating substrate 20 in the first incident light control area TA1. The alignment films AL1 and AL2 are provided over the display area DA, incident light control area PCA and non-display area NDA.

The color filter CF will not be described in detail. The color filter CF includes, for example, a red colored layer placed on red pixels, a green colored layer placed on green pixels, and a blue colored layer placed on blue pixels. The color filter CF may also include a transparent resin layer placed on white pixels. The transparent layer OC covers the color filter CF and the light-shielding layer BM. The transparent layer OC is, for example, a transparent organic insulating layer.

The camera 1 is located inside the through hole h2 of the casing CS. The camera 1 overlaps the cover glass CG and the liquid crystal panel PNL in the direction Z. Note that the liquid crystal panel PNL may further include an optical sheet other than the polarizers PL1 and PL2 in the incident light control area PCA. As the optical sheet, there are a retardation film, a light scattering layer, an anti-reflective layer and the like. In the electronic device 100 including the liquid crystal panel PNL, camera 1a and the like, the camera 1a is provided on the back side of the liquid crystal panel PNL when viewing from a user of the electronic device 100.

The camera 1a includes, for example, an optical system 2 including at least one lens, an imaging device (image sensor) 3 and a casing 4. The imaging device 3 includes an imaging surface 3a facing the liquid crystal panel PNL side. The optical system 2 has a light-entering surface 2a that is located between the imaging surface 3a and the liquid crystal panel PNL and faces the liquid crystal panel PNL side. The light-entering surface 2a overlaps the incident light control area PCA. The optical system 2 is spaced apart from the liquid crystal panel PNL. The casing 4 accommodates the optical system 2 and the imaging device 3.

A light source EM2 serving as a first light source and a light source EM3 serving as a second light source are arranged on an upper part of the casing 4. The light source EM2 is configured to emit infrared light toward the liquid crystal panel PNL side. The light source EM3 is configured to emit visible light toward the liquid crystal panel PNL side. The light sources EM2 and EM3 are provided for the purpose of illuminating an object to be imaged by the camera 1a.

The imaging device 3 of the camera 1a receives light through the cover glass CG, the liquid crystal panel PNL and the optical system 2. For example, the camera 1a receives visible light (for example, light in the wavelength range of 400 nm to 700 nm) which is transmitted through the cover glass CG and the liquid crystal panel PNL. In addition, infrared light (for example, light in the wavelength range of 800 nm to 1500 nm) can be received simultaneously with visible light.

Note that the cameras 1b differ from the camera 1a in that they do not include the light source EM3. The camera 1b is opposed to the light reflection sheet RS through the through hole h3 (FIG. 1). The camera 1b can receive infrared light through the cover glass CG, liquid crystal panel PNL, prism sheets PS2 and PS1, light diffusion sheet SS, light guide LG1, light reflection sheet RS and optical system 2. The light reflection sheet RS has a hole that is located to coincide with the IR sensor. If, however, the light reflection sheet is a thin film that can transmit IR, the light reflection sheet need not have any hole, and the IR sensor may receive the infrared light transmitted through the light reflection sheet. In this case, bad influences on the visibility of images can be reduced. In addition, the camera 1b can be accommodated in the through hole h1 of the light guide LG1 and the through hole h2 of the bottom plate BP in the same manner as the camera 1a.

The polarizer PL1 is bonded to the insulating substrate 10. The polarizer PL2 is bonded to the insulating substrate 20. The cover glass CG is stuck to the polarizer PL2 by a transparent adhesive layer AD.

In order to prevent the liquid crystal layer LC from being affected by an electric field or the like from the outside, a transparent conductive layer may be provided between the polarizer PL2 and the insulating substrate 20. The transparent conductive layer is formed of a transparent conductive material such as indium tin oxide (ITO) and indium zinc oxide (IZO).

The polarizer PL1 or PL2 may also include an ultra-birefringent film. The ultra-birefringent films are known to depolarize (naturalize) transmitted light when linearly polarized light enters the films and thus allow a subject to be captured without a sense of discomfort even if the subject includes something that emits polarized light. When, for example, the electronic device 100 is reflected on a subject of the camera 1a, the electronic device 100 emits linearly polarized light. Thus, the brightness of the electronic device 100 of the subject incident on the camera 1a changes in relation to the angles of the polarizers PL1 and PL2 and the polarizer of the electronic device 100, which incurs a risk of causing a sense of discomfort at the time of imaging. If, however, each of the polarizers PL1 and PL2 includes the ultra-birefringent film, it is possible to suppress a change in brightness which causes a sense of discomfort.

As a film exhibiting the ultra-birefringence, for example, Cosmoshine (registered trademark) of Toyobo Co., Ltd., is suitably used. The term "ultra-birefringence" refers to a material whose retardation in the in-plane direction to light in the visible range, for example, 500 nm, is 800 nm or more.

The liquid crystal panel PNL has a first surface S1 on which an image is displayed and a second surface S2 that is the opposite side of the first surface S1. In the present embodiment, the polarizer PL2 has the first surface S1 and the polarizer PL1 has the second surface S2.

The light sources EM2 and EM3 are located on the second surface S2 side of the liquid crystal panel PNL.

The display area DA and incident light control area PCA, and an emitted light control area ICA to be described later, are areas overlapping the first substrate SUB1, the second substrate SUB2 and the liquid crystal layer LC, respectively.

Figure 3:
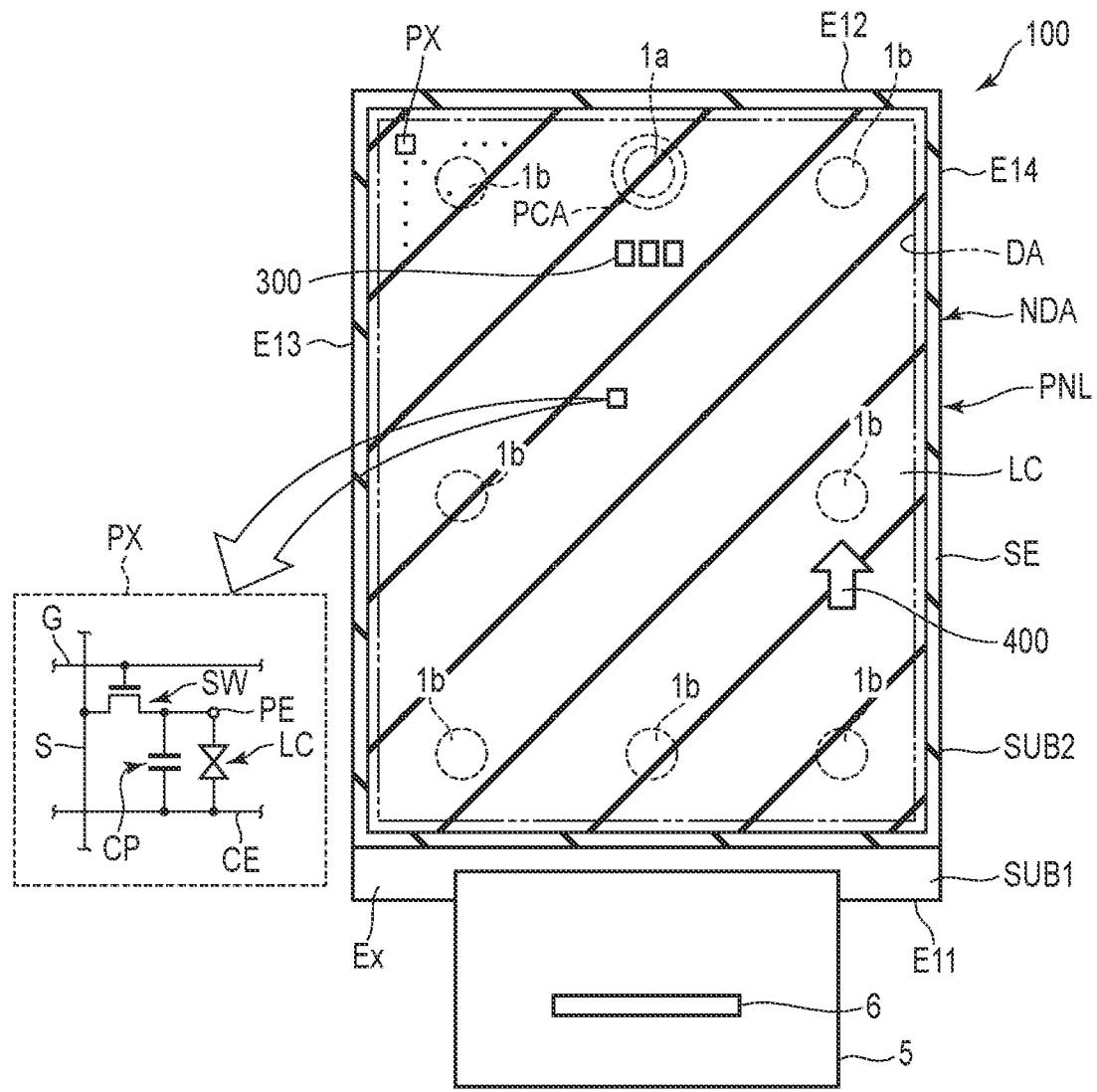
FIG. 3 is a plan view showing the arrangement of a liquid crystal panel and a plurality of cameras shown in FIG. 2 and the like, and also showing an equivalent circuit of one pixel.

FIG. 3 is a plan view showing the arrangement of the liquid crystal panel PNL and the cameras 1a and 1b shown in FIG. 2 and the like, and also showing an equivalent circuit of one pixel PX. In FIG. 3, the liquid crystal layer LC and the sealing member SE are shown with different diagonal lines.

As shown in FIG. 3, the display area DA is substantially a quadrangular area, but its four corners may be rounded. The display area DA may be a polygon other than a quadrangle or a circle. The display area DA is surrounded by the sealing member SE.

The liquid crystal panel PNL has a pair of short sides E11 and E12 extending in the direction X and a pair of long sides E13 and E14 extending in the direction Y. The liquid crystal panel PNL includes a plurality of pixels PX arranged in a matrix in the directions X and Y in the display area DA. The pixels PX in the display area DA have the same circuit configuration. As shown in an enlarged view in FIG. 3, each of the pixels PX includes a switching element SW, a pixel electrode PE, a common electrode CE, a liquid crystal layer LC, and the like.

The switching element SW is configured by, for example, a thin-film transistor (TFT). The switching element SW is electrically connected to its corresponding one of a plurality of scanning lines G, its corresponding one of a plurality of signal lines S, and a pixel electrode PE. The scanning line G is supplied with a control signal to control the switching elements SW. The signal line S is supplied with an image signal such as a video signal as a signal different from the control signal. A common voltage is applied to the common electrode CE. The liquid crystal layer LC is driven by a voltage (electric field) generated between the pixel electrode PE and the common electrode CE. A capacitor CP is formed, for example, between an electrode having the same potential as the common electrode CE and an electrode having the same potential as the pixel electrode PE.

The electronic device 100 further includes a wiring substrate 5 and an IC chip 6.

The wiring substrate 5 is mounted on an extended portion Ex of the first substrate SUB1 and coupled to the extended portion Ex. The IC chip 6 is mounted on the wiring substrate 5 and electrically connected to the wiring substrate 5. Note that the IC chip 6 may be mounted on the extended portion Ex and electrically connected to the extended portion Ex. The IC chip 6 incorporates, for example, a display driver that outputs a signal necessary for image display. The wiring substrate 5 may be a bendable flexible printed circuit.

In FIG. 3, the electronic device 100 includes eight cameras 1 in its display area DA. The incident light control area PCA is formed to overlap the camera 1a of the eight cameras which is located in the upper central part of the figure. Note that the incident light control area PCA includes an outer periphery that is in contact with the display area DA. Normal pixels PX overlap the other cameras 1b to perform normal display.

Since the polarizers PL1 and PL2 have high transmittance in the wavelength region of infrared light and transmit infrared light, the cameras 1a and 1b can receive the infrared light even though the pixels PX and the cameras 1a and 1b overlap. Since normal display is performed with the pixels PX overlapping the cameras 1b, the user can use the electronic device 100 without being conscious of the positions of the cameras 1b. Since, furthermore, the area of the display area DA is not reduced, a large number of cameras 1b can be arranged. The user is made unconscious that a large number of cameras 1b are arranged. In particular, when the electronic device 100 is used in an automatic teller machine (ATM) or the like, the users can be made more unconscious that there are a large number of cameras 1b by arranging the cameras 1b in portions fixed to black display.

Reference numeral 300 denotes an indicator that can intuitively notify the user of the status of the cameras 1a and 1b. For example, the indicator 300 can notify the user of his or her optimum finger position in the case of fingerprint authentication or the like. Arrow 400 is a mark displayed when the user is intentionally notified of the position of the camera 1b. As a figure to be displayed, not only the arrow 400 but also an appropriate shape such as a circle surrounding the periphery of the camera 1b can be selected.

Figure 4:
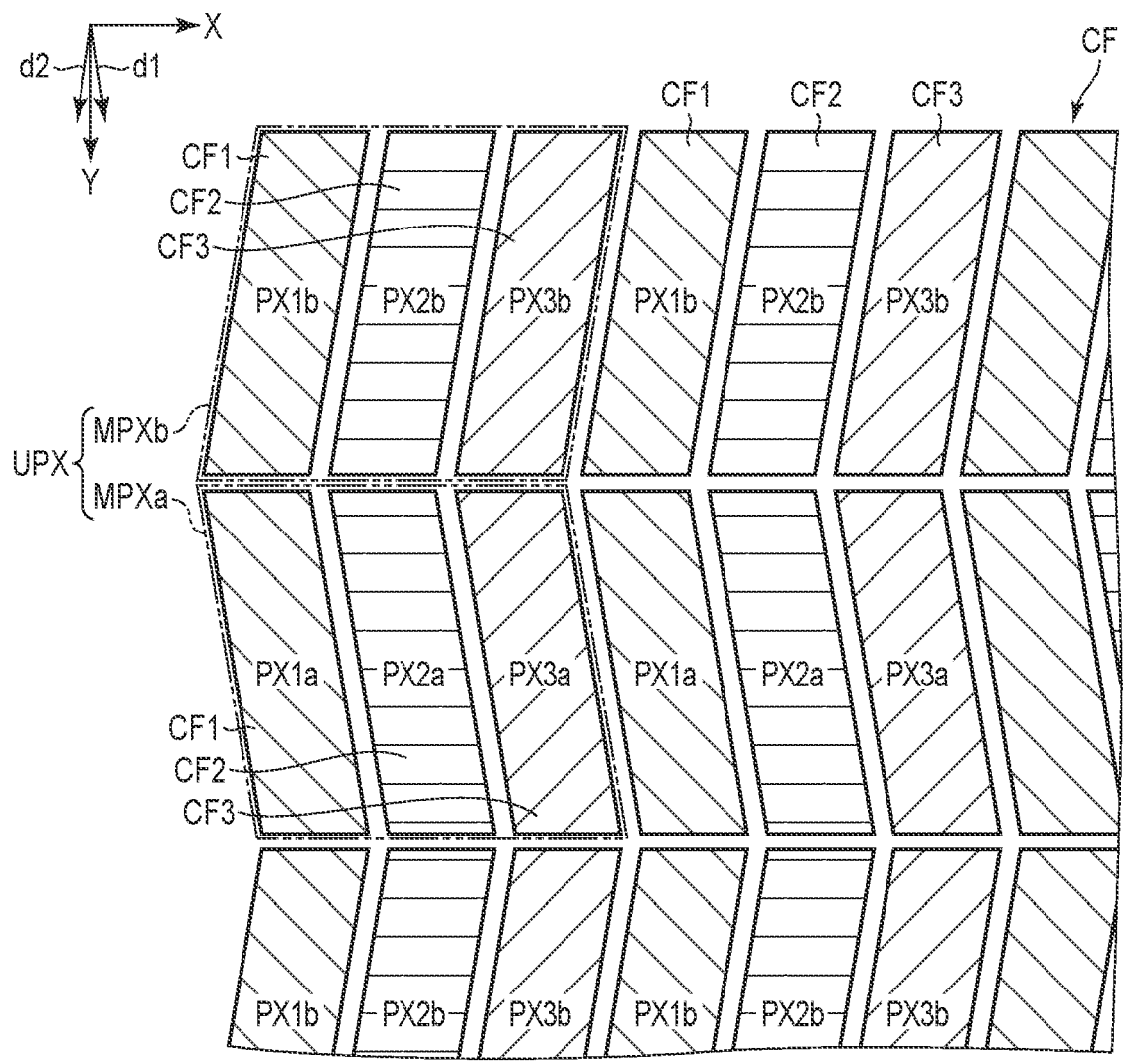
FIG. 4 is a plan view showing an arrangement of pixels in the liquid crystal panel.

FIG. 4 is a plan view showing the arrangement of the pixels PX in the liquid crystal panel PNL.

As shown in FIG. 4, each of main pixels MPX includes a plurality of pixels PX. The main pixels MPX are classified into two types of main pixels MPXa and MPXb. Two main pixels MPXa and MPXb adjacent to each other in the direction Y constitute a unit pixel UPX. Each of the main pixels MPXa and MPXb corresponds to the minimum unit for displaying a color image. The main pixel MPXa includes pixels PX1a, PX2a and PX3a. The main pixel MPXb includes pixels PX1b, PX2b and PX3b. In addition, the shape of each of the pixels PX is a substantially parallelogram as shown.

The main pixels MPXa and MPXb each include pixels PX of a plurality of colors, which are arranged in the direction X. The pixels PX1a and PX1b are pixels of a first color and include a colored layer CF1 of the first color. The pixels PX2a and PX2b are pixels of a second color other than the first color and include a colored layer CF2 of the second color. The pixels PX3a and PX3b are pixels of a third color other than the first and second colors and include a colored layer CF3 of the third color.

The main pixels MPXa and MPXb are repeatedly arranged in the direction X. The row of the main pixels MPXa arranged in the direction X and the row of the main pixels MPXb arranged in the direction X are arranged alternately and repeatedly in the direction Y. Each of the pixels PX of the main pixels MPXa extends in a first extending direction d1, and each of the pixels PX of the main pixels MPXb extends in a second extending direction d2. Note that the first extending direction d1 differs from the directions X and Y. The second extending direction d2 differs from the directions X and Y and the first extending direction d1. In the example shown in FIG. 5, the first extending direction d1 is a lower right direction, and the second extending direction d2 is a lower left direction.

When the shape of the pixel PX is a substantially parallelogram as shown in the figure, a plurality of domains whose director rotation directions are different can be set to the unit pixel UPX. That is, two main pixels MPXa and MPXb are combined to make it possible to form a number of domains even for the pixels of respective colors and to compensate for viewing angle characteristics. Focusing on the viewing angle characteristics, therefore, one unit pixel UPX which is a combination of the main pixels MPXa and MPXb corresponds to the minimum unit for displaying a color image.

FIG. 5 is a plan view showing one unit pixel UPX of the liquid crystal panel PNL and also showing scanning lines G, signal lines S, pixel electrodes PE and light-shielding portion BMA. Note that, in FIG. 5, only the constituent elements necessary for explanations are illustrated, but illustration of the switching element SW, the common electrode CE, the color filter CF and the like is omitted.

As shown in FIG. 5, the pixels PX are configured to correspond to a fringe field switching (FFS) mode, which is one of the display modes using a lateral electric field. The scanning lines G and the signal lines S are placed on the first substrate SUB1, and the light-shielding portion BMA (light-shielding layer BM) is placed on the second substrate SUB2. The scanning lines G and the signal lines S intersect each other to extend a display area (DA). Note that the light-shielding portion BMA is a lattice-like light-shielding portion located in the display area DA to partition the pixels PX, and is indicated by two-dot chain lines in the figure.

The light-shielding portion BMA has at least a function of shielding the light emitted from the illumination device (IL) described above. The light-shielding portion BMA is formed of a material having a high light absorptivity, such as a black resin. The light-shielding portion BMA is formed in a lattice shape. In the light-shielding portion BMA, a plurality of light-shielding portions BMA1 extending in the direction X are formed integrally with a plurality of light-shielding portions BMA2 extending and bending along the first and second extending directions d1 and d2.

The scanning lines G each extend in the direction X. Each of the scanning lines G is opposed to its corresponding light-shielding portion BMA1 and extends along the corresponding light-shielding portion BMA1. The light-shielding portion BMA1 is opposed to the scanning line G, an end portion of the pixel electrode PE, and the like. The signal lines S extend and bend along the direction Y and first and second extending directions d1 and d2. Each of the signal lines S is opposed to its corresponding light-shielding portion BMA2 and extends along the corresponding light-shielding portion BMA2.

The light-shielding layer BM has a plurality of opening areas AP. The opening areas AP are partitioned by the light-shielding portions BMA1 and BMA2. The opening area AP of the main pixel MPXa extends in the first extending direction d1. The opening area AP of the main pixel MPXb extends in the second extending direction d2.

The pixel electrode PE of the main pixel MPXa includes a plurality of linear pixel electrodes PA located in the opening area AP. The linear pixel electrodes PA extend linearly in the first extending direction d1 and are arranged at intervals in an orthogonal direction dc1 that is orthogonal to the first extending direction d1. The pixel electrode PE of the main pixel MPXb includes a plurality of linear pixel electrodes PB located in the opening area AP. The linear pixel electrodes PB extend linearly in the second extending direction d2 and are arranged at intervals in an orthogonal direction dc2 that is orthogonal to the second extending direction d2.

In the display area DA, the foregoing alignment films AL1 and AL2 have an alignment axis AA that is parallel to the direction Y. The alignment direction AD1 of the alignment film AL1 is parallel to the direction Y, and the alignment direction AD2 of the alignment film AL2 is parallel to the alignment direction AD1.

When a voltage is applied to the foregoing liquid crystal layer (LC), the rotational state (alignment state) of liquid crystal molecules in the opening area AP of the main pixel MPXa and that of liquid crystal molecules in the opening area AP of the main pixel MPXb are different from each other. The viewing angle characteristic can thus be compensated.

Figure 6:
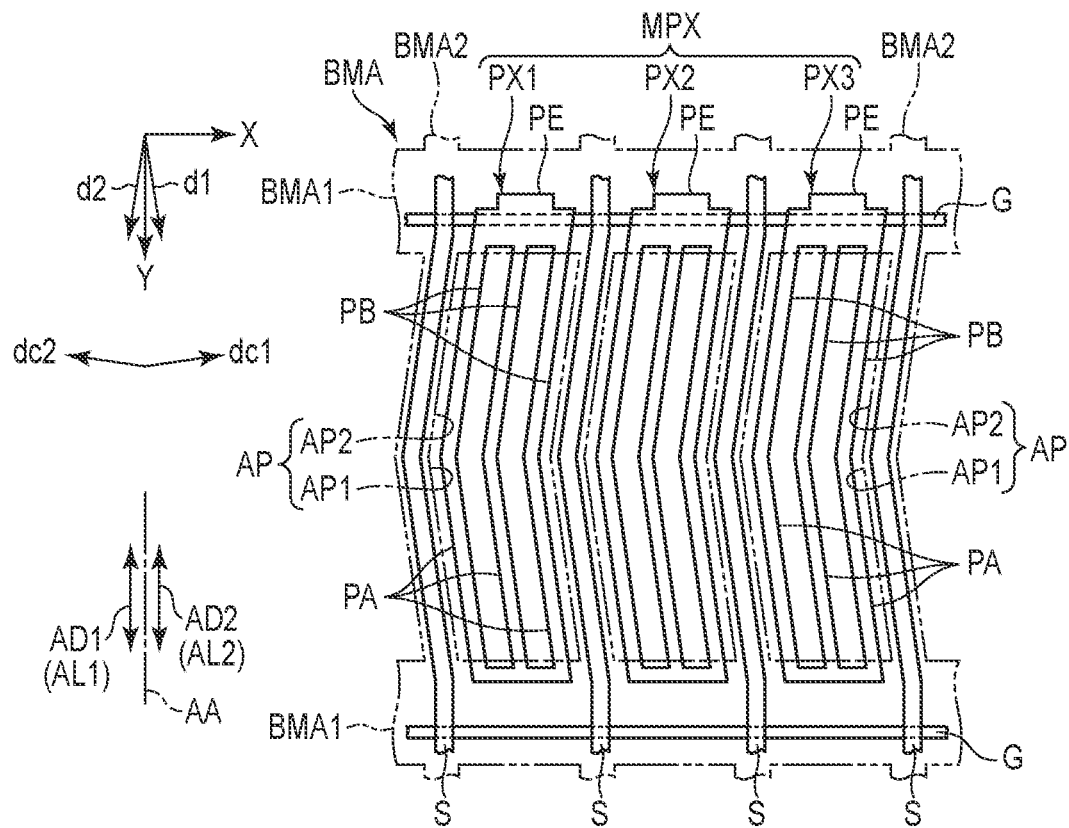
FIG. 6 is a plan view showing a main pixel that differs from that of the first embodiment, and also showing scanning lines, signal lines, pixel electrodes and a light-shielding portion.

The configuration in which one unit pixel UPX compensates for the viewing angle characteristics has been described above with reference to FIGS. 4 and 5. However, unlike in the first embodiment, one main pixel MPX may compensate for the viewing angle characteristics. FIG. 6 is a plan view showing a main pixel MPX that differs from that of the first embodiment, and also showing scanning lines G, signal lines S, pixel electrodes PE and light-shielding portion BMA.

As shown in FIG. 6, each of the opening areas AP extends in the second extending direction d2, bends in the middle thereof, and extends in the first extending direction d1. Each of the opening areas AP has the shape of symbol "<" and includes a first opening area AP1 and a second opening area AP2. The first opening area AP1 extends in the first extending direction d1 and the second opening area AP2 extends in the second extending direction d2.

Each of the pixel electrodes PE extends in the second extending direction d2, bends in the middle thereof, and extends in the first extending direction d1. Each of the pixel electrodes PE includes a plurality of linear pixel electrodes PA and a plurality of linear pixel electrodes PB. The linear pixel electrodes PA are located in the first opening area AP1, extend linearly in the first extending direction d1, and are arranged at intervals in the orthogonal direction dc1. The linear pixel electrodes PB are located in the second opening area AP2, extend linearly in the second extending direction d2, and are arranged at intervals in the orthogonal direction dc2. Continuous one-linear pixel electrodes PA and one-linear pixel electrodes PB have a shape of symbol "<".

In planar view where the pixel PX1 is located on the left side and the pixel PX3 is located on the right side, continuous one-linear pixel electrodes PA and one-linear pixel electrodes PB may have a shape of symbol ">", and the opening area AP may have a shape of symbol ">".

When a voltage is applied to the foregoing liquid crystal layer (LC), the rotational state of liquid crystal molecules in the first opening area AP1 and that of liquid crystal molecules in the second opening area AP2 are different from each other. Each of the opening areas AP has four different domains whose director rotation directions are different. The liquid crystal panel PNL can thus obtain satisfactory viewing angle characteristics.

Note that in the first embodiment, the pixel electrodes PE function as display electrodes, and the linear pixel electrodes PA and PB function as linear display electrodes.

Figure 7:
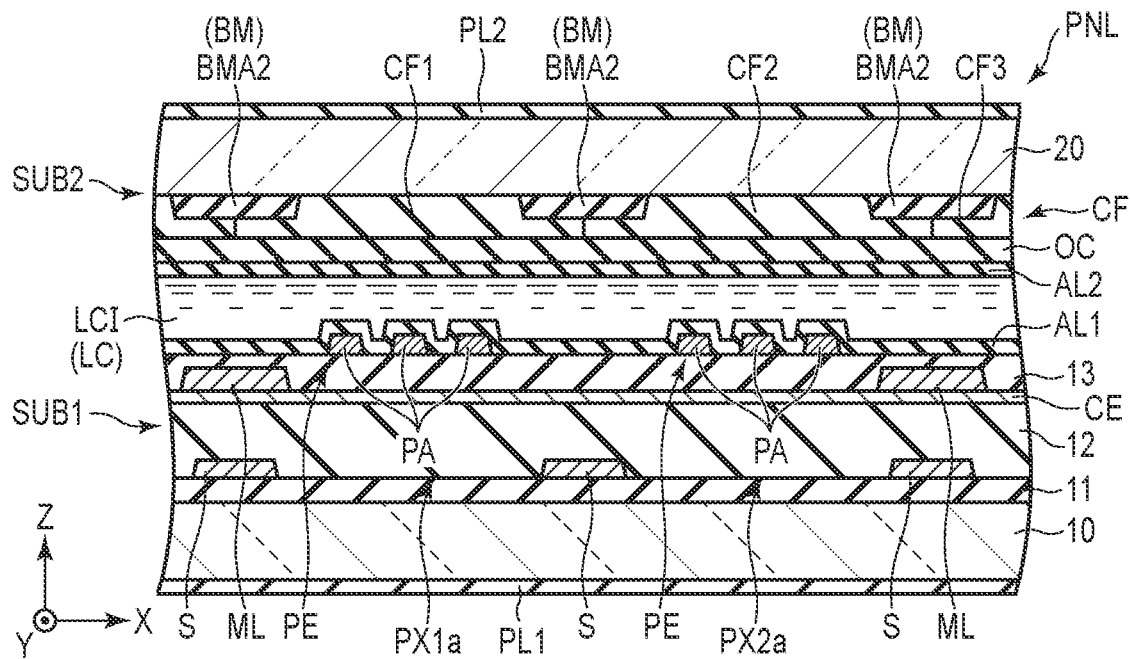
FIG. 7 is a sectional view showing a liquid crystal panel including the pixels shown in FIG. 5.

FIG. 7 is a sectional view showing a liquid crystal panel PNL including the pixels PX1 and PX2 shown in FIG. 5. The liquid crystal panel PNL is configured to correspond to a fringe field switching (FFS) mode which is one of the display modes using a lateral electric field.

As shown in FIG. 7, the first substrate SUB1 includes an insulating layer 11, signal lines S, an insulating layer 12, a common electrode CE, metal layers ML, an insulating layer 13, pixel electrodes PE, and the like between the insulating substrate 10 and the alignment film AL1. In addition, the polarizer PL1 is formed outside the first substrate SUB1.

The insulating layer 11 is provided on the insulating substrate 10. Although not described in detail, the foregoing scanning lines (G), the gate electrodes and the semiconductor layer of the switching elements SW, another insulating layer and the like are disposed between the insulating substrate 10 and the insulating layer 11. The signal lines S are formed on the insulating layer 11. The insulating layer 12 is provided on the insulating layer 11 and the signal lines S.

The common electrode CE is provided on the insulating layer 12. The metal layers ML are provided on the common electrode CE and are in contact with the common electrode CE. The metal layers ML are located directly above the signal lines S. Note that the first substrate SUB1 includes the metal layers ML in the example shown, but the metal layers ML may be omitted. The insulating layer 13 is provided on the common electrode CE and the metal layers ML.

The pixel electrodes PE are formed on the insulating layer 13. Each of the pixel electrodes PE is located between adjacent signal lines S and is opposed to the common electrode CE. Each of the pixel electrodes PE also has a slit at a position opposed to the common electrode CE (opening area AP). The common electrode CE and the pixel electrodes PE are formed of a transparent conductive material such as ITO and IZO. The insulating layer 13 is interposed between the pixel electrodes PE and the common electrode CE. The alignment film AL1 is provided on the insulating layer 13 and the pixel electrode PE to cover the pixel electrodes PE and the like.

On the other hand, the second substrate SUB2 includes, on the side of the insulating substrate 20 facing the first substrate SUB1, a light-shielding layer BM including the light-shielding portion BMA2, a color filter CF including the colored layers CF1, CF2 and CF3, a transparent layer OC, an alignment film AL2, and the like. The light-shielding portion BMA2 is formed on the inner surface of the insulating substrate 20. The light-shielding portion BMA2 is located directly above the signal lines S and the metal layers ML. Each of the colored layers CF1 and CF2 is formed on the inner surface of the insulating substrate 20, and a part of each of the colored layers CF1 overlaps the light-shielding portion BMA2. The transparent layer OC covers the color filter CF. The alignment film AL2 covers the transparent layer OC. In addition, the polarizer PL2 is formed outside the second substrate SUB2.

Note that the liquid crystal panel PNL may be configured without the light-shielding portion BMA2 or the light-shielding portion BMA1 (FIG. 6) in the display area DA. In this case, in the display area DA, the metal layers ML may be formed in a lattice shape and may have a light-shielding function instead of the light-shielding portions BMA1 and BMA2.

The liquid crystal layer LC includes a display liquid crystal layer LCI located in the display area DA. For example, the transmission axes of the polarizers PL1 and PL2 are orthogonal to each other, and no voltage (electric field) is generated between the pixel electrodes PE and the common electrode CE in the pixel PX1. In an OFF state where no voltage is applied to the display liquid crystal layer LCI, the liquid crystal molecules contained in the display liquid crystal layer LCI are initially aligned in the direction of the transmission axis of the polarizer PL1 between the alignment films AL1 and AL2. Since, therefore, no retardation occurs in the liquid crystal layer LC and the transmission axes of the polarizers PL1 and PL2 are orthogonal to each other, the pixel PX1 has a minimum transmittance to display black. That is, in the pixel PX1, the liquid crystal panel PNL exhibits a light-shielding function.

On the other hand, in the pixel PX1a, in an ON state where a voltage (electric field) generated between the pixel electrodes PE and the common electrode CE is applied to the display liquid crystal layer LCI, the liquid crystal molecules are aligned in a direction other than the initial alignment direction, and the alignment direction is controlled by the electric field. Thus, a retardation occurs in the liquid crystal layer LC, and the liquid crystal panel PNL exhibits a light-transmitting function in the pixel PX1. Therefore, the pixel PX1 in the ON state exhibits a color corresponding to the colored layer CF1.

The mode of the liquid crystal panel PNL is what is called a normally-black mode in which black is displayed in an OFF state; however, it may be what is called a normally-white mode in which black is displayed in an ON state (white is displayed in an OFF state).

Among the pixel electrodes PE and common electrode CE, the electrodes closer to the display liquid crystal layer LCI (liquid crystal layer LC) are the pixel electrodes PE, and the pixel electrodes PE function as display electrodes as described above. However, the electrodes closer to the display liquid crystal layer LCI (liquid crystal layer LC) among the pixel electrodes PE and common electrode CE may be the common electrode CE. In this case, the common electrode CE has a slit located in the opening area AP, functions as a display electrode as described above, and has a linear display electrode instead of the pixel electrodes PE.

Figure 8:
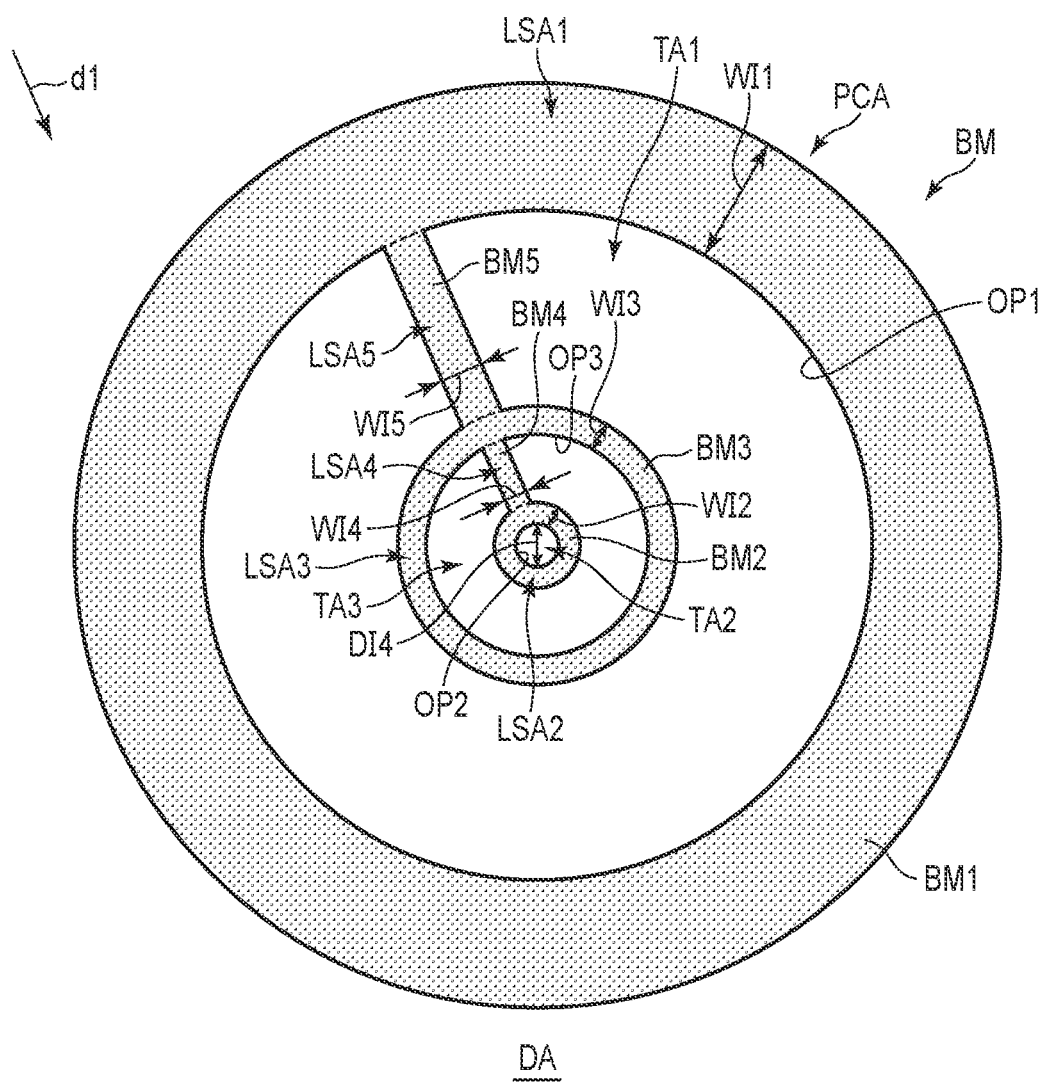
FIG. 8 is a plan view showing a light-shielding layer in an incident light control area of the liquid crystal panel.

FIG. 8 is a plan view showing a light-shielding layer BM in the incident light control area PCA of the liquid crystal panel PNL. In the figure, a dot pattern is marked to the light-shielding layer BM. As shown in FIG. 8, the incident light control area PCA includes a second incident light control area TA2 at the center, and also includes a first light-shielding area LSA1, a first incident light control area TA1, a third light-shielding area LSA3, a third incident light control area TA3, a second light-shielding area LSA2 and a second incident light control area TA2 from the outside toward the center.

The first light-shielding area LSA1 is located on the outermost periphery of the incident light control area PCA and has an annular shape. The first light-shielding area LSA1 has an outer periphery that is in contact with the display area DA. The first incident light control area TA1 is surrounded by the first light-shielding area LSA1, has an outer periphery that is in contact with the first light-shielding area LSA1, and has an annular shape. The second incident light control area TA2 is located at the center of the incident light control area PCA, has an outer periphery that is in contact with the second light-shielding area LSA2, and has a circular shape.

The second light-shielding area LSA2 has an inner periphery that is in contact with the second incident light control area TA2, surrounds the second incident light control area TA2, and has an annular shape. The third light-shielding area LSA3 is surrounded by the first incident light control area TA1, has an outer periphery that is in contact with the first incident light control area TA1, and has an annular shape. The third incident light control area TA3 is surrounded by the third light-shielding area LSA3, has an outer periphery that is in contact with the third light-shielding area LSA3 and an inner periphery that is in contact with the second light-shielding area LSA2, and has an annular shape.

The first, second and third light-shielding areas LSA1, LSA2 and LSA3 can be referred to as annular light-shielding areas. The first and third incident light control areas TA1 and TA3 can be referred to as annular incident light control areas. The second incident light control area TA2 can be referred to as a circular incident light control area.

In the incident light control area PCA, the light-shielding layer BM includes a first light-shielding portion BM1, a first opening OP1, a second light-shielding portion BM2, a second opening OP2, a third light-shielding portion BM3 and a third opening OP3. The first light-shielding portion BM1 is located in the first light-shielding area LSA1 and has an annular shape. The second light-shielding portion BM2 is located in the second light-shielding area LSA2 and has an annular shape. The third light-shielding portion BM3 is located in the third light-shielding area LSA3 and has an annular shape.

The light-shielding portion of each of the first, second and third light-shielding portions BM1, BM2 and BM3 can be referred to as annular light-shielding portion. The first and third openings OP1 and OP3 have an annular shape, and the second opening OP2 has a circular shape.

The incident light control area PCA further includes a fourth light-shielding area LSA4 and a fifth light-shielding area LSA5. The fourth light-shielding area LSA4 extends linearly in the first extending direction d1 from the second light-shielding area LSA2 to the third light-shielding area LSA3. The fifth light-shielding area LSA5 extends linearly in the first extending direction d1 from the third light-shielding area LSA3 to the first light-shielding area LSA1, and is aligned with the fourth light-shielding area LSA4 in the first extending direction d1. As seen from the above, the first and third incident light control areas TA1 and TA3 each have substantially the shape of letter "C".

Note that the first to fifth light-shielding areas LSA1 to LSA5 can be formed in the same layer, in the same process, and with the same material as the light-shielding layer BM formed in the display area DA.

In the first embodiment, the light-shielding layer BM further includes a fourth light-shielding portion BM4 and a fifth light-shielding portion BM5. The fourth light-shielding portion BM4 is located in the fourth light-shielding area LSA4 and extends linearly in the first extending direction d1 from the second light-shielding portion BM2 to the third light-shielding portion BM3. The fifth light-shielding portion BM5 is located in the fifth light-shielding area LSA5 and extends linearly in the first extending direction d1 from the third light-shielding portion BM3 to the first light-shielding portion BM1.

An outer peripheral circle of the first light-shielding portion BM1, an outer peripheral circle of the first incident light control area TA1, an outer peripheral circle of the second light-shielding portion BM2, the second incident light control area TA2, an outer peripheral circle of the third light-shielding portion BM3, and an outer peripheral circle of the third incident light control area TA3 are concentric circles.

The liquid crystal panel PNL may be configured without the fourth light-shielding area LSA4, fifth light-shielding area LSA5, fourth light-shielding portion BM4 or fifth light-shielding portion BM5 in the incident light control area PCA. This is because, even if the fourth light-shielding portion BM4 or the fifth light-shielding portion BM5 is not provided, the influence of a lead line L (which will be described later) upon the amount of received light is slight and is at a correctable level.

The liquid crystal panel PNL may be configured without the third light-shielding area LSA3, third light-shielding portion BM3 or third incident light control area TA3. In this case, the inner periphery of the first incident light control area TA1 has only to be in contact with the second light-shielding area LSA2.

In the radial direction of the incident light control area PCA, the width WI1 of the first light-shielding portion BM1 is 800 μm to 900 μm, the width WI3 of the third light-shielding portion BM3 is 30 μm to 40 μm, and the width WI2 of the second light-shielding portion BM2 is 30 μm to 40 μm. In a direction orthogonal to the first extending direction d1, the width WI5 of the fifth light-shielding portion BM5 is 60 μm to 70 μm, and the width WI4 of the fourth light-shielding portion BM4 is 30 μm to 40 μm.

FIG. 9 is a plan view showing an electrode structure of the incident light control area PCA of the liquid crystal panel PNL and also showing a plurality of control electrode structures RE and a plurality of lead lines L. As shown in FIGS. 9 and 8, the liquid crystal panel PNL includes a first control electrode structure RE1, a second control electrode structure RE2, a third control electrode structure RE3, a fourth control electrode structure RE4, a fifth control electrode structure RE5, a sixth control electrode structure RE6, a first lead line L1 connected to the first control electrode structure RE1, a second lead line L2 connected to the second control electrode structure RE2, a third lead line L3 connected to the third control electrode structure RE3, a fourth lead line L4 connected to the fourth control electrode structure RE4, a fifth lead line L5 connected to the fifth control electrode structure RE5, and a sixth lead line L6 connected to the sixth control electrode structure RE6. In the incident light control area PCA, the first to sixth lead lines L1 to L6 extend in the first extending direction d1.

FIG. 9 is a schematic diagram showing an electrode whose configuration corresponds to an in-plane-switching (IPS) mode in the incident light control area PCA.

The first control electrode structure RE1 includes a first feed line CL1 and first control electrodes RL1.

The first feed line CL1 is located in the first light-shielding area LSA1 and includes a first wiring line WL1. In the first embodiment, the first wiring line WL1 has the shape of letter "C" and is divided in an area through which the second to sixth lead lines L2 to L6 extend.

A plurality of first control electrodes RL1 are located in the first light-shielding area LSA1 and the first incident light control area TA1, are electrically connected to the first wiring line WL1, extend linearly in the first extending direction d1, and are arranged at intervals in the orthogonal direction dc1. The first control electrodes RL1 are disposed inside the first wiring line WL1.

The first control electrodes RL1 includes a first control electrode RL1 connected to the first wiring line WL1 at both ends, and a first control electrode RL1 connected to the first wiring line WL1 at one end and not connected to the first wiring line WL1 at the other end.

The second control electrode structure RE2 includes a second feed line CL2 and second control electrodes RL2. The second feed line CL2 includes a second wiring line WL2. The second control electrode structure RE2 is similar to the first control electrode structure RE1. The second wiring line WL2 is located inside the first wiring line WL1, but may be located outside the first wiring line WL1.

The first control electrodes RL1 and the second control electrodes RL2 are arranged alternately in the orthogonal direction dc1.

The third and fourth control electrode structures RE3 and RE4 are located in the second light-shielding area LSA2 and the second incident light control area TA2. The third and fourth control electrode structures RE3 and RE4 are shown as semicircular shapes having parallel sides in the first extending direction d1. The side of the third control electrode structure RE3 and the side of the fourth control electrode structure RE4 are located and spaced apart in the orthogonal direction dc1. Note that although the third and fourth control electrode structures RE3 and RE4 are generally shaped like a semicircle, their detailed structures will be described later.

The fifth control electrode structure RE5 includes a fifth feed line CL5 and fifth control electrodes RL5. The fifth feed line CL5 includes a fifth wiring line WL5. The fifth feed line CL5 is located in the third light-shielding area LSA3 and has the shape of letter "C".

A plurality of fifth control electrodes RL5 are located in the third light-shielding area LSA3 and the third incident light control area TA3, are electrically connected to the fifth wiring line WL5, extend linearly in the first extending direction d1, and are arranged at intervals in the orthogonal direction dc1. The fifth wiring line WL5 and the fifth control electrodes RL5 are formed integrally as one unit. The fifth control electrodes RL5 are disposed inside the fifth wiring line WL5.

The fifth control electrodes RL5 includes a fifth control electrode RL5 connected to the fifth wiring line WL5 at both ends, and a fifth control electrode RL5 connected to the fifth wiring line WL5 at one end and not connected thereto at the other end.

The sixth control electrode structure RE6 includes a sixth feed line CL6 and sixth control electrodes RL6. The sixth feed line CL6 includes a sixth wiring line WL6. The sixth control electrode structure RE6 is similar to the fifth control electrode structure RE5. The sixth wiring line WL6 is located inside the fifth wiring line WL5, but may be located outside the fifth wiring line WL5.

The fifth control electrodes RL5 and the sixth control electrodes RL6 are arranged alternately in the orthogonal direction dc1.

The first to sixth lead lines L1 to L6 are formed of metal. For example, the first to sixth lead lines L1 to L6 are located on the same layer as the metal layer ML and are formed of the same metal as the metal layer ML.

The first to sixth lead lines L1 to L6 are bundled and extend in an area covered with a light-shielding portion (BMA2) in the display area DA. However, the first to sixth lead lines L1 to L6 need not be bundled, but each of the first to sixth lead lines L1 to L6 has only to extend on at least one of the light-shielding portions BMA1 and BMA2 in the display area DA.

The first, second, fifth and sixth feed lines CL1, CL2, CL5 and CL6 and the first to sixth lead lines L1 to L6 have only to be formed of a laminated layer body of transparent conductive layers and metal layers.

As described with reference to FIG. 7, the pixel electrodes PE and common electrode CE in the display area DA are formed of transparent conductive materials (transparent conductive films), and the pixel PX includes transparent conductive films of two different layers. As will be described later, the first to sixth wiring lines WL1 to WL6 can be formed of one of the transparent conductive films of two layers, the first to sixth control electrodes RL1 to RL6 can be formed of the other transparent conductive film, and the first to sixth control electrodes RL1 to RL6 can be formed in the same layer. Note that the first to sixth wiring lines WL1 to WL6 can be formed of a multilayer film of transparent conductive films and metal films.

The liquid crystal panel PNL has a structure corresponding to an IPS mode that is one of the display modes using a lateral electric field in the incident light control area PCA. Each of the first to sixth control electrodes RL1 to RL6 has a shape other than that of the pixel electrode PE corresponding to the FFS mode described above.

As represented by the first and second control electrodes RL1 and RL2, a voltage is applied to the control electrodes arranged alternately, and liquid crystal molecules are driven by a potential difference generated between the electrodes. For example, it is possible to extend the wiring lines from the display area DA to supply a video signal, which is similar to the signal supplied to the pixel electrode, to the first control electrode RL1 and to supply a common voltage, which is similar to the voltage to the common electrode, to the second control electrode RL2. It is also possible to supply the first control electrode RL1 with a signal whose polarity is positive with respect to the common voltage and to supply the second control electrode RL2 with a signal whose polarity is negative.

In the incident light control area PCA, the forgoing alignment films AL1 and AL2 have alignment axes AA that are parallel to the direction Y. That is, the alignment axes AA of the alignment films AL1 and AL2 are parallel to each other in the display area DA and the incident light control area PCA. In the incident light control area PCA, the alignment direction AD1 of the alignment film AL1 is parallel to the direction Y, and the alignment direction AD2 of the alignment film AL2 is parallel to the alignment direction AD1.

In a state where no voltage is applied to the liquid crystal layer LC, the initial alignment direction of liquid crystal molecules in the display area DA is the same as that of liquid crystal molecules in the incident light control area PCA. The linear pixel electrodes (linear display electrodes) PA and the control electrodes RL extend in parallel. In the X-Y plane, the first and second extending directions d1 and d2 are each inclined 10° with respect to the direction Y, respectively. Therefore, the directions of rotation of liquid crystal molecules can be aligned between the display area DA and the incident light control area PCA. The inclination has been described by the linear pixel electrodes PA. However, the above applies to the case where the inclination is replaced with the inclination of slits of the common electrode by the linear pixel electrodes PA.

Figure 10:
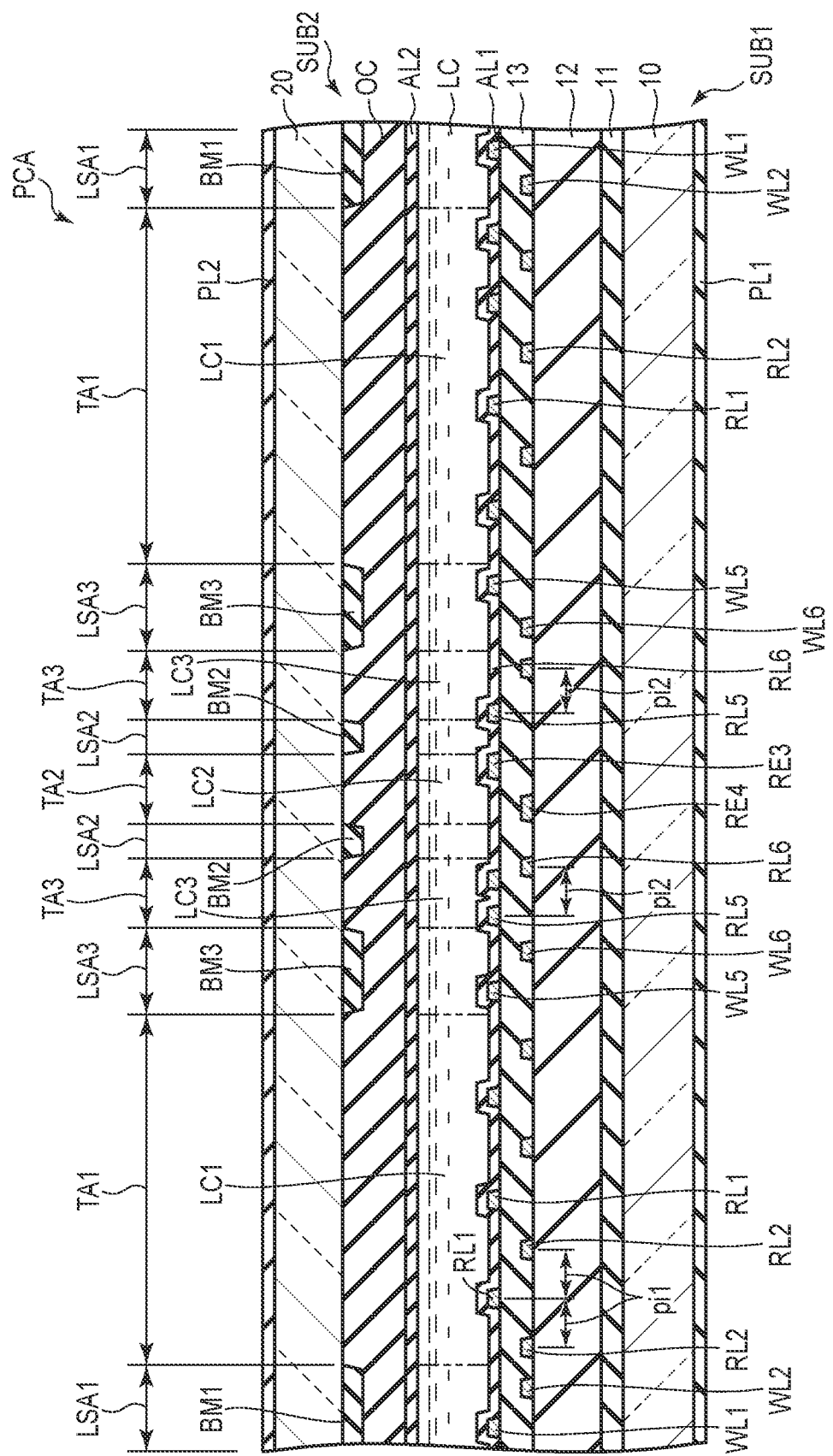
FIG. 10 is a sectional view showing the incident light control area of the liquid crystal panel.

FIG. 10 is a sectional view showing the incident light control area PCA of the liquid crystal panel PNL. In FIG. 10, signal lines S, scanning lines G or the like are not shown.

As shown in FIG. 10, one of the two conductors between which the insulating layer 13 is formed, is provided on the same layer as one of the pixel electrode PE and the common electrode CE and is formed of the same material as the one of the electrodes. The other conductor is provided on the same layer as the other of the pixel electrode PE and the common electrode CE and is formed of the same material as the other of the electrodes.

In FIG. 10, the second wiring line WL2, second control electrode RL2, fourth control electrode structure RE4, sixth wiring line WL6 and sixth control electrode RL6 are provided on the insulating layer 12 and covered with the insulating layer 13. The second wiring line WL2, second control electrode RL2, fourth control electrode structure RE4, sixth wiring line WL6 and sixth control electrode RL6 are provided on the same layer as the common electrode CE and formed of the same transparent conductive material as the common electrode CE.

The first wiring line WL1, first control electrode RL1, third control electrode structure RE3, fifth wiring line WL5 and fifth control electrode RL5 are provided on the insulating layer 13 and covered with the alignment film AL1. The first control electrode RL1, third control electrode structure RE3, fifth wiring line WL5 and fifth control electrode RL5 are provided on the same layer as the pixel electrode PE and formed of the same transparent conductive material as the pixel electrode PE.

For example, the insulating layer 13 is interposed between the first control electrode RL1 (first control electrode structure RE1) and the second control electrode RL2 (second control electrode structure RE2). Note that the first control electrode RL1, second control electrode RL2, third control electrode structure RE3, fourth control electrode structure RE4, fifth control electrode RL5 and sixth control electrode RL6 may be formed on the same layer.

In the incident light control area PCA, the alignment film AL1 covers the first wiring line WL1, first control electrode RL1, second wiring line WL2, second control electrode RL2, third control electrode structure RE3, fourth control electrode structure RE4, fifth wiring line WL5, fifth control electrode RL5, sixth wiring line WL6 and sixth control electrode RL6, and is in contact with the liquid crystal layer LC.

Assume here that the pitch between the first and second control electrodes RL1 and RL2 in the orthogonal direction dc1 is represented by pi1, and the pitch between the fifth and sixth control electrodes RL5 and RL6 in the orthogonal direction dc1 is represented by pi2. In other words, the pitch pi1 is a pitch between the center of the first control electrode RL1 and that of the second control electrode RL2 in the orthogonal direction dc1. The pitch pi2 is a pitch between the center of the fifth control electrode RL5 and that of the sixth control electrode RL6 in the orthogonal direction dc1.

Though the pitches pi1 and pi2 each may be constant, they are preferably set randomly. It is thus possible to prevent interference of light generated when the pitches pi1 and pi2 are made constant.

In the second substrate SUB2, the color filter CF is not provided in the incident light control area PCA.

The liquid crystal layer LC includes a first control liquid crystal layer LC1 located in the first incident light control area TA1, a second control liquid crystal layer LC2 located in the second incident light control area TA2, and a third control liquid crystal layer LC3 located in the third incident light control area TA3.

A voltage, which is generated by the first and second control electrodes RL1 and RL2, is applied to the first control liquid crystal layer LC1. A voltage, which is generated by the third and fourth control electrode structures RE3 and RE4, is applied to the second control liquid crystal layer LC2. A voltage, which is generated by the fifth and sixth control electrodes RL5 and RL6, is applied to the third control liquid crystal layer LC3.

A first control voltage is applied to the first control electrode structure RE1 via the first lead line L1, a second control voltage is applied to the second control electrode structure RE2 via the second lead line L2, a third control voltage is applied to the third control electrode structure RE3 via the third lead line L3, a fourth control voltage is applied to the fourth control electrode structure RE4 via the fourth lead line L4, a fifth control voltage is applied to the fifth control electrode structure RE5 via the fifth lead line L5, and a sixth control voltage is applied to the sixth control electrode structure RE6 via the sixth lead line L6.

The first, third and fifth control voltages may have the same voltage level as one of the image signal and the common voltage, and the second, fourth and sixth control voltages may have the same voltage level as the other of the image signal and the common voltage.

Alternatively, the first, third and fifth control voltages may have a voltage level of first polarity with respect to the common voltage, and the second, fourth and sixth control voltages may have a voltage level of second polarity with respect to the common voltage. Note that one of the first and second polarities is positive and the other is negative.

Figure 13:
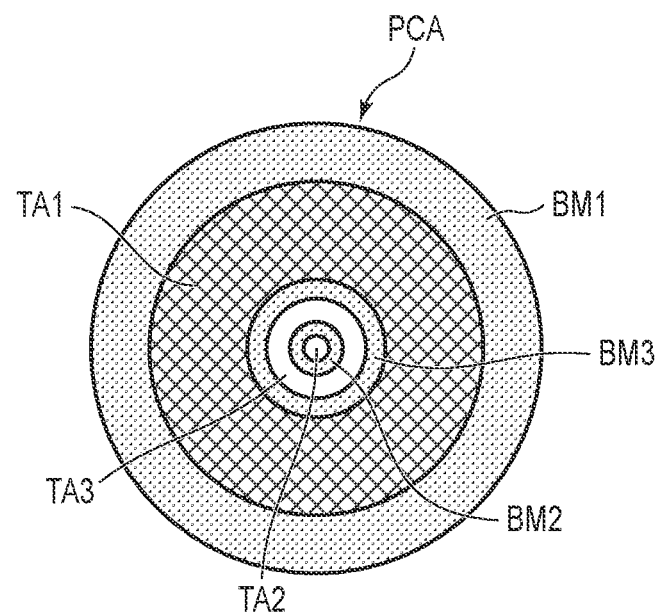
FIG. 13 is a plan view showing an incident light control area when the liquid crystal panel is driven under a third condition.
Figure 14:
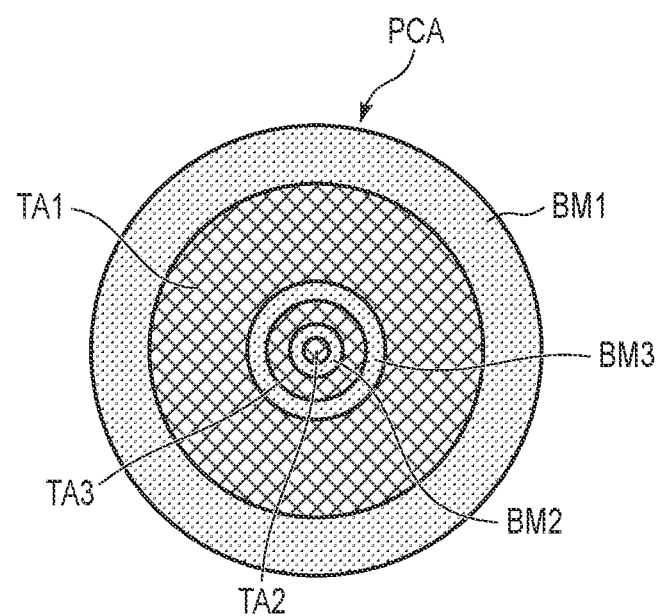
FIG. 14 is a plan view showing an incident light control area when the liquid crystal panel is driven under a fourth condition.

In describing the incident light control area PCA as a diaphragm DP, the state of the aperture of the diaphragm DP will be defined. FIG. 11 is a plan view showing the incident light control area PCA when the liquid crystal panel PNL is driven under a first condition. FIG. 12 is a plan view showing the incident light control area PCA when the liquid crystal panel PNL is driven under a second condition. FIG. 13 is a plan view showing the incident light control area PCA when the liquid crystal panel PNL is driven under a third condition. FIG. 14 is a plan view showing the incident light control area PCA when the liquid crystal panel PNL is driven under a fourth condition. In FIGS. 11 to 14, the fourth light-shielding portion BM4 or the fifth light-shielding portion BM5 is mot shown. In FIGS. 11 to 14, a grating pattern is added to a non-transmissive incident light control area TA.

As shown in FIG. 11, the liquid crystal display device DSP is driven under the first condition to set the diaphragm DP to the maximum open state (open state).

As shown in FIG. 12, the liquid crystal display device DSP is driven under the second condition to set the diaphragm DP to the minimum state.

As shown in FIG. 13, the liquid crystal display device DSP is driven under the third condition to set the diaphragm DP to a state between the maximum open state and the minimum state.

As shown in FIG. 14, the liquid crystal display device DSP is driven under the fourth condition to set the diaphragm DP to a closed state.

As described above, the incident light control area PCA includes a first incident light control area TA1, a third incident light control area TA3 and a second incident light control area TA2 from the outside toward the center. The following are transmissive and non-transmissive states of the first, third and second incident light control areas TA1, TA3 and TA2 corresponding to the first to fourth conditions.

For example, when the first, second and third control liquid crystal layers LC1, LC2 and LC3 are driven under the first condition, the liquid crystal panel PNL sets the first, second and third incident light control areas TA1, TA2 and TA3 in the transmissive state.

When the first, second and third control liquid crystal layers LC1, LC2 and LC3 are driven under the second condition, the liquid crystal panel PNL sets the second incident light control area TA2 in the transmissive state and sets the first and third incident light control areas TA1 and TA3 in the non-transmissive state.

When the first, second and third control liquid crystal layers LC1, LC2 and LC3 are driven under the third condition, the liquid crystal panel PNL sets the third and second incident light control areas TA3 and TA2 in the transmissive state, and sets the first incident light control area TA1 in the non-transmissive state.

When the first, second and third control liquid crystal layers LC1, LC2 and LC3 are driven under the fourth condition, the liquid crystal panel PNL sets the first, third and second incident light control areas TA1, TA3 and TA2 in the non-transmissive state. The non-transmissive state refers to a light-shielding state in visible light or a state whose transmittance is lower than that of the transmissive state.

Figure 15:
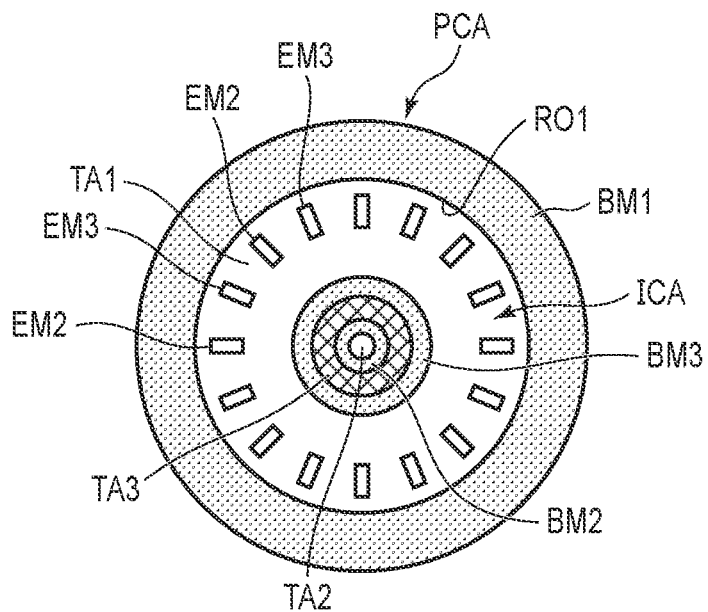
FIG. 15 is a plan view showing an incident light control area when the liquid crystal panel is driven under a fifth condition.
Figure 16:
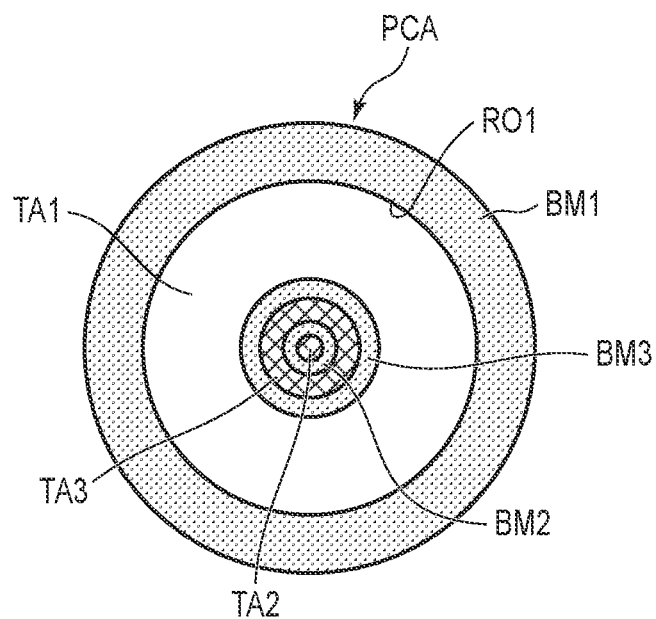
FIG. 16 is a plan view showing an incident light control area when the liquid crystal panel is driven under a sixth condition.
Figure 17:
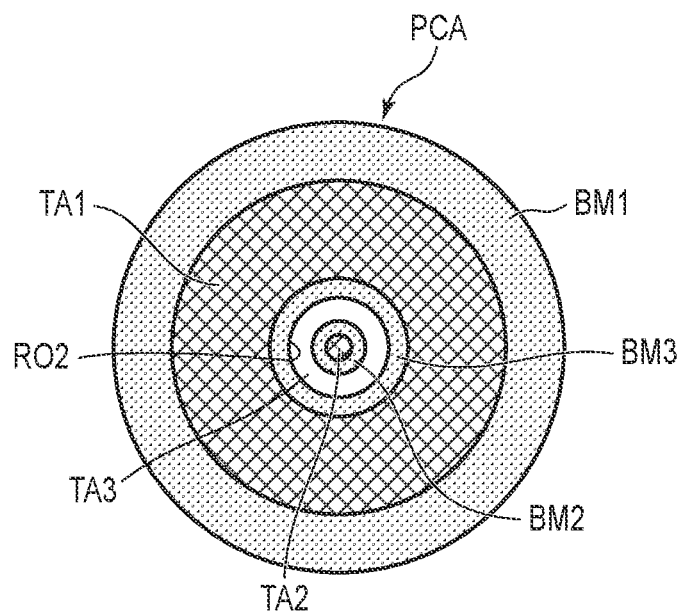
FIG. 17 is a plan view showing an incident light control area when the liquid crystal panel is driven under a seventh condition.

Furthermore, in addition to the foregoing first to fourth conditions, the following fifth to seventh conditions can be set to drive the liquid crystal panel PNL. FIG. 15 is a plan view showing the incident light control area PCA when the liquid crystal panel PNL is driven under the fifth condition. FIG. 16 is a plan view showing the incident light control area PCA when the liquid crystal panel PNL is driven under the sixth condition. FIG. 17 is a plan view showing the incident light control area PCA when the liquid crystal panel PNL is driven under the seventh condition.

As shown in FIG. 15, under the fifth condition, the second incident light control area TA2 is set in a transmissive state to form an aperture of the diaphragm DP, which is narrowed to the minimum, and the first incident light control area TA1 is set in a transmissive state and the third incident light control area TA3 is set in a non-transmissive state to form an annular aperture RO1 in the diaphragm DP. The light sources EM2 and EM3 are provided alongside the camera 1a so as to face the annular aperture RO1. For example, the light sources EM2 and EM3 are alternately arranged in the circumferential direction of the aperture RO1.

The liquid crystal panel PNL includes an emitted light control area ICA. In the present embodiment, the emitted light control area ICA is included in the first incident light control area TA1. The light sources EM3 overlap the emitted light control area ICA (first incident light control area TA1). Note that the light sources EM2 also overlap the emitted light control area ICA, but may overlap the first light-shielding portion BM1 and the like.

As shown in FIG. 16, under the sixth condition, the second and third incident light control areas TA2 and TA3 are set in a non-transmissive state, and the first incident light control area TA1 is set in a transmissive state to form an annular aperture RO1 of the diaphragm DP by itself.

As shown in FIG. 17, under the seventh condition, the second and first incident light control areas TA2 and TA1 are set in a non-transmissive state, and the third incident light control area TA3 is set in a transmissive state to form an annular aperture RO2 of the diaphragm DP by itself inside the third light-shielding portion BM3.

As is seen from the above, the incident light control area PCA of the liquid crystal panel PNL constitutes the diaphragm of the camera 1a. Accordingly, the aperture can be opened (first condition), narrowed (third condition), further narrowed (second condition), and closed (fourth condition), and the depth of focus can be changed for imaging by the camera 1a. The liquid crystal panel PNL can open and narrow the diaphragm concentrically. In other words, the liquid crystal panel PNL can control a light transmissive area concentrically in the incident light control area PCA.

Furthermore, under the fifth condition, the first incident light control area TA1 can be set in a transmissive state to illuminate a subject with visible light from the light sources EM3 provided alongside the camera 1a, and the second incident light control area TA2 can be set in a transmissive state to allow visible light to enter the camera 1a from the smallest aperture.

In addition, an image can be formed by visible light transmitted through the first incident light control area TA1 under the sixth condition, and an image can be formed by visible light transmitted through the third incident light control area TA3 under the seventh condition. When an image is formed under the sixth and seventh conditions, the image can be formed by light transmitted through a plurality of annular apertures RO arranged concentrically. When an image is formed using concentric apertures under the first to third conditions and the fifth to seventh conditions, a signal for adjusting the depth of focus can be obtained.

Since the transmittance of the polarizers PL1 and PL2 to infrared light is high, the camera 1a can also receive infrared light from the light sources EM2 provided alongside the camera 1a while visible light is set in a light-shielding state as the fourth condition. The cameras 1b can receive infrared light from the light sources EM2 provided alongside the camera 1b.

The diaphragm in the second condition can function as a pinhole for adjusting the amount of light incident upon the camera 1a. When the distance between the camera 1a and a subject is several centimeters, the resolving power of the camera 1a is improved, with the result that a clear picture can be taken at a close distance from the subject. As an example of picture taking in which the camera 1a is close to a subject, a fingerprint can be photographed for fingerprint authentication. In addition, even when the amount of light is large, picture taking using a pinhole is effective.

If there is a problem that the amount of light from a subject decreases when the diaphragm in the second condition is caused to function as a pinhole for a closeup image, the first incident light control area TA1 can be set in a transmissive state under the fifth condition to illuminate the subject with visible light from the light sources EM3 provided alongside the camera 1a.

Figure 18:
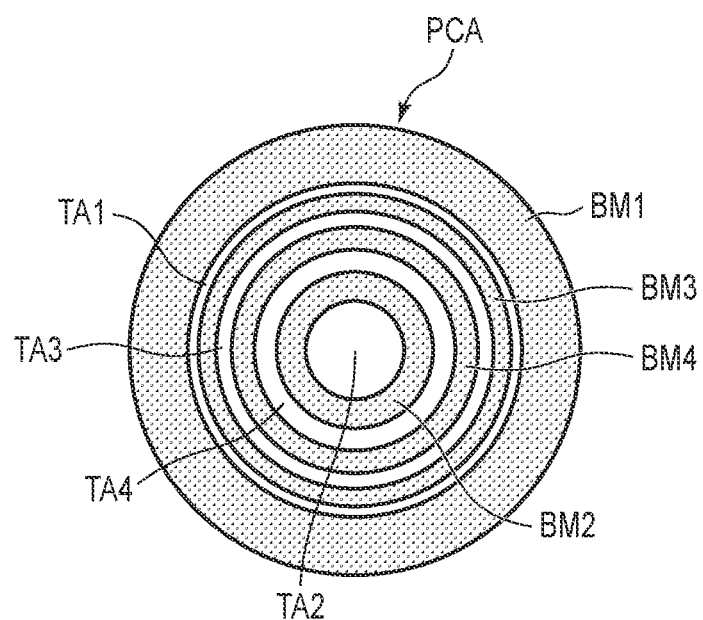
FIG. 18 is a plan view showing a modification to the light-shielding layer in the incident light control area of the liquid crystal panel.

The shape of the light-shielding layer BM in the incident light control area PCA of the liquid crystal panel PNL can be varied. FIG. 18 is a plan view showing a modification to the light-shielding layer BM in the incident light control area PCA of the liquid crystal panel PNL.

As shown in FIG. 18, for example, the light-shielding layer BM further includes a fourth light-shielding portion BM4 located in the incident light control area PCA and having an annular shape. The fourth light-shielding portion BM4 is located outside the second light-shielding portion BM2 and inside the third light-shielding portion BM3.

The incident light control area PCA further includes a fourth incident light control area TA4. The fourth incident light control area TA4 has an outer periphery that is in contact with the fourth light-shielding portion BM4 and an inner periphery that is in contact with the second light-shielding portion BM2, and has an annular shape. The second, fourth, third and first incident light control areas TA2, TA4, TA3 and TA1 have the same area and are located concentrically.

In the radial direction of the incident light control area PCA, the widths of the fourth, third and first incident light control areas TA4, TA3 and TA1 are different from each other. The annular incident light control area TA has a smaller width as it is located on the outer peripheral side. By setting all of the first to fourth incident light control areas TA1 to TA4 in a visible light transmissive state, each of the fourth, third and first incident light control areas TA4, TA3 and TA1 can be regarded as a transparent ring zone. Thus, the liquid crystal panel PNL can be caused to function as a Fresnel zone plate in the incident light control area PCA.

In the example shown in FIG. 18, the number of annular incident light control areas TA is 3. However, the incident light control area PCA may include four or more annular incident light control areas TA.

According to the foregoing liquid crystal display device DSP and electronic device 100 according to the first embodiment configured as described above, the liquid crystal display device DSP and the electronic device 100 capable of satisfactorily imaging, and controlling the light transmissive area of the incident light control area PCA can be obtained.

The liquid crystal panel PNL is configured to selectively transmit visible light emitted from the light sources EM3 in the emitted light control area ICA. The liquid crystal panel PNL is configured to selectively transmit visible light from the outside in order to cause visible light to enter the camera 1a from the outside in the incident light control area PCA.

The combination of the camera 1a and the liquid crystal panel PNL makes it possible to capture a super-closeup image, for example, to capture an image of fingerprints. The super-closeup image capture utilizes the principle of a pinhole camera to make focusing unnecessary and bring the finger close to a cover glass CG for fingerprint authentication. Since visible light can be emitted from the light sources EM3, a fingerprint can be photographed with the finger in contact with the cover glass CG.

The camera 1a receives infrared light and can capture an image of the front of the screen of the liquid crystal display device DSP.

The electronic device 100 can detect visible light and detect infrared light during different periods. The liquid crystal panel PNL is configured to transmit visible light from the outside in the incident light control area PCA during a first detection period to detect visible light without emitting infrared light from the light sources EM2. The liquid crystal panel PNL is configured to allow visible light to be emitted from the emitted light control area ICA to the outside during the first detection period. During the first detection period, therefore, an image can be captured by visible light while infrared light is hardly becoming noise.

The liquid crystal panel PNL is configured to allow infrared light to enter the cameras 1a and 1b during a second detection period to detect infrared light emitting from the light sources EM2, which is different from the first detection period. The liquid crystal panel PNL is configured to stop visible light from being emitted from the emitted light control area ICA to the outside during the second detection period and to prevent visible light from being transmitted from the outside in the incident light control area PCA. During the second detection period, therefore, an image can be captured by infrared light while visible light is hardly becoming noise.

Second Embodiment

Figure 19:
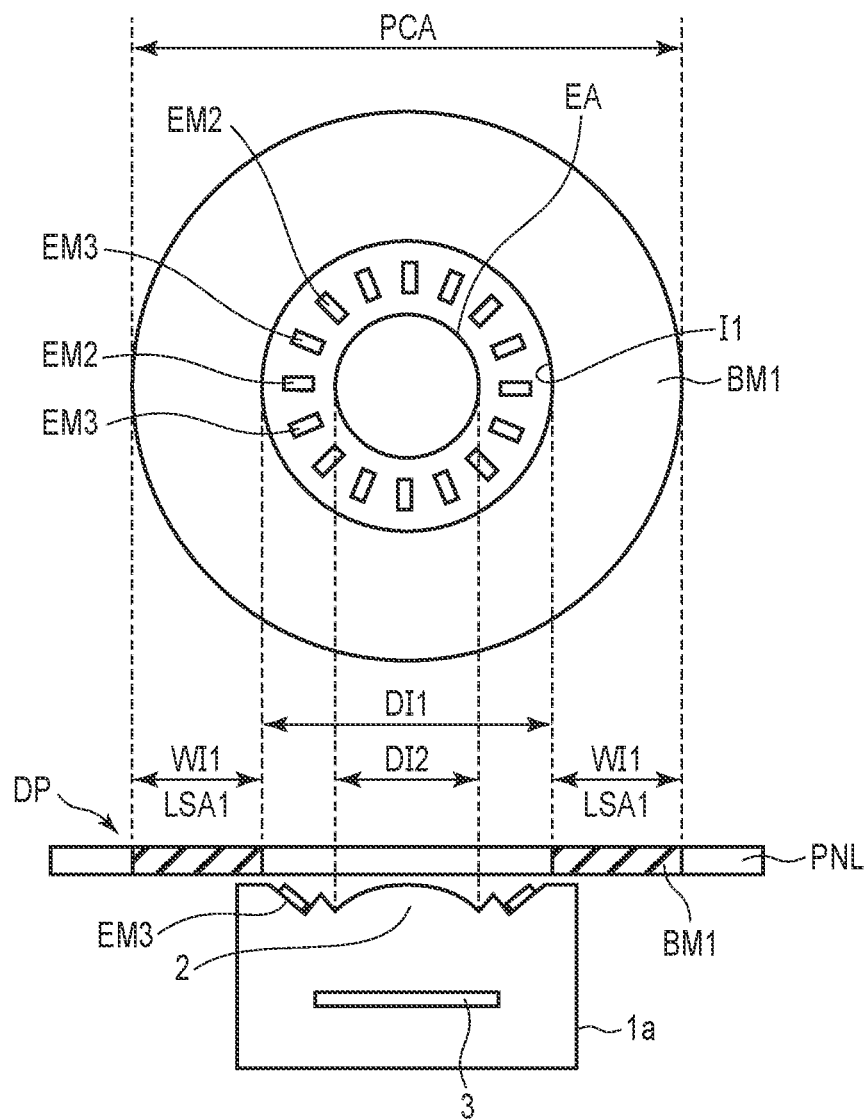
FIG. 19 is a diagram showing a camera and part of a liquid crystal panel of an electronic device according to a second embodiment, the diagram being a combination of a plan view and a sectional view each showing the liquid crystal panel and the camera.

Next, a second embodiment will be is described. The electronic device 100 of the second embodiment is configured in the same manner as that of the first embodiment, except for the configurations described below. The aperture of a diaphragm will be described. FIG. 19 is a diagram showing a camera 1a and part of a liquid crystal panel PNL of the electronic device 100 according to the second embodiment. This diagram is a combination of a plan view and a sectional view each showing the liquid crystal panel PNL and the camera 1a. As for the camera 1a, its outside shape is shown in the figure. As the light-shielding layer BM in the incident light control area PCA, only the first light-shielding portion BM1 is shown.

As shown in FIG. 19, the liquid crystal panel PNL constitutes a diaphragm DP for changing a light transmissive area concentrically in the incident light control area PCA. The diaphragm DP is located in front of the camera 1a, and light (visible light) enters the camera 1a through the diaphragm DP. Using a function of controlling the amount of light transmitted through the liquid crystal panel PNL, the diaphragm DP can control the amount of light that enters the camera 1a. As will be described later, the outer diameter of the diaphragm DP is determined by the diameter DI2 of an effective aperture EA of the optical system 2 (camera 1a), and an inner diameter DI1 of the first light-shielding portion BM1 is larger than the diameter DI2 of the effective aperture EA of the optical system 2 (camera 1a).

The first light-shielding portion BM1 is formed outside the outer periphery of the diaphragm DP to shield unnecessary light. Since the boundary is clear, the outer periphery of the diaphragm DP will be described with reference to the inner periphery I1 of the first light-shielding portion BM1 hereinafter. The diaphragm DP can increase and decrease the amount of light incident on the camera 1a by shielding the inside of the inner periphery I1 of the first shielding-portion BM1. The first light-shielding portion BM1 has a width WI1 to surround the effective aperture EA and cover a first light-shielding area LSA1 not used to display the periphery of the camera 1a.

FIG. 19 shows light sources EM3 that emit visible light and light sources EM2 that emit infrared light. The light sources EM2 and EM3 can be selected and mixed together, such as that they are alternately arranged. When they are used for fingerprint authentication and the like, light in the entire visible light range need not be used, but a light source that emits light of a specific wavelength in the wavelength range of visible light can also be used.

FIG. 20 is a sectional view showing part of the liquid crystal panel, part of an illumination device and the camera according to the second embodiment.

As shown in FIG. 20, the liquid crystal panel PNL includes a first substrate SUB1, a second substrate SUB2, a liquid crystal layer LC, a polarizer PL1, a polarizer PL2, and the like. In the figure, the liquid crystal layer LC is indicated by a line between the first and second substrates SUB1 and SUB2.

The illumination device IL includes a light guide LG1 that emits light from the light sources EM1 as planar light, a light reflection sheet RS that reflects light from the light guide LG1 toward the liquid crystal panel PNL, an optical sheet that controls the direction of light from the light guide LG1, and the like. The optical sheet includes, for example, a light diffusion sheet SS and a prism sheet PS. The prism sheet PS may include the prism sheets PS1 and PS2 shown in FIG. 2.

The illumination device IL has an opening ILO in which the camera 1a is provided, and a light-shielding wall CS2 is placed between the opening ILO and the light guide LG1 and the like. An adhesive tape TP1 is stuck to the light-shielding wall CS2 to fix the prism sheet PS. The adhesive tape TP1 also has a function of shielding unwanted light in the vicinity of the light-shielding wall CS2. In addition, the illumination device IL has a resin frame FR located at the periphery of the illumination device IL and accommodating the light guide LG1 and the like.

The camera 1a is disposed close to an end portion of the liquid crystal panel PNL.

Next is a description of the angle of light incident upon the effective aperture EA of the camera 1. The angle will be described while defining it on a virtual plane including the central axis AX1 of the optical system 2 (camera 1a) and the orthogonal axis AX2 that is orthogonal to the central axis AX1, as shown in FIG. 20.

A point on the outermost periphery of the effective aperture EA of the optical system 2 will be defined as a first point P1. The straight line passing through the first point P1 will be defined as a first reference line RF1. Another point on the outermost periphery of the effective aperture EA will be defined as a third point P3. A straight line passing through the third point P3 will be defined as a second reference line RF2. A straight line passing through the first point P1, central axis AX1 and third point P3 will be defined as a third reference line RF3. A point where the first and second reference lines RF1 and RF2 intersect will be defined as a fifth point P5. A point where the central axis AX1 intersects the third reference line RF3 will be defined as a sixth point P6.

The sixth point P6 is also the center of the effective aperture EA. The central axis AX1 is orthogonal to the third reference line RF3. The central axis AX1 is a line perpendicular to the surface on which the effective aperture EA is formed and is generally the optical axis of the camera 1a (optical system 2). The first and second reference lines RF1 and RF2 are also optical paths of the outermost peripheral light beam of luminous flux used for imaging which depends on the focal length of the camera 1 and the size of the imaging surface 3a.

The effective aperture EA is circularly symmetric with respect to the central axis AX1. The central axis AX1 passes through the fifth point P5. The first reference line RF1 and the central axis AX1 intersect at angle θ. The second reference line RF2 and the central axis AX1 also intersect at angle θ. Note that in some cameras 1a, angle 2θ, which is twice angle θ, is the angle of view.

The light-shielding wall CS2 is adjacent to the camera 1a in a direction parallel to the third reference line RF3. The light-shielding wall CS2 is located between the camera 1a and the light guide LG1 and has a cylindrical shape.

Next is a description of a third distance DT3 and the inner diameter DI1. The third distance DT3 is a linear distance from the fifth point P5 to the opening (second opening OP2) of the light-shielding layer BM on the central axis AX1. FIG. 21 is another sectional view showing part of the liquid crystal panel PNL, part of the illumination device IL and camera 1a according to the second embodiment. The third distance DT3 and inside diameter DI1 will be described while defining them on a virtual plane including the central axis AX1 and the orthogonal axis AX2.

As shown in FIG. 21, a point on the inner periphery I1 of the first light-shielding portion BM1 close to the first point P1 will be defined as a second point P2. A point on the inner periphery I1 of the first light-shielding portion BM1 close to the third point P3 will be defined as a fourth point P4. The first reference line RF1 is a straight line passing through the first and second points P1 and P2. The second reference line RF2 is a straight line passing through the third and fourth points P3 and P4.

Light traveling from the side outer than the second point P2 (the right side in the figure) toward the camera 1 and crossing the central axis AX1 at an angle θ or less does not enter the effective aperture EA because it passes outside the effective aperture EA. In addition, light traveling from the side outer than the fourth point P4 (the left side in the figure) toward the camera 1 and crossing the central axis AX1 at an angle θ or less does not enter the effective aperture EA. Even though the first incident light control area (TA1) is located on the right side of the second point P2 and on the left side of the fourth point P4, the amount of light incident on the effective aperture EA is less affected.

Therefore, the circumference formed by the points where the lines crossing the central axis AX1 at the angle θ and passing through the outermost periphery of the effective aperture EA, which are represented by the first reference line RF1, intersects the liquid crystal layer LC, is the effective maximum inner diameter of the diaphragm DP.

The liquid crystal layer LC alone does not have a light-shielding function, and the functions of the liquid crystal layer LC, polarizers PL1 and PL2 and the like need to be combined for light shielding. Strictly speaking, the liquid crystal layer LC is not the diaphragm DP, but it is considered that a diaphragm DP is formed in the liquid crystal layer LC and further it is assumed that the inside of the aperture of the first light-shielding portion BM1 exhibits the diaphragm DP in the plane where the first light-shielding portion BM1 is formed because the boundary clear.

As shown in FIG. 7, the color filter CF, transparent layer OC and alignment film AL2 are present between the liquid crystal layer LC and the light-shielding layer BM, but the total thickness of these layers is several micrometers (μm). It is thus assumed that the liquid crystal layer LC and the light-shielding layer BM are located on the same plane. The first light-shielding portion BM1 having a width WI1 shields unwanted light near the outer periphery of the incident light control area PCA. Thus, it is also possible to consider the inner periphery I1 as the outermost periphery of the diaphragm DP.

It can be further considered that the optical path of the outermost-periphery light beam may be on the first and second reference lines RF1 and RF2. That is, the optical path of the outermost-periphery light beam is a line connecting the outermost periphery of a structure functioning as the diaphragm DP and the outermost periphery of the effective aperture EA of the camera 1.

Assume that a point located at an opening (second opening OP2) of the light-shielding layer BM on the central axis AX1 is a seventh point P7. Paying attention to a triangle formed by the fifth, second and seventh points P5, P2 and P7 and a triangle formed by the fifth, fourth and seventh points P5, P4 and P7, the following relation is established.

$$DI1/2 = DT3 \times \tan \theta$$

As the third distance DT3 from the fifth point P5 to the seventh point P7 increases, the inner diameter DI1 of the first light-shielding portion BM1 also increases. Therefore, in order to decrease the inner diameter DI1, the camera 1 needs to be close to the liquid crystal panel PNL.

The liquid crystal panel PNL is not irradiated with the light from the illumination device IL, inside the area surrounded by the light-shielding wall CS2. Therefore, the first light-shielding portion BM1 is placed in the first light-shielding area LSA1 (a range indicated by the width WI1 from the second point P2 to an end portion EN1 of the adhesive tape TP1 alongside a light irradiation area and a range indicated by the width WI1 from the fourth point P4 to the end portion EN2 of the adhesive tape TP1 alongside the light irradiation area). This is because the first light-shielding area LSA1 is an area that is not used for either the diaphragm DP or display.

In order to form the display area DA as wide as possible, the first light-shielding portion BM1 needs to be as small as possible. If the camera 1 is brought close to the liquid crystal panel PNL, the inner diameter DI1 can be reduced, and the area surrounded by the first light-shielding portion BM1 can be reduced.

Figure 22:
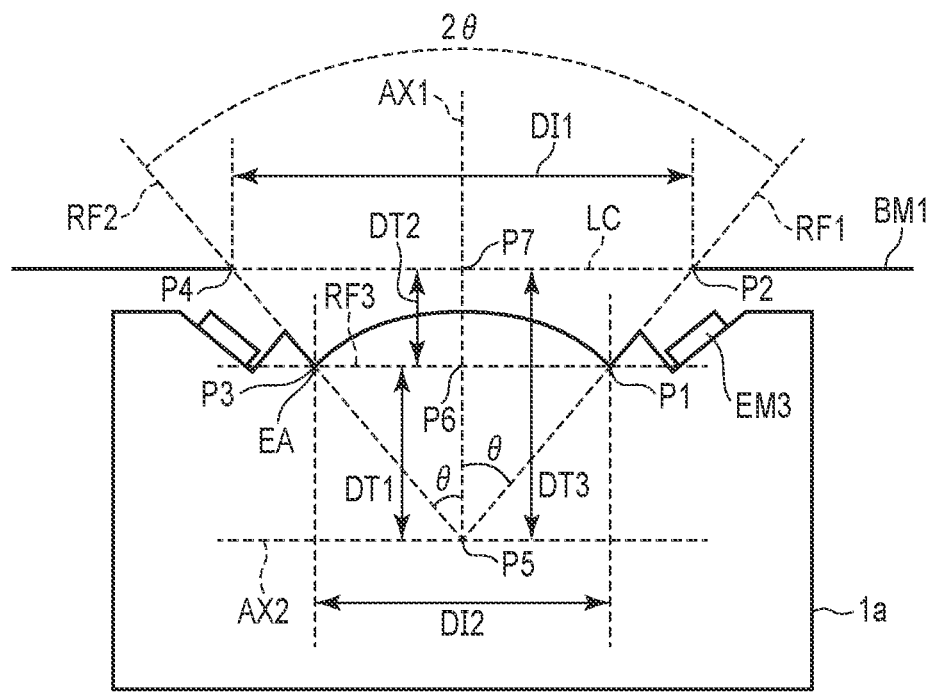
FIG. 22 is a sectional view showing part of the liquid crystal panel and camera according to the second embodiment.

Next is a description of the relationship between the inner diameter DI1 of the first light-shielding portion BM1 and the diameter DI2 of the effective aperture EA of the camera 1a. FIG. 22 is a sectional view showing part of the liquid crystal panel PNL and camera 1a according to the second embodiment. For simplification of the figure, in the liquid crystal panel PNL, the first light-shielding portion BM1 is indicated by a solid line and the liquid crystal layer LC in the opening of the first light-shielding portion BM1 is indicated by a dashed line. The above relationship will be described while defining it on a virtual plane including the central axis AX1 and the orthogonal axis AX2.

As shown in FIG. 22, a linear distance on the central axis AX1 from the fifth point P5 to the sixth point P6 will be defined as a first distance DT1. A linear distance from the sixth point P6 to the seventh point P7 (the opening of the light-shielding layer BM) on the central axis AX1 will be defined as a second distance DT2. The inner diameter DI1 and the diameter DI2 can be obtained by their respective relational equations indicated below.

$$DI1/2 = DT3 \times \tan\theta$$

$$DI2/2 = DT1 \times \tan\theta$$

From the above relational equations, the following relationship is established.

$$DI1/DI2 = DT3/DT1$$

For example, in order to make the inner diameter DI1 twice or less than the diameter DI2, the second distance DT2 (DT3−DT1) should be shorter than the first distance DT1.

FIG. 22 is directed to a case where the diaphragm DP is opened (first condition). In the incident light control area PCA, therefore, all of the first, second and third incident light control areas TA1, TA2 and TA3 are set in a transmissive state (FIGS. 8 and 11).

Next is a description of a case where the diaphragm DP is narrowed (third condition). In the incident light control area PCA, therefore, the second and third incident light control areas TA2 and TA3 are set in a transmissive state, and the first incident light control area TA1 is set in a non-transmissive state (FIGS. 8 and 13).

Figure 23:
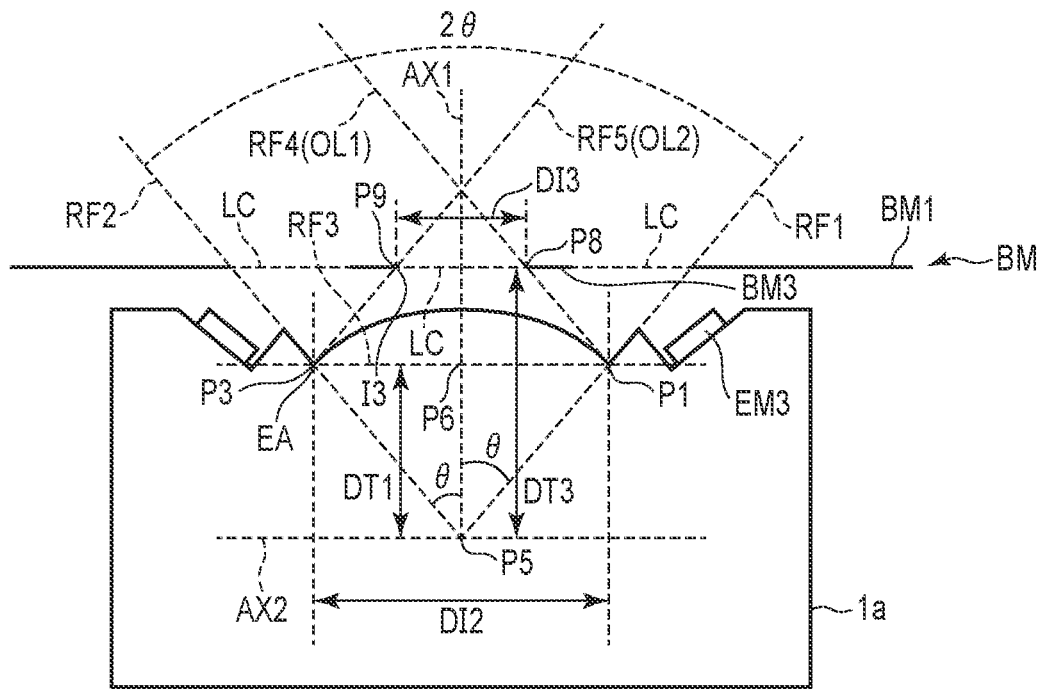
FIG. 23 is another sectional view showing part of the liquid crystal panel and camera according to the second embodiment.

FIG. 23 is another sectional view showing part of the liquid crystal panel PNL and camera 1a according to the second embodiment. The aperture under the third condition will be described. For simplification of the figure, in the liquid crystal panel PNL, the first and third light-shielding portions BM1 and BM3 are indicated by solid lines, and the liquid crystal layer LC other than the first and third light-shielding portions BM1 and BM3 is indicated by dashed lines. The above aperture will be described while defining it on a virtual plane including the central axis AX1 and the orthogonal axis AX2.

As shown in FIG. 23, when the aperture of the diaphragm DP is decreased to narrow the light incident upon the camera 1a, oblique-incident light crossing the central axis AX1 at a large angle decreases with respect to the incident light crossing the central axis AX1 at a small angle. Thus, there is a problem that the amount of light in the peripheral portion of imaging of the camera 1a decreases.

The inner diameter DI3 of the third light-shielding portion BM3 for preventing the oblique incident light from being extremely decreased will be examined. Assume here that a straight line parallel to the second reference line RF2 and passing through the first point P1 is a fourth reference line RF4, a straight line parallel to the first reference line RF1 and passing through the third point P3 is a fifth reference line RF5, a point where the fourth reference line RF4 intersects the light-shielding layer BM is an eighth point P8, and a point where the fifth reference line RF5 intersects the light-shielding layer BM is a ninth point P9.

Focusing on the fourth reference line RF4, among the light (oblique light OL1) crossing the central axis AX1 at an angle $\theta$, light outside the effective aperture EA than the fourth reference line RF4 does not enter the effective aperture EA. Therefore, even if the outside of the eighth point P8 (the right side in the figure) is shielded from light, the oblique light OL1 does not increase or decrease. The inner periphery I3 of the third light-shielding portion BM3 is thus located at the eighth point P8.

Similarly, focusing on the fifth reference line RF5, among the light (oblique light OL2) crossing the central axis AX1 at an angle $\theta$, light outside the effective aperture EA than the fifth reference line RF5 does not enter the effective aperture EA. Therefore, even if the outside of the ninth point P9 (the left side in the figure) is shielded from light, the oblique light OL2 does not increase or decrease. On the other hand, the inner periphery I3 of the third light-shielding portion BM3 is located at the ninth point P9. If, however, the outside of the ninth point P9 is shielded from light, the light outside the ninth point P9 in the oblique light line OL1 is shielded.

The inner diameter DI3 of the third light-shielding portion BM3 coincides with the distance between the eighth and ninth points P8 and P9 to prevent the amount of light in the peripheral portion of imaging of the camera 1a from extremely decreasing.

Figure 24:
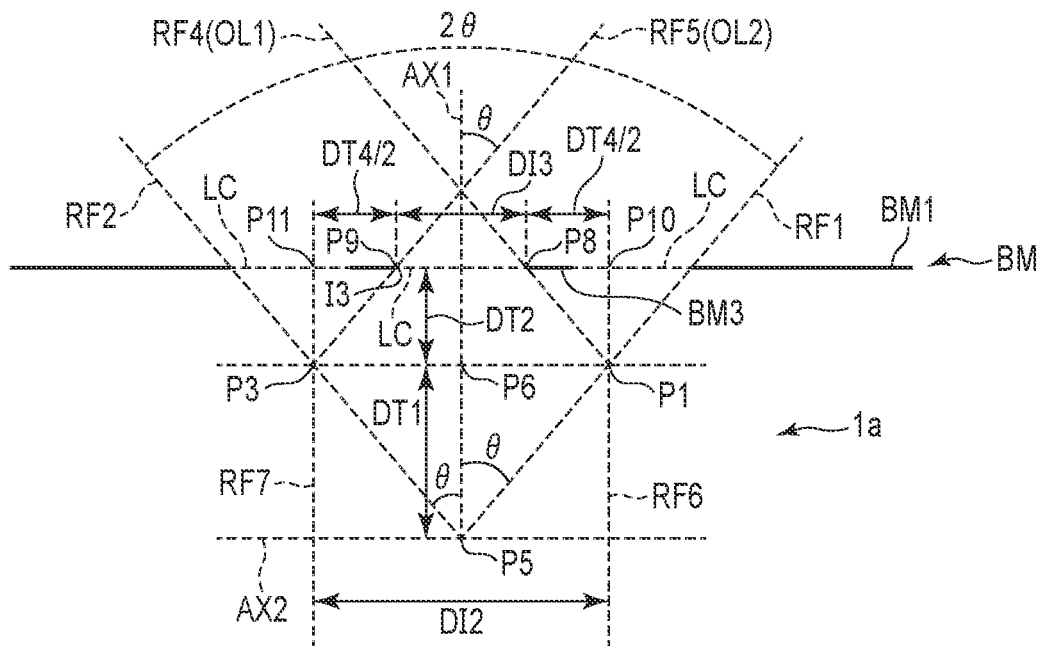
FIG. 24 is a sectional view showing the positions of part of the liquid crystal panel and the camera according to the second embodiment.

Next is a description of the inside area of the inner periphery I3 when the diaphragm DP is narrowed (third condition). FIG. 24 is a sectional view showing the positions of part of the liquid crystal panel PNL and camera 1a according to the second embodiment. For simplification of the figure, in the liquid crystal panel PNL, the first and third light-shielding portions BM1 and BM3 are indicated by solid lines, and the liquid crystal layer LC other than the first and third light-shielding portions BM1 and BM3 is indicated by dashed lines. The above inside area will be described while defining it on a virtual plane including the central axis AX1 and the orthogonal axis AX2.

As shown in FIG. 24, a straight line passing through the first point P1 and parallel to the central axis AX1 will be defined as a sixth reference line RF6. A straight line passing through the third point P3 and parallel to the central axis AX1 will be defined as a seventh reference line RF7. A point where the sixth reference line RF6 intersects the liquid crystal layer LC will be defined as a tenth point P10. A point where the seventh reference line RF7 intersects the liquid crystal layer LC will be defined as an eleventh point P11.

Since the fourth reference line RF4 intersects the central axis AX1 at an angle $\theta$, a triangle whose vertices are first, eighth and tenth points P1, P8 and P10 and a triangle whose vertices are fifth, first and sixth points P5, P1 and P6 are similar to each other. Since the fifth reference line RF5 also intersects the central axis AX1 at an angle $\theta$, a triangle whose vertices are third, ninth and eleventh points P3, P9 and P11 and a triangle whose vertices are fifth, third and sixth points P5, P3 and P6 are similar to each other.

A linear distance between the first and tenth points P1 and P10 is a second distance DT2. Assuming that a linear distance between the eighth and tenth points P8 and P10 and a linear distance between the ninth and eleventh points P9 and P11 are each a distance DT4/2 and a linear distance that is twice the distance DT4/2 is a fourth distance DT4, the following equations are given:

$$DT4/DT2 = DI2/DT1, \text{ and}$$

$$DT4 = DI2 \times (DT2/DT1).$$

Since DT4 is equal to (=) "DI2−DI3", the following equations are given:

$$DI2 \times (DT2/DT1) = DI2 - DI3,$$

$$DI2(1 - DT2/DT1) = DI3, \text{ and}$$

$$DI3/DI2 = 1 - (DT2/DT1).$$

If the second distance DT2 is 50% of the first distance DT1, the following equation is given:

$$DI3/DI2 = 0.5.$$

In this case, since the radius is 50%, the inside area of the inner periphery I3 of the third light-shielding portion BM3 is 0.25% of the area of the effective aperture EA.

Furthermore, when the second distance DT2 is 60% of the first distance DT1, the following equation is given:

$$DI3 = 0.4 \times DI2$$

Thus, the inside area of the inner periphery I3 is 0.16% of the area of the effective aperture EA.

Since DT4 is equal to (=) DI2×(DT2/DT1), when DT2 is equal to (=) DT1, DT4 is equal to (=) DI2 and the inside area of the inner periphery I3 becomes 0. In order to achieve an opening inside the inner periphery I3, the first distance DT1 needs to be longer than the second distance DT2 (DT1>DT2).

Figure 25:
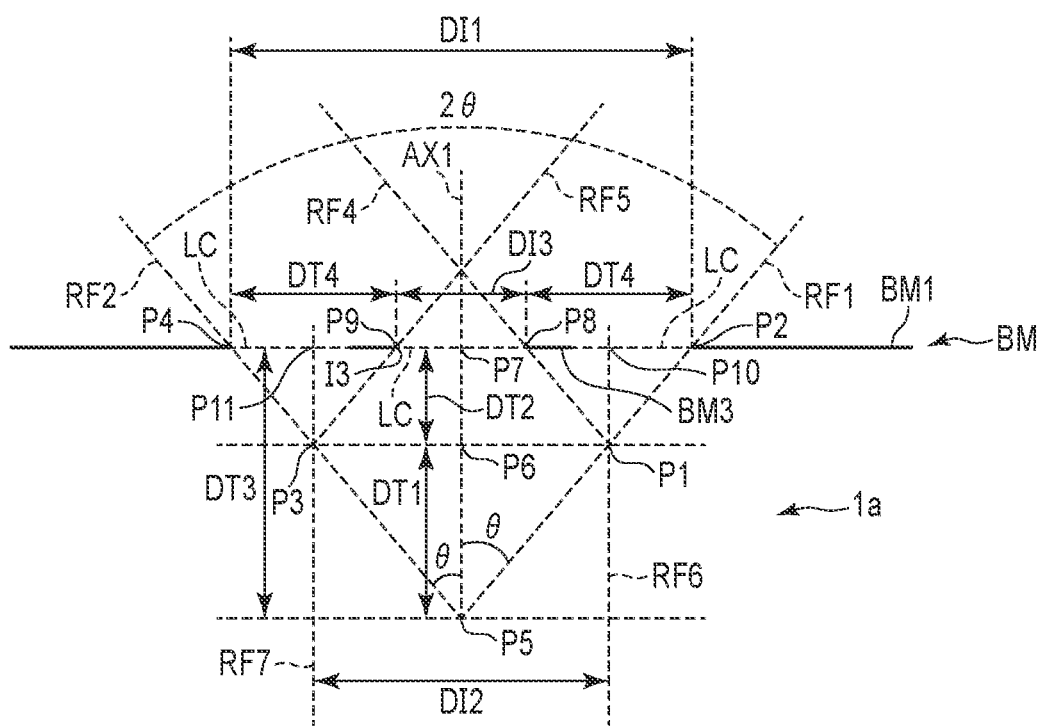
FIG. 25 is another sectional view showing the positions of part of the liquid crystal panel and the camera according to the second embodiment.

Next is a description of the relationship between the inner diameter DI1 of the first light-shielding portion BM1 and the inner diameter DI3 of the third light-shielding portion BM3. FIG. 25 is another sectional view showing the positions of part of the liquid crystal panel PNL and camera 1a according to the second embodiment. For simplification of the figure, in the liquid crystal panel PNL, the first and third light-shielding portions BM1 and BM3 are indicated by solid lines, and the liquid crystal layer LC other than the first and third light-shielding portions BM1 and BM3 is indicated by dashed lines. The above relationship will be described while defining it on a virtual plane including the central axis AX1 and the orthogonal axis AX2.

As shown in FIG. 25, a triangle whose vertices are first, eighth and tenth points P1, P8 and P10 and a triangle whose vertices are fifth, second and seventh points P5, P2 and P7 are similar to each other. Note that a triangle whose vertices are third, ninth and eleventh points P3, P9 and P11 and a triangle whose vertices are fifth, fourth and seventh points P5, P4 and P7 are similar to each other.

From the above, the following equations are given:

$$DT4/DT2 = DI1/DT3, \text{ and } DT4 = (DI1 \times DT2)/DT3.$$

Since DI3 is equal to (=) "DI1−(2×DT4)", the following equations are given:

$$DI3 = DI1 - (2 \times DI1 \times DT2)/DT3, \text{ and}$$

$$DI3/DI1 = 1 - (2 \times DT2)/DT3.$$

For example, when the second distance DT2 is 25% of the third distance DT3, the following equation is given:

$$DI3 = 0.5 \times DI1.$$

When the second distance DT2 is 50% of the first distance DT1, the third distance DT3 is 150% of the first distance DT1. Since the second distance DT2 is ⅓ of the third distance DT3, the following equation is given:

$$DI3 = DI1/3.$$

Figure 26:
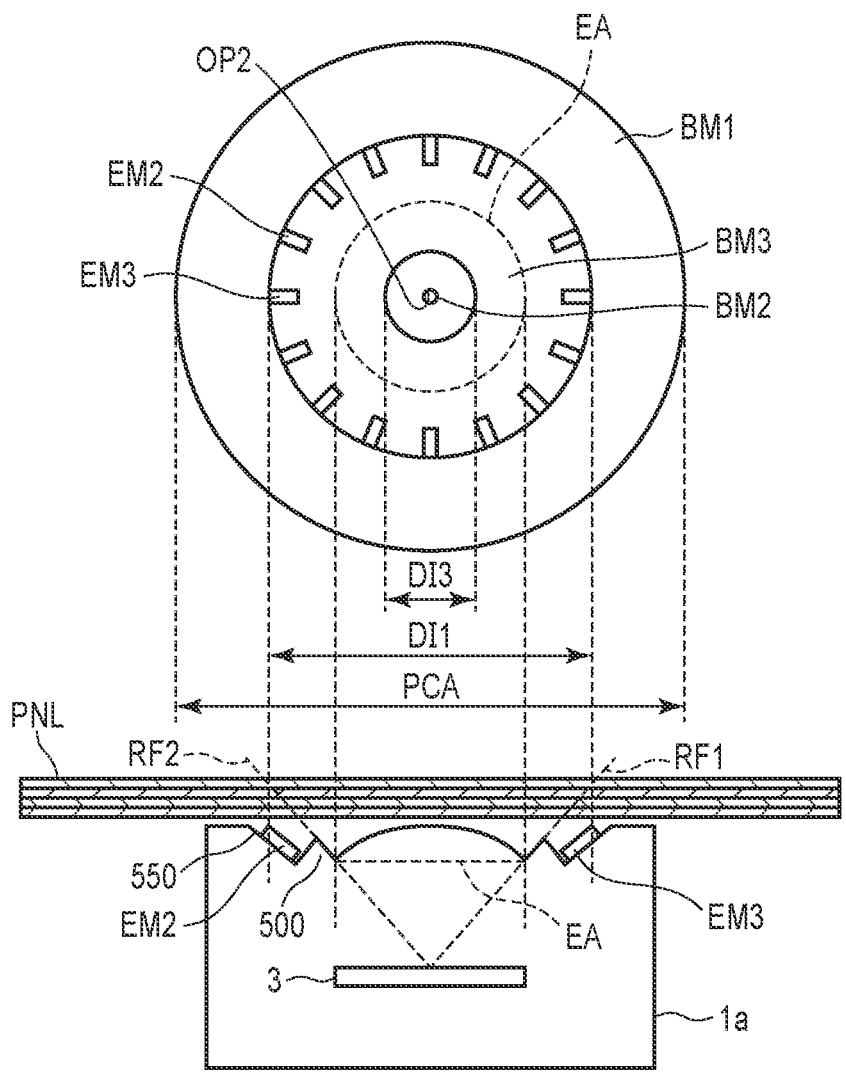
FIG. 26 is a plan view and a sectional view showing a camera and an incident light control area of the liquid crystal panel according to the second embodiment.

FIG. 26 is a plan view and a sectional view showing the camera 1a and the incident light control area PCA of the liquid crystal panel PNL according to the second embodiment. In planar view, the liquid crystal panel PNL is located at the front and the camera 1 is located at the back. Assume here that the inner diameter DI3 of the third light-shielding portion BM3 is ⅓ of the inner diameter DI1 of the first light-shielding portion BM1.

As shown in FIG. 26, when the inner diameter DI1 is, for example, 1.8 mm, the inner diameter DI3 of the third light-shielding portion BM3 is 0.6 mm. As shown in FIG. 8, a second opening OP2 (second incident light control area TA2) surrounded by the second light-shielding portion BM2 is provided inside the inner periphery I3 of the third light-shielding portion BM3. The second opening OP2 is, for example, an opening having a diameter of 0.2 mm used for pinhole imaging. Thus, the inner diameter DI4 of the second light-shielding portion BM2 shown in FIG. 8 is 0.2 mm.

The light sources EM3 are placed between the inner diameter DI3 alongside the camera 1a and the effective aperture EA. When the diameter of the effective aperture EA is 1.2 mm, the interval between the inner diameter DI1 and the effective aperture EA is 300 μm, and thus the length of the light source EM3 in its radial direction is preferably 300 μm or less. As will be described later, a mini-LED having a long side whose length is 200 μm to 250 μm can be used as the light source EM3. Note that the size of the light source EM2 may be the same as or different from that of the light source EM3.

A projection 500 is formed between each of the light sources EM2 and EM3 and the effective aperture EA. The projection 500 can block light (visible light and infrared light) from the light sources EM2 and EM3 toward the effective aperture EA. The slope of the projection 500 alongside the effective aperture EA is formed outside the first and second reference lines RF1 and RF2 so as not to block the incident light. The light sources EM2 are EM3 are placed on an oblique side 550 toward the outside from the projection. The oblique side is directed inward (toward the effective aperture EA) such that the light from the light sources EM2 and EM3 travels toward the second opening OP2.

Figure 27:
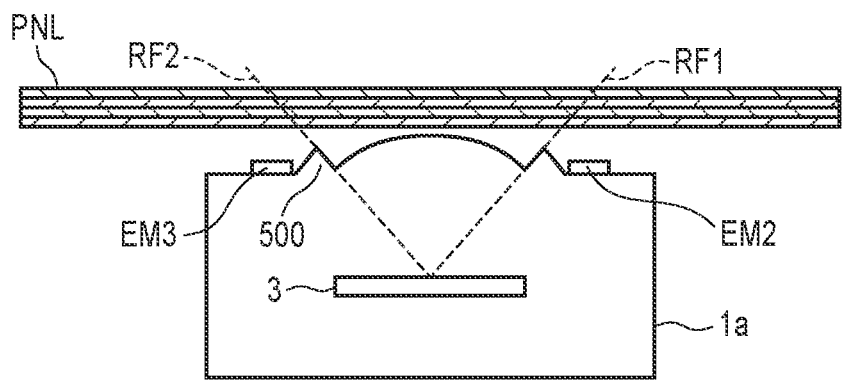
FIG. 27 is a sectional view showing a modification to the camera and the incident light control area of the liquid crystal panel according to the second embodiment.

FIG. 27 is a sectional view showing a modification to the camera 1a and the incident light control area PCA of the liquid crystal panel PNL according to the second embodiment. FIG. 27 also shows a configuration in which the projection 500 is extended as close as possible to the liquid crystal panel PNL when the incidence of light from the light sources EM2 and EM3 upon the camera 1a becomes a problem.

As shown in FIG. 27, part of the light emitted from the light source EM2 is reflected by the liquid crystal panel PNL and reflected as noise in imaging toward the effective aperture EA. The projection 500 shown in FIG. 27 blocks light directed toward the effective aperture EA by minimizing a gap between the projection and the liquid crystal panel PNL. In FIG. 27, the light sources EM2 and EM3 are placed on a plane parallel to the liquid crystal panel PNL in order to improve the workability of attaching the light sources EM2 and EM3 to the camera 1a. The second opening OP2 used as a pinhole is a relatively small opening. It is thus possible to align the liquid crystal panel PNL with the camera 1a using light transmitted through the second opening OP2.

Figure 28:
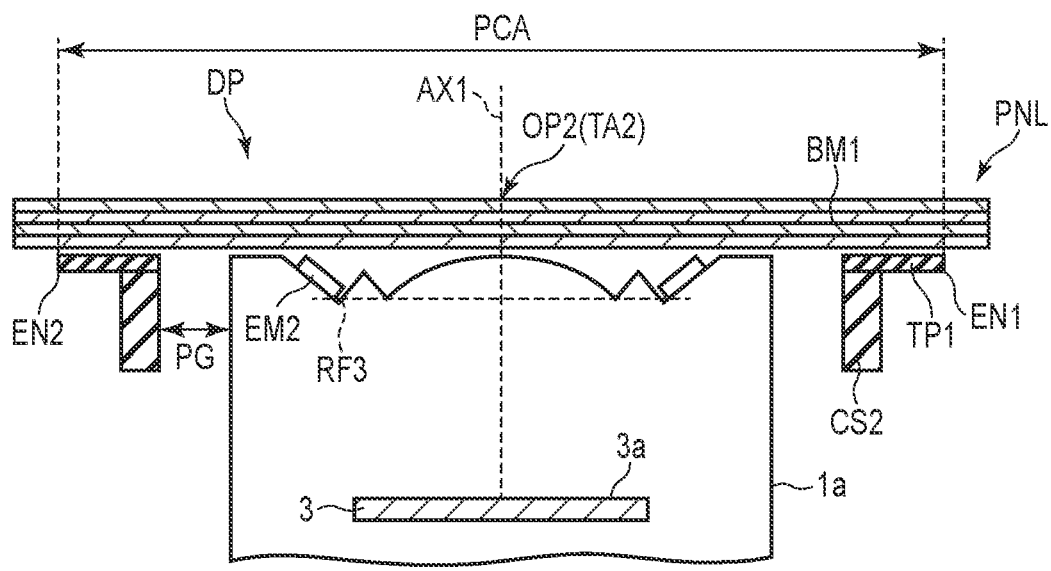
FIG. 28 is a sectional view showing part of the liquid crystal panel, part of the illumination device and the camera according to the second embodiment.

Next is a description of the alignment of the liquid crystal panel PNL and the camera 1. FIG. 28 is a sectional view showing part of the liquid crystal panel PNL, part of the illumination device IL and camera 1a according to the second embodiment.

As shown in FIG. 28, light enters the camera 1 through an aperture whose area is limited by the diaphragm DP. If, therefore, the center of the incident light control area PCA deviates from the central axis AX1 of the optical system 2, there is a problem that required light (visible light) does not reach the imaging surface 3a. It is thus necessary to align the center of the incident light control area PCA with the central axis AX1 with accuracy.

In order to improve the alignment accuracy, the second opening OP2, which is the smallest among the openings of the incident light control area PCA, is used. That is, the diaphragm DP is further narrowed (second condition) and, in the incident light control area PCA, the second incident light control area TA2 is set in a transmissive state, and the first and third incident light control areas TA1 and TA3 are set in a non-transmissive state (FIG. 8).

The light transmitted through the second opening OP2 (second incident light control area TA2) can be detected on the imaging surface 3a by irradiating the liquid crystal panel PNL with parallel light such as laser light and LED light perpendicularly. Then, based on the intensity of light in an area of the imaging surface 3a through which the central axis AX1 passes, a degree of coincidence between the center of the incident light control area PCA and the central axis AX1 can be measured, and the alignment between them can be performed.

If the center of the incident light control area PCA and the central axis AX1 can be aligned with each other with accuracy, a peripheral gap PG between the camera 1a and the light-shielding wall CS2 can be narrowed. Here, the peripheral gap PG refers to a gap from the camera 1a to the light-shielding wall CS2 in a direction parallel to the third reference line RF3. This can decrease the size of the diaphragm DP (incident light control area PCA) including the first light-shielding portion BM1.

In order to narrow the peripheral gap PG, therefore, it is preferable that the inner diameter DI4 (the diameter of the second opening OP2) of the second light-shielding portion BM2 is sufficiently shorter than the peripheral gap PG (DI4<PG) (FIG. 8).

Note that the inner diameter DI4 is preferably 0.1 mm or more in order to prevent diffraction of light (0.1 mm≤DI4) (FIG. 8).

Figure 29:
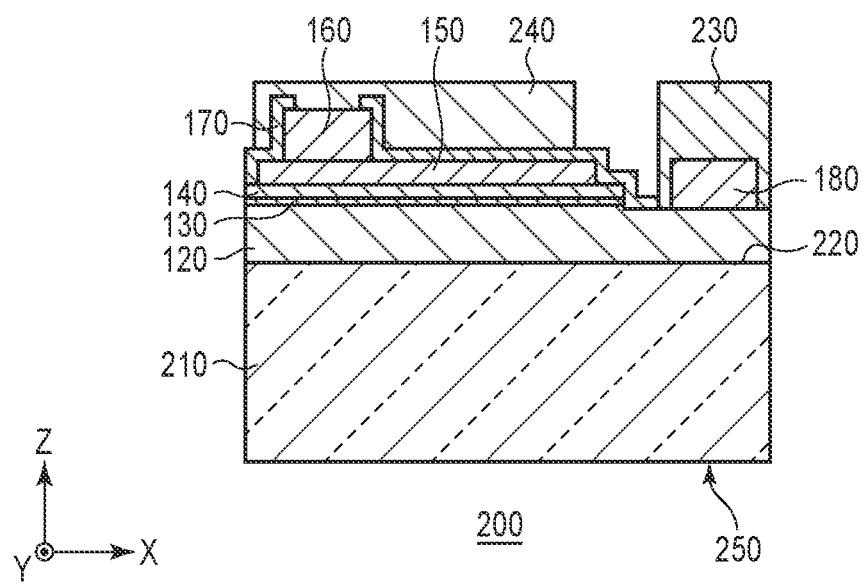
FIG. 29 is a sectional view showing a light source according to the second embodiment.

A mini-LED 200 used as the light sources EM2 and EM3 will be described below with reference to FIG. 29. FIG. 29 is a sectional view showing a light source according to the second embodiment.

As shown in FIG. 29, the mini-LED 200 is a flip-chip type light-emitting diode element and includes a transparent insulative substrate 210. The substrate 210 is, for example, a sapphire substrate. On the surface 220 of the substrate 210, a crystal layer (semiconductor layer) in which an n-type semiconductor layer 120, an active layer (light-emitting layer) 130 and a p-type semiconductor layer 140 are laminated in sequence, is formed. In the crystal layer (semiconductor layer), a region containing P-type impurities is the p-type semiconductor layer 140, and a region containing N-type impurities is the n-type semiconductor layer 120. The material of the crystal layer (semiconductor layer) is not particularly limited, but the crystal layer (semiconductor layer) may include gallium nitride (GaN) or gallium arsenide (GaAs).

A light-reflecting film 150 is formed of a conductive material and is electrically connected to the p-type semiconductor layer 140. A p-electrode 160 is electrically connected to the light-reflecting film 150. An n-electrode 180 is electrically connected to the n-type semiconductor layer 120. A pad 230 covers the n-electrode 180 and is electrically connected to the n-electrode 180. A protective layer 170 covers the n-type semiconductor layer 120, active layer 130, p-type semiconductor layer 140 and light-reflecting film 150, and covers part of the p-electrode 160. A pad 240 covers the p-electrode 160 and is electrically connected to the p-electrode 160.

The length of one side of the mini-LED 200, which is the length in the lateral direction in the figure, is, for example, more than 100 μm and less than 300 μm. As the light emission frequency of the mini-LED 200, 800 nm to 1500 nm of infrared light as well as 400 nm to 700 nm of visible light can be used.

Providing the light source EM2 that emits infrared light and the light source EM3 that emits visible light makes it possible to perform both visible light imaging and infrared light imaging by one camera 1a. For example, the diaphragm DP can be caused to function as a pinhole to capture a super-closeup image for fingerprint authentication and at the same time for vein authentication by infrared light.

The electronic device 100 according to the second embodiment configured as described above is capable of satisfactory imaging.

Third Embodiment

Figure 30:
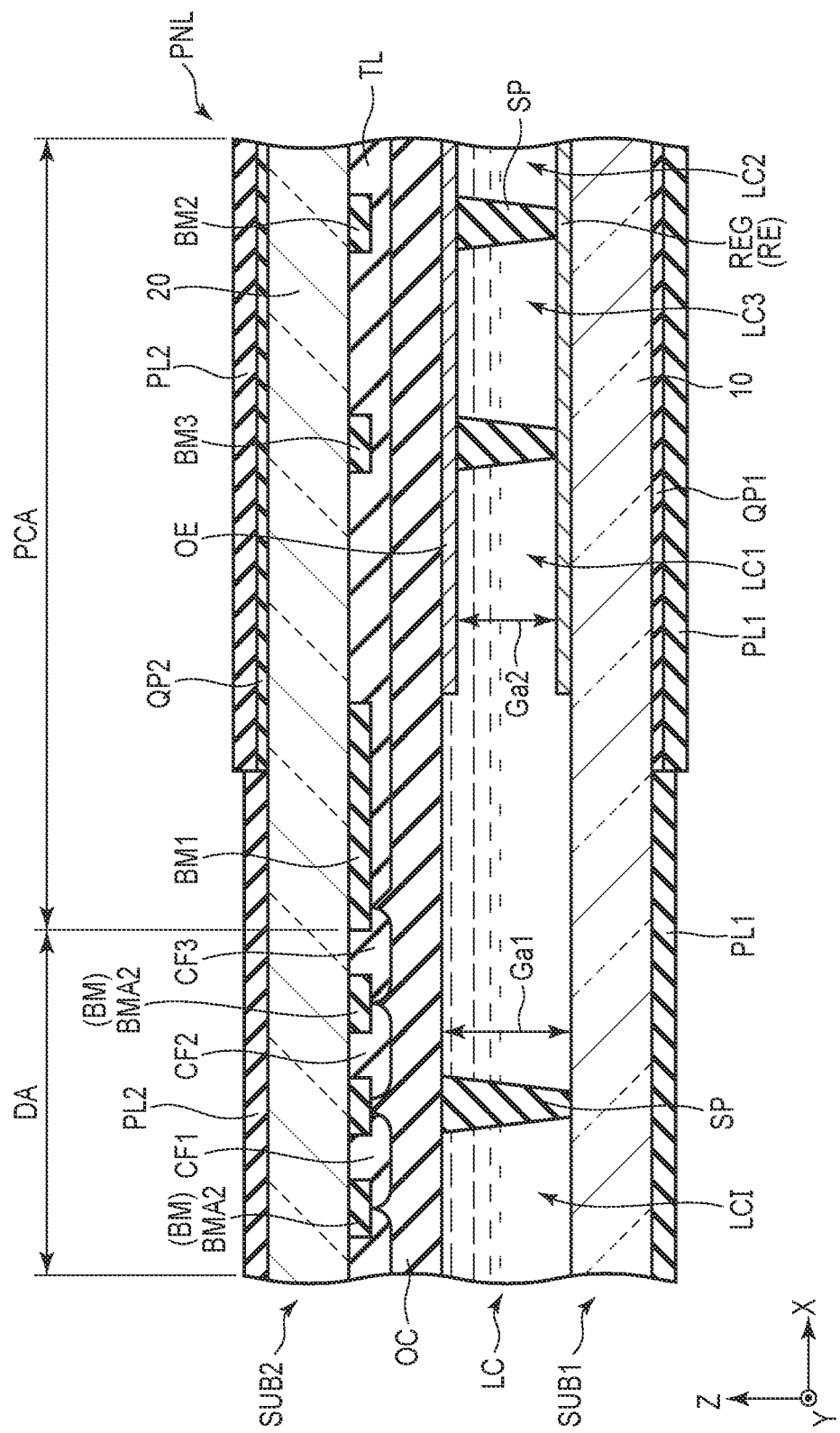
FIG. 30 is a sectional view showing part of a liquid crystal panel of an electronic device according to a third embodiment.

Next is a description of a third embodiment. The electronic device 100 of the third embodiment is configured in the same manner as that of the first embodiment except for the configuration related to a longitudinal electric field mode to be described below. Here is a description of a case in which an incident light control area PCA is formed of electrodes in a longitudinal electric field mode. FIG. 30 is a sectional view showing part of the liquid crystal panel PNL of the electronic device 100 according to the third embodiment. FIG. 30 also shows the vicinity of the boundary between the display area DA and the incident light control area PCA. In addition, only the members necessary for describing the liquid crystal panel PNL are shown, and the foregoing alignment films AL1, AL2 and the like are not shown.

As shown in FIG. 30, in the configuration of the longitudinal electric field mode, a counter-electrode OE is provided on the insulating substrate 20 in addition to the control electrode structure RE provided on the insulating substrate 10. In the longitudinal electric field mode, the liquid crystal layer LC of the incident light control area PCA is driven by a voltage to be applied between the control electrode structure RE and the counter-electrode OE.

A plurality of spacers SP are provided between the insulating substrates 10 and 20. The spacers SP hold a first gap Ga1 between the first and second substrates SUB1 and SUB2 in the display area DA and a second gap Ga2 between the first and second substrates SUB1 and SUB2 in the incident light control area PCA. In the display area DA, the spacers SP are covered with a light-shielding portion BMA2 (light-shielding portion BMA). In the incident light control area PCA, the spacer SP is covered with a second light-shielding portion BM2 or a third light-shielding portion BM3.

In the incident light control area PCA, first, second and third control liquid crystal layers LC1, LC2 and LC3 are driven in an electrically controlled birefringence (ECB) mode among the longitudinal electric field modes, and thus a quarter-wave plate QP2 is interposed between the polarizer PL2 and the insulating substrate 20, and a quarter-wave plate QP1 is interposed between the polarizer plate PL1 and the insulating substrate 10.

The polarizers PL1 and PL2 are common to each other in the display area DA and incident light control area PCA. The transmission easy axes (polarizing axes) of the polarizers PL1 and PL2 are directed in the same direction in the display area DA and the incident light control area PCA. The transmission easy axis of the polarizer PL1 and that of the polarizer PL2 are orthogonal to each other.

On the other hand, in the display area DA, the display liquid crystal layer LCI is driven in the lateral electric field mode. The display liquid crystal layer LCI is driven in the FFS mode, but may be driven in the IPS mode. In the display area DA, the alignment axis (fast axis) of the liquid crystal molecules is orthogonal to or parallel to the transmission easy axis of the polarizer PL1 (or polarizer PL2) in a state where no voltage is applied between the pixel electrode PE and the common electrode CE. Therefore, in a state where no voltage is applied to the display liquid crystal layer LCI, no retardation is generated in the display liquid crystal layer LCI, with the result that light is blocked because the transmission easy axes of the polarizers PL2 and PL1 are orthogonal to each other (normally black mode).

When a voltage is applied between the pixel electrode PE and the common electrode CE, the liquid crystal molecules rotate and their fast axes have an angle with respect to the polarization direction of linearly polarized light, resulting in a retardation. In the display liquid crystal layer LCI, a birefringence index $\Delta n$ and a gap Ga are adjusted ($\Delta n \times Ga=\frac{1}{2} \lambda$) such that the retardation becomes n when the liquid crystal molecules rotate (the fast axes are inclined 45° with respect to the polarization direction). The light transmitted through the display liquid crystal layer LCI changes from linearly polarized light, which is parallel to the transmission easy axis of the polarizer PL1, to linearly polarized light inclined 90° with respect to the transmission easy axis of the polarizer PL1. In the display area DA, therefore, a voltage is applied between the pixel electrode PE and the common electrode CE to transmit light.

In both the display area DA and incident light control area PCA, the same liquid crystal layer LC and the same polarizers PL1 and PL2 are used, and the alignment axes of the liquid crystal molecules are also in the same direction. Accordingly, the retardation of the liquid crystal layer LC is the same, and the alignment axis of the liquid crystal molecules with respect to the transmission easy axis of the polarizers PL1 and PL2 is the same.

In the incident light control area PCA, therefore, the quarter-wave plates QP2 and QP1 are interposed between the polarizers PL2 and PL1. The slow axis of the quarter-wave plate QP2 is inclined 45° with respect to the transmission easy axis of the polarizer PL2, and the slow axis of the quarter-wave plate QP1 is inclined 45° with respect to the transmission easy axis of the polarizer PL1. The light transmitted through the quarter-wave plates QP2 and QP1 changes from linearly polarized light to circularly polarized light, or changes from circularly polarized light to linearly polarized light.

The slow axis of the quarter-wave plate QP1 is inclined +45° with respect to the transmission easy axis of the polarizer PL1, and the linearly polarized light emitted from the polarizer PL1 changes to circularly polarized light in a clockwise direction. In the first, second and third control liquid crystal layers LC1, LC2 and LC3, the birefringence $\Delta n$ and the second gap Ga2 are adjusted such that the retardation becomes n ($\Delta n \times Ga2=\frac{1}{2}\lambda$), and the clockwise circularly polarized light changes to the counterclockwise circularly polarized light.

The slow axis of the quarter-wave plate QP2 is inclined −45° with respect to the transmission easy axis of the polarizer PL1, and the light transmitted through the quarter-wave plate QP2 becomes linearly polarized light inclined 90° with respect to the transmission easy axis of the polarizer PL1, and is transmitted through the polarizer PL2.

The first substrate SUB1 is provided with a control electrode structure group REG located in the incident light control area PCA and including a plurality of control electrode structures RE. The second substrate SUB2 is provided with a counter-electrode OE located in the incident light control area PCA and opposed to the control electrode structure group REG. Thus, light is transmitted through the incident light control area PCA in a state where no voltage is applied between the control electrode structures RE and the counter-electrode OE (normally white mode). Note that the second substrate SUB2 includes a transparent layer TL in place of the color filter CF in the incident light control area PCA.

In the ECB mode, a voltage is applied between the control electrode structures RE and the counter-electrode OE to align the liquid crystal molecules along a direction perpendicular to the first and second substrates SUB1 and SUB2, thereby controlling the amount of transmitted light using a change in the birefringence ($\Delta n$) of the liquid crystal molecules.

Since a voltage is applied between the control electrode structures RE and the counter-electrode OE and the longitudinal-axis direction of the liquid crystal molecules is along the direction perpendicular to the first and second substrates SUB1 and SUB2, the birefringence is decreased with respect to transmitted light and the amount of transmitted light is reduced.

For example, when the birefringence $\Delta n$ becomes 0 and the retardation becomes 0, the light transmitted through the first, second and third control liquid crystal layers LC1, LC2 and LC3 remains circularly polarized light in the clockwise direction, and the circularly polarized light in the clockwise direction transmitted through the quarter-wave plate QP2 becomes linearly polarized light parallel to the transmission easy axis of the polarizer PL1, and is not transmitted through the polarizer PL2. If, therefore, a voltage is applied between the control electrode structures RE and the counter-electrode OE, the light incident upon the camera 1 by the diaphragm DP can be reduced (non-transmissive state).

FIG. 31 is a plan view showing a light-shielding layer BM in the incident light control area PCA of a liquid crystal panel PNL according to the third embodiment. The first, second and third incident light control areas TA1, TA2 and TA3 are each divided into two ranges.

As shown in FIG. 31, the first incident light control area TA1 includes a first range TA1a and a second range TA1b other than the first range TA1a. The second incident light control area TA2 includes a third range TA2a and a fourth range TA2b other than the third range TA2a. The third incident light control area TA3 includes a fifth range TA3a and a sixth range TA3b other than the fifth range TA3a.

In the third embodiment, the first and second ranges TA1a and TA1b are adjacent to each other in the direction Y, the third and fourth ranges TA2a and TA2b are adjacent to each other in the direction Y, and the fifth and sixth ranges TA3a and TA3b are adjacent to each other in the direction Y. The boundary of the first and second ranges TA1a and TA1b, that of the third and fourth ranges TA2a and TA2b, and that of the fifth and sixth ranges TA3a and TA3b are aligned in the direction X.

The incident light control area PCA can be divided into a first area A1 and a second area A2 according to the diameter of a circle formed by the outer periphery of the first light-shielding portion BM1. In the third embodiment, the first area A1 includes the first, third and sixth ranges TA1a, TA2a and TA3b. The second area A2 includes the second, fourth and fifth ranges TA1b, TA2b and TA3a.

However, the method of dividing each of the first, second and third incident light control areas TA1, TA2 and TA3 into two ranges is exemplified in the third embodiment, and can be modified variously.

Next is a description of the configuration of the first, second, third, fourth, fifth and sixth control electrode structures RE1, RE2, RE3, RE4, RE5 and RE6, and the counter-electrode OE when the first, second and third control liquid crystal layers LC1, LC2 and LC3 are driven in the longitudinal electric field mode in the incident light control area PCA. FIG. 32 is a plan view showing a plurality of control electrode structures RE and a plurality of lead lines L of the first substrate SUB1 according to the third embodiment.

As shown in FIGS. 32 and 31, the first control electrode structure RE1 includes a first feed line CL1 located in the first light-shielding area LSA1 and a first control electrode RL1 located in the first light-shielding area LSA1 and the first range TA1a. The first feed line CL1 includes a first wiring line WL1. In the third embodiment, the first wiring line WL1 and the first control electrode RL1 are formed integrally as one unit.

The second control electrode structure RE2 includes a second feed line CL2 located in the first light-shielding area LSA1 and a second control electrode RL2 located in the first light-shielding area LSA1 and the second range TA1b. The second feed line CL2 includes a second wiring line WL2. In the third embodiment, the second wiring line WL2 and the second control electrode RL2 are formed integrally as one unit.

The third control electrode structure RE3 includes a third feed line CL3 located in the second light-shielding area LSA2 and a third control electrode RL3 located in the second light-shielding area LSA2 and the third range TA2a. The third feed line CL3 includes a third wiring line WL3.

The fourth control electrode structure RE4 includes a fourth feed line CL4 located in the second light-shielding area LSA2 and a fourth control electrode RL4 located in the second light-shielding area LSA2 and the fourth range TA2b. The fourth feed line CL4 includes a fourth wiring line WL4.

The fifth control electrode structure RE5 includes a fifth feed line CL5 located in the third light-shielding area LSA3 and a fifth control electrode RL5 located in the third light-shielding area LSA3 and the fifth range TA3a. The fifth feed line CL5 includes a fifth wiring line WL5. In the third embodiment, the fifth wiring line WL5 and the fifth control electrode RL5 are formed integrally as one unit.

The sixth control electrode structure RE6 includes a sixth feed line CL6 located in the third light-shielding area LSA3 and a sixth control electrode RL6 located in the third light-shielding area LSA3 and the sixth range TA3b. The sixth feed line CL6 includes a sixth wiring line WL6. In the third embodiment, the sixth wiring line WL6 and the sixth control electrode RL6 are formed integrally as one unit.

Note that in the third embodiment, the first, third and fifth control electrode structures RE1, RE3 and RE5 are located between the insulating layer 13 and the alignment film AL1. The second, fourth and sixth control electrode structures RE2, RE4 and RE6 are located between the insulating layers 12 and 13.

Figure 33:
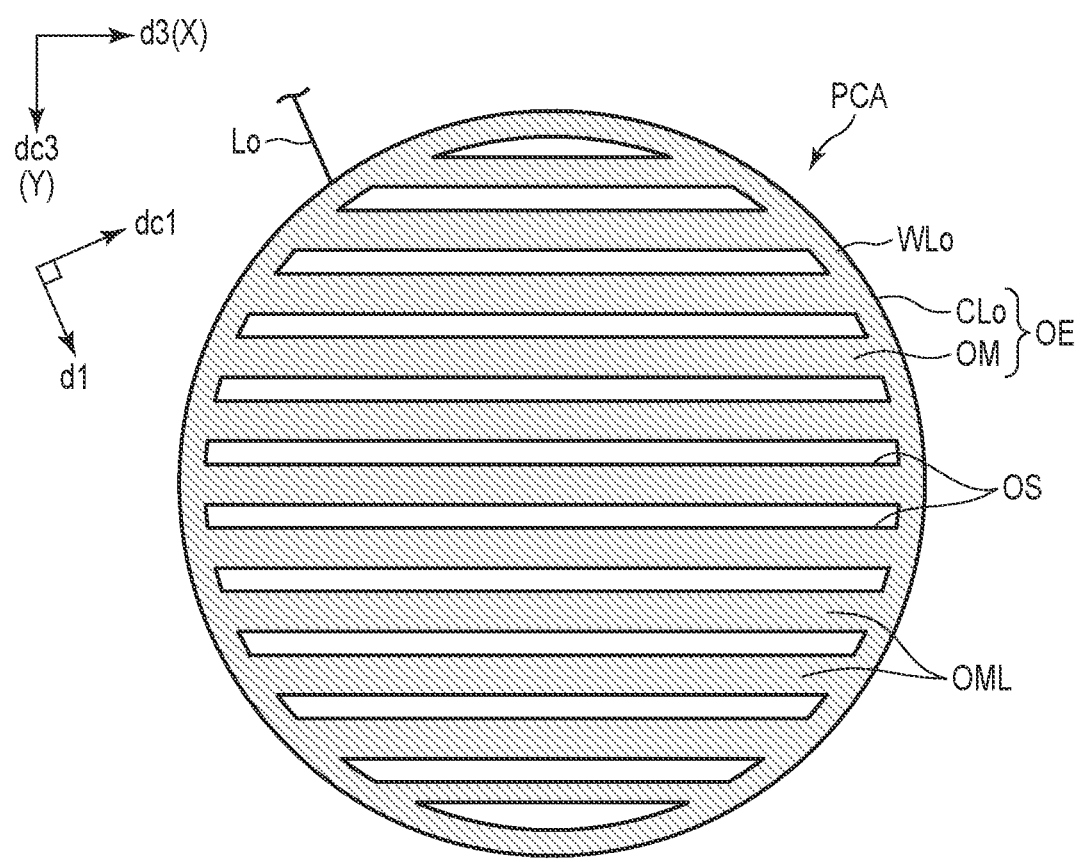
FIG. 33 is a plan view showing a counter-electrode and a lead line of a second substrate according to the third embodiment.

FIG. 33 is a plan view showing a counter-electrode OE and a lead line Lo of a second substrate SUB2 according to the third embodiment. As shown in FIGS. 33 and 31, the counter-electrode OE is located in the incident light control area PCA. The counter-electrode OE includes a counter-feed line CLo located in the first light-shielding area LSA1 and a counter-electrode body OM located in the incident light control area PCA. The counter-feed line CLo includes a counter-line WLo having an annular shape. In the third embodiment, the counter-line WLo and the counter-electrode body OM are formed of a transparent conductive material such as ITO.

The counter-electrode body OM includes a plurality of linear counter-electrodes OML. The linear counter-electrodes OML are located in the incident light control area PCA, electrically connected to the counter-line WLo, linearly extended in the third extending direction d3, and arranged at intervals in the orthogonal direction dc3 that is orthogonal to the third extending direction d3.

In the third embodiment, the counter-line WLo and the linear counter-electrode OML are formed integrally as one unit. The third extending direction d3 is the same as the direction X, and the orthogonal direction dc3 is the same as the direction Y. As is seen from the above, the counter-electrode OE includes a plurality of slits OS extending in the third extending direction d3 and arranged at intervals in the orthogonal direction dc3.

In the incident light control area PCA, the lead line Lo extends in the first extending direction d1. The lead line Lo is formed of metal and electrically connected to the counter-line WLo. The lead line Lo extends in an area covered with one light-shielding portion (BMA2) in the display area DA. However, the lead line Lo has only to extend at least one of the light-shielding portion BMA1 and the light-shielding portion BMA2 in the display area DA.

Note that the counter-feed line CLo and the lead line Lo each may be formed of a laminated layer body of a transparent conductive layer and a metal layer.

A voltage to be applied to the counter-electrode OE via the lead line Lo will be defined as a counter-voltage. Note that the voltage to be applied to the counter-electrode (second common electrode) OE may also be referred to as a common voltage.

Figure 34:
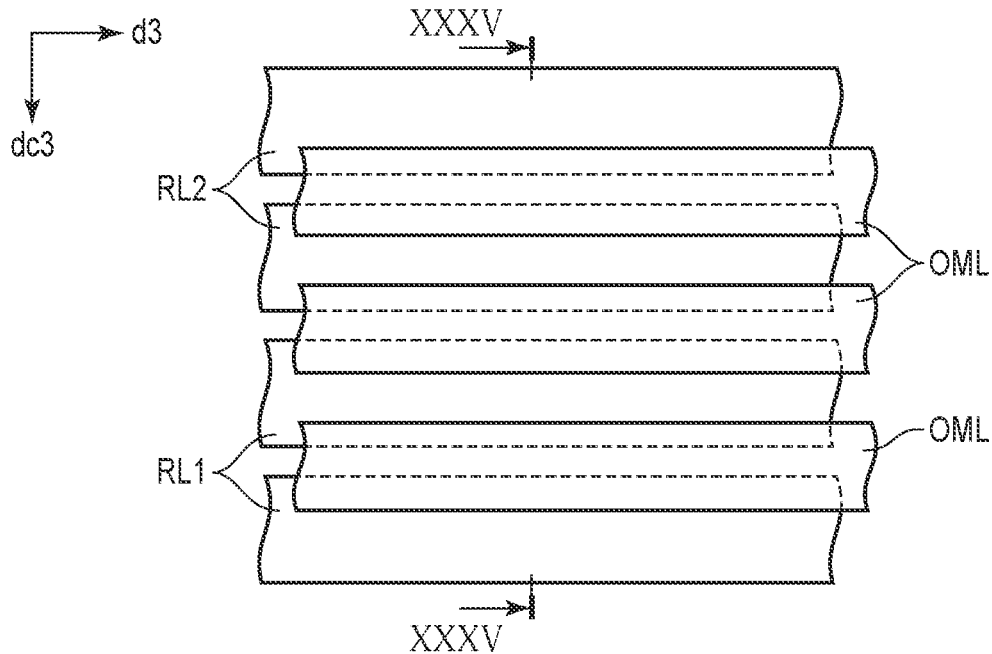
FIG. 34 is a plan view showing a plurality of first control electrodes, a plurality of second control electrodes and a plurality of linear counter-electrodes according to the third embodiment.

FIG. 34 is a plan view showing a plurality of first control electrodes RL1, a plurality of second control electrodes RL2 and a plurality of linear counter-electrodes OML according to the third embodiment.

As shown in FIG. 34, the first control electrodes RL1 are located in the first light-shielding area LSA1 and the first range TA1a, electrically connected to the first wiring line WL1, linearly extended in the third extending direction d3, and arranged at intervals in the orthogonal direction dc3. The second control electrodes RL2 are located in the first light-shielding area LSA1 and the second range TA1b, electrically connected to the second wiring line WL2, extended linearly in the third extending direction d3, and arranged at intervals in the orthogonal direction dc3.

The first and second control electrodes RL1 and RL2 each have a stripe-shaped portion having a side along the above-described diameter by which the first and second areas A1 and A2 are separated from each other.

Figure 35:
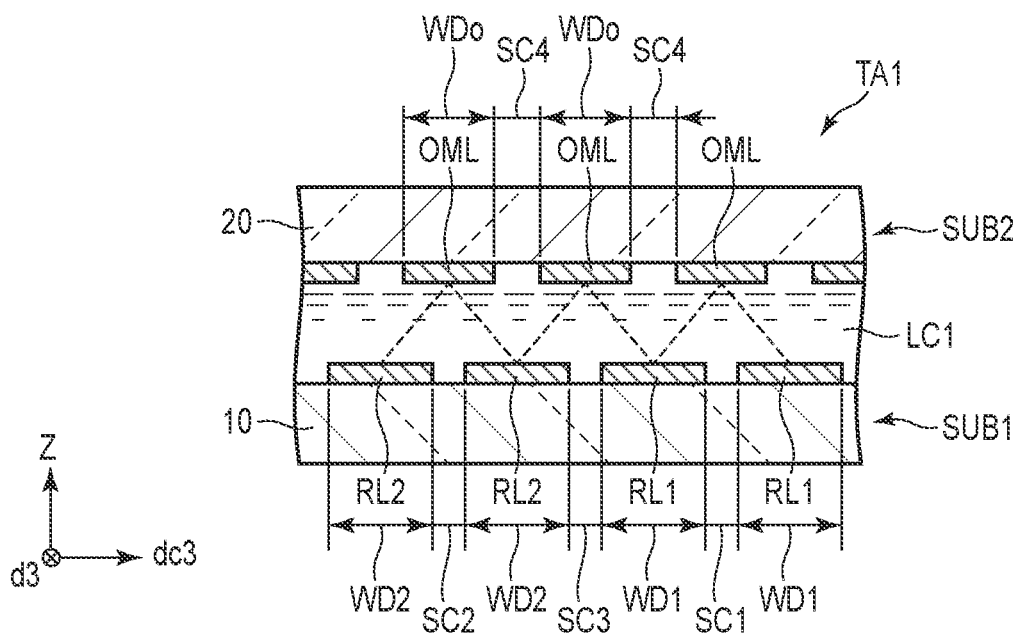
FIG. 35 is a sectional view showing a liquid crystal panel along line XXXV-XXXV of FIG. 34 and also showing insulating substrate, the first control electrodes, the second control electrodes, the linear counter-electrodes, and the first control liquid crystal layer.

FIG. 35 is a sectional view showing a liquid crystal panel PNL along line XXXV-XXXV of FIG. 34, and also showing the insulating substrates 10 and 20, first control electrodes RL1, second control electrodes RL2, linear counter-electrodes OML and first control liquid crystal layer LC1. FIG. 35 shows only the configuration necessary for the description.

As shown in FIG. 35, a first gap SC1 between adjacent two first control electrodes RL1 is opposed to its corresponding one of the linear counter-electrodes OML. A second gap SC2 between adjacent two second control electrodes RL2 is opposed to its corresponding one of the linear counter-electrodes OML. A third gap SC3 between adjacent first and second control electrodes RL1 and RL2 is opposed to its corresponding one of the linear counter-electrodes OML. A fourth gap SC4 between adjacent two linear counter-electrodes OML is opposed to its corresponding one of the first control electrodes RL1 or its corresponding one of the second control electrode RL2.

In the orthogonal direction dc3, the width WD1 of each of the first control electrodes RL1 and the width WD2 of each of the second control electrodes RL2 are each 390 µm, and the first, second and third gaps SC1, SC2 and SC3 are each 10 µm. Furthermore, in the orthogonal direction dc3, the width WDo of each of the linear counter electrodes OML is 390 µm, and the fourth gap SC4 is 10 µm.

The pitch between the first control electrodes RL1, the pitch between the first control electrode RL1 and the second control electrode RL2, and the pitch between the second control electrodes RL2 in the orthogonal direction dc3, and the pitch between the linear counter-electrodes OML may be set randomly, as in the first embodiment (FIG. 10).

When the first and second control electrode structures RE1 and RE2 and the counter-electrode OE are driven under the first condition (condition for opening the diaphragm DP), the liquid crystal panel PNL sets the first incident light control area TA1 to a transmissive state. The first control voltage applied to the first control electrode structures RE1 and the second control voltage applied to the second control electrode structures RE2 are each the same as the counter-voltage applied to the counter-electrode OE.

On the other hand, when the first and second control electrode structures RE1 and RE2 and the counter-electrode OE are driven under the third condition (condition for narrowing the diaphragm DP), the second condition (condition for narrowing the diaphragm DP further) and the fourth condition (condition for closing the diaphragm DP), the liquid crystal panel PNL sets the first incident light control area TA1 to a non-transmissive state.

Paying attention to part of the period during which the first control liquid crystal layer LC1 is driven, one of the first and second control voltages becomes more positive than the counter-voltage. During this period, the other of the first and second control voltages becomes more negative than the counter-voltage. The polarities of the first and second control voltages are different from each other with respect to the counter-voltage.

Thus, the polarity of a voltage generated between the first control electrode structures RE1 and the counter-electrode OE and applied to the first control liquid crystal layer LC1 and the polarity of a voltage generated between the second control electrode structures RE2 and the counter-electrode OE and applied to the first control liquid crystal layer LC1 are different from each other. The influence of a change in potential of the counter-electrode OE, which is caused by a change in potential of the first control electrode structures RE1 and the influence of a change in potential of the counter-electrode OE, which is caused by a change in potential of the second control electrode structures RE2 cancel each other. Thus, an undesired change in potential of the counter-electrode OE can be suppressed.

In the third embodiment, an absolute value of a difference between the counter-voltage and the first control voltage is the same as that of a difference between the counter-voltage and the second control voltage. Thus, an undesired change in potential of the counter-electrode OE can be further suppressed.

Note that unlike in the third embodiment, when the first and second control voltages have the same polarity with respect to the counter-voltage, an undesirable change in potential of the counter-electrode OE is caused, which is undesirable.

As described above, during the period in which the first control liquid crystal layer LC1 is driven under the second to fourth conditions, polarity inversion driving may be performed to invert the polarities of the first and second control voltages with the counter-voltage as a reference. During the above period, the counter-voltage is a constant voltage.

The positional relationship between each of the first, second and third gaps SC1, SC2 and SC3 and the linear counter-electrodes OML has been described above. The positional relationship between the fourth gap SC4 and each of the first and second control electrodes RL1 and RL2 has been described above. During the period in which the first control liquid crystal layer LC1 is driven under the second to fourth conditions, an oblique electric field can be generated between the first control electrodes RL1 and the linear counter-electrodes OML, and an oblique electric field can be generated between the second control electrodes RL2 and the linear counter-electrodes OML. Therefore, the rising direction of liquid crystal molecules of the first control liquid crystal layer LC1 can be controlled more than in the case where the electric field is parallel to the direction Z. In the figure, the electric field is indicated by dashed lines.

Figure 36:
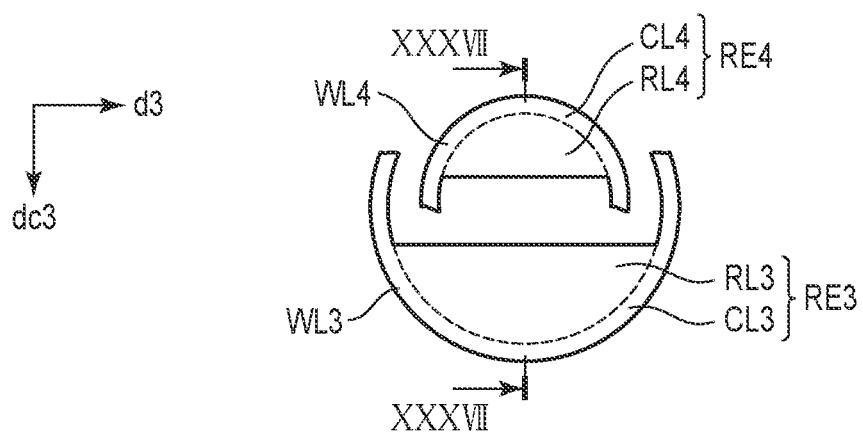
FIG. 36 is a plan view showing a third control electrode structure and a fourth control electrode structure of the third embodiment.

FIG. 36 is a plan view showing the third and fourth control electrode structures RE3 and RE4 of the third embodiment.

As shown in FIG. 36, each of the third and fourth control electrodes RL3 and RL4 has a semicircular shape having a side parallel to the third extending direction d3. The side of each of the third and fourth control electrodes RL3 and RL4 is along the foregoing diameter by which the first and second areas A1 and A2 are separated from each other. The third and fourth control electrodes RL3 and RL4 are arranged at intervals in the orthogonal direction dc3.

As shown in FIGS. 36 and 32, the inner diameter of the third wiring line WL3 is smaller than that of the sixth wiring line WL6. The inner diameter of the fourth wiring line WL4 is smaller than that of the third wiring line WL3.

Figure 37:
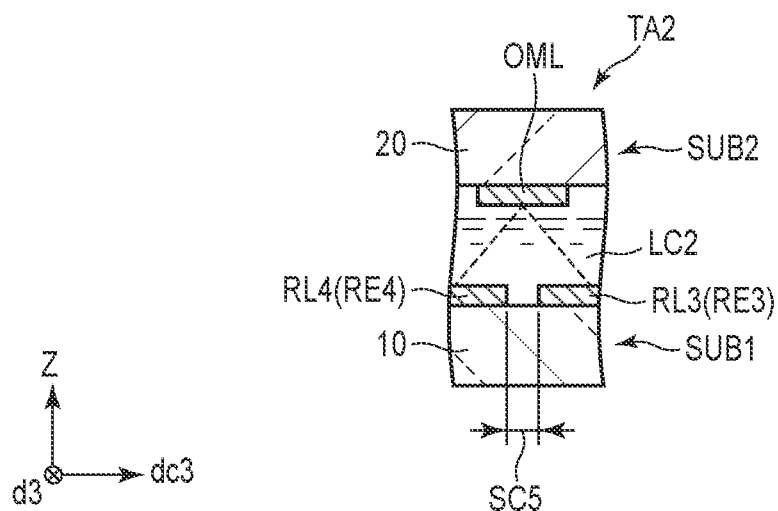
FIG. 37 is a sectional view showing a liquid crystal panel along line XXXVII-XXXVII of FIG. 36 and also showing insulating substrates, the third control electrode structure, the fourth control electrode structure, a linear counter-electrode and a second control liquid crystal layer.

FIG. 37 is a sectional view showing the liquid crystal panel PNL along lines XXXVII-XXXVII of FIG. 36, also showing the insulating substrates 10 and 20, third control electrode structure RE3, fourth control electrode structure RE4, linear counter-electrode OML, and second control liquid crystal layer LC2. Note that FIG. 37 shows only the configuration necessary for the description.

As shown in FIG. 37, the fifth gap SC5 between adjacent third and fourth control electrodes RL3 and RL4 is opposed to its corresponding one of the linear counter-electrodes OML. The fifth gap SC5 is aligned with the third gap SC3 in the third extending direction d3 (FIGS. 32 and 35).

When the third and fourth control electrode structures RE3 and RE4 and counter-electrode OE are driven under the first, second and third conditions, the liquid crystal panel PNL sets the second incident light control area TA2 to the transmissive state. The third control voltage applied to the third control electrode structure RE3 and the fourth control voltage applied to the fourth control electrode structure RE4 are each the same as the counter-voltage applied to the counter-electrode OE.

On the other hand, when the third and fourth control electrode structures RE3 and RE4 and counter-electrode OE are driven under the fourth condition, the liquid crystal panel PNL sets the second incident light control area TA2 in a non-transmissive state.

Paying attention to part of the period during which the second control liquid crystal layer LC2 is driven, one of the third and fourth control voltages becomes more positive than the counter-voltage. During this period, the other of the third and fourth control voltages becomes more negative than the counter-voltage.

Thus, the polarity of a voltage generated between the third control electrode structure RE3 and the counter-electrode OE and applied to the second control liquid crystal layer LC2 and the polarity of a voltage generated between the fourth control electrode structures RE4 and the counter-electrode OE and applied to the second control liquid crystal layer LC2 are different from each other. In the third embodiment, an absolute value of a difference between the counter-voltage and the third control voltage is the same as that of a difference between the counter-voltage and the fourth control voltage.

Note that unlike in the third embodiment, when the third and fourth control voltages have the same polarity with respect to the counter-voltage, an undesirable change in potential of the counter-electrode OE is caused, which is undesirable.

As described above, during the period in which the second control liquid crystal layer LC2 is driven under the fourth condition, polarity inversion driving may be performed to invert the polarities of the third and fourth control voltages with the counter-voltage as a reference. During the above period, the counter-voltage is a constant voltage. When the third and fourth control electrode structures RE3 and RE4 are driven under the first condition, polarity inversion driving of the third and fourth control electrode structures RE3 and RE4 may be performed in synchronization with the polarity inversion driving of the first and second control electrode structures RE1 and RE2.

The positional relationship between the fifth gap SC5 and the linear counter-electrodes OML has been described above. Therefore, the rising direction of liquid crystal molecules of the second control liquid crystal layer LC2 can be controlled more than in the case where an electric field generated between the third control electrode RL3 and the linear counter-electrode OML and an electric field generated between the fourth control electrode RL4 and the linear counter-electrode OML are parallel to the direction Z.

Figure 38:
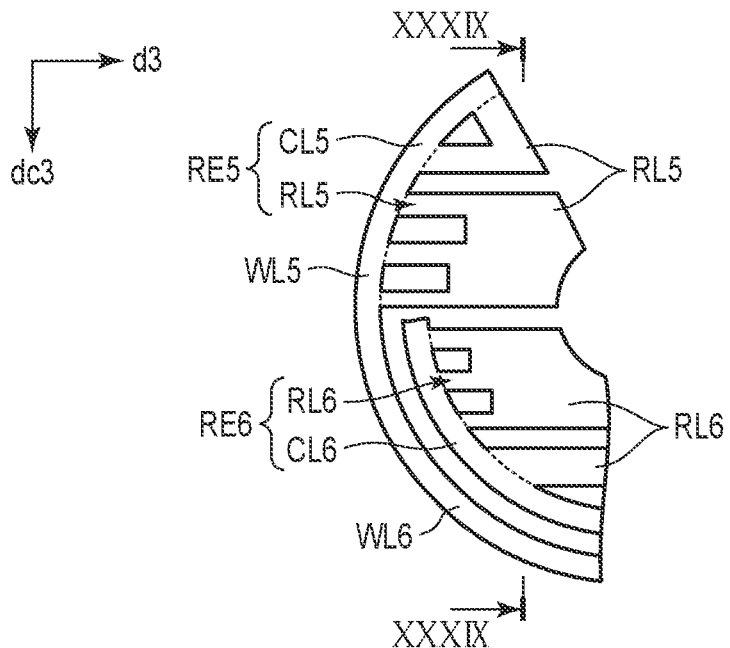
FIG. 38 is a plan view showing a fifth control electrode structure and a sixth control electrode structure according to the third embodiment.

FIG. 38 is a plan view showing a fifth control electrode structure RE5 and a sixth control electrode structure RE6 of the third embodiment.

As shown in FIG. 38, a plurality of fifth control electrodes RL5 are located in the third light-shielding area LSA3 and the fifth range TA3a, electrically connected to the fifth wiring line WL5, extended linearly in the third extension direction d3, and arranged at intervals in the orthogonal direction dc3. A plurality of sixth control electrodes RL6 are located in the first light-shielding area LSA1 and the sixth range TA3b, electrically connected to the sixth wiring line WL6, extended linearly in the third extension direction d3, and arranged at intervals in the orthogonal direction dc3.

The fifth wiring line WL5 and the sixth control electrode RL6 have a stripe-shaped portion having a side along the foregoing diameter by which the first and second areas A1 and A2 are separated from each other.

Figure 39:
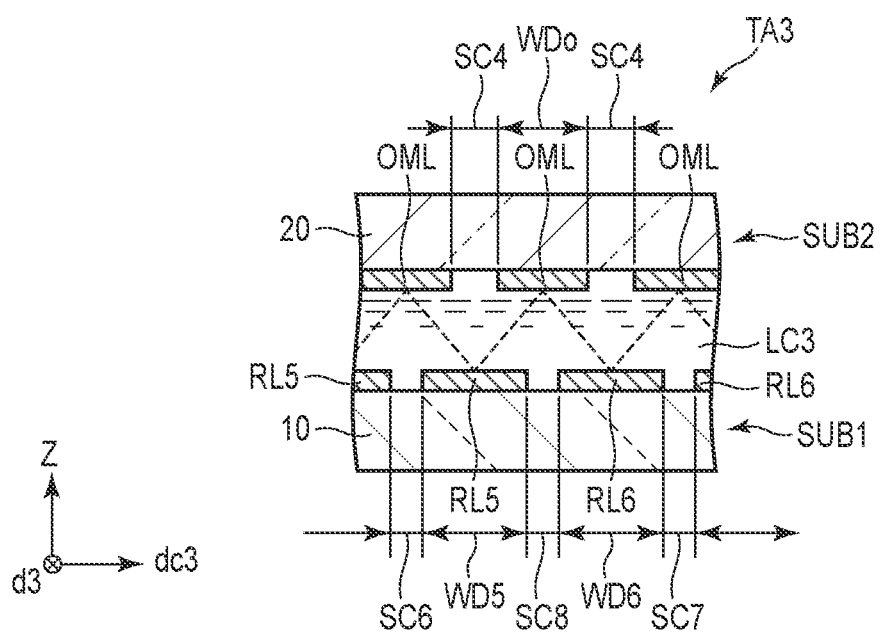
FIG. 39 is a sectional view showing a liquid crystal panel along line XXXIX-XXXIX of FIG. 38 and also showing insulating substrates, a plurality of fifth control electrodes, a plurality of sixth control electrodes, a plurality of linear counter-electrodes and a third control liquid crystal layer.

FIG. 39 is a sectional view showing a liquid crystal panel PNL along line XXXIX-XXXIX of FIG. 38 and showing insulating substrates 10 and 20, a plurality of fifth control electrodes RL5, a plurality of sixth control electrodes RL6, a plurality of linear counter-electrodes OML and a third control liquid crystal layer LC3. Note that FIG. 39 shows only the configuration necessary for the description.

As shown in FIG. 39, a sixth gap SC6 between adjacent two fifth control electrodes RL5 is opposed to its corresponding one of the linear counter-electrodes OML. A seventh gap SC7 between adjacent two sixth control electrodes RL6 is opposed to its corresponding one of the linear counter-electrodes OML. An eighth gap SC8 between adjacent two fifth and sixth control electrodes RL5 and RL6 is opposed to its corresponding one of the linear counter-electrodes OML. The fourth gap SC4 is opposed to its corresponding of the fifth control electrodes RL5 or its corresponding one of the sixth control electrodes RL6.

The eighth gap SC8 is aligned with the third and fifth gaps SC3 and SC5 in the third extending direction d3 (FIGS. 32, 35 and 37). The sixth gap SC6 is aligned with the second gap SC2 in the third extending direction d3 (FIGS. 32 and 35). The seventh gap SC7 is aligned with the first gap SC1 in the third extending direction d3 (FIGS. 32 and 35).

In the orthogonal direction dc3, the width WD5 of the fifth control electrode RL5 and the width WD6 of the sixth control electrode RL6 are each 390 μm, and the sixth, seventh and eighth gaps SC6, SC7 and SC8 are each 10 μm.

Note that the pitches between the fifth and sixth control electrodes RL5 and RL6 in the orthogonal direction dc3 may be set randomly, as in the first embodiment (FIG. 10).

When the fifth and sixth control electrode structures RE5 and RE6 and the counter-electrode OE are driven under the first and third conditions, the liquid crystal panel PNL sets the third incident light control area TA3 to a transmissive state. The fifth control voltage applied to the fifth control electrode structure RE5 and the sixth control voltage applied to the sixth control electrode structure RE6 are each the same as the counter-voltage applied to the counter electrode OE.

On the other hand, when the fifth and sixth control electrode structures RE5 and RE6 and the counter-electrode OE are driven under the second and fourth conditions, the liquid crystal panel PNL sets the third incident light control area TA3 to a non-transmissive state.

Paying attention to part of the period during which the third control liquid crystal layer LC3 is driven, one of the fifth and sixth control voltages becomes more positive than the counter-voltage. During this period, the other of the fifth and sixth control voltages becomes more negative than the counter-voltage.

Therefore, the polarity of a voltage generated between the fifth control electrode structure RE5 and the counter-electrode OE and applied to the third control liquid crystal layer LC3 and the polarity of a voltage generated between the sixth control electrode structure RE6 and the counter-electrode OE and applied to the third control liquid crystal layer LC3 are different from each other. In the third embodiment, the absolute value of a difference between the counter-voltage and the fifth control voltage is the same as that of a difference between the counter-voltage and the sixth control voltage.

Note that unlike in the third embodiment, when the fifth and sixth control voltages have the same polarity with respect to the counter-voltage, an undesirable change in potential of the counter-electrode OE is caused, which is undesirable.

As described above, during the period in which the third control liquid crystal layer LC3 is driven under the second and fourth conditions, polarity inversion driving may be performed to invert the polarities of the fifth and sixth control voltages with the counter-voltage as a reference. During the above period, the counter-voltage is a constant voltage. When the fifth and sixth control electrode structures RE5 and RE6 are driven under the second and fourth conditions, polarity inversion driving of the fifth and sixth control electrode structures RE5 and RE6 may be performed in synchronization with that of the first and second control electrode structures RE1 and RE2.

In addition, the positional relationship between each of the sixth, seventh and eighth gaps SC6, SC7 and SC8 and the linear counter-electrode OML has been described above. Thus, the rising direction of liquid crystal molecules of the third control liquid crystal layer LC3 can be controlled more than the case where an electric field generated between the fifth control electrode RL5 and the linear counter-electrode OML and an electric field generated between the sixth control electrode RL6 and the linear counter-electrode OML are parallel to the direction Z.

According to the liquid crystal display device DSP and electronic device 100 according to the third embodiment configured as described, the light transmissive area of the incident light control area PCA can be controlled. In addition, an image can be captured satisfactorily.

Fourth Embodiment

Figure 40:
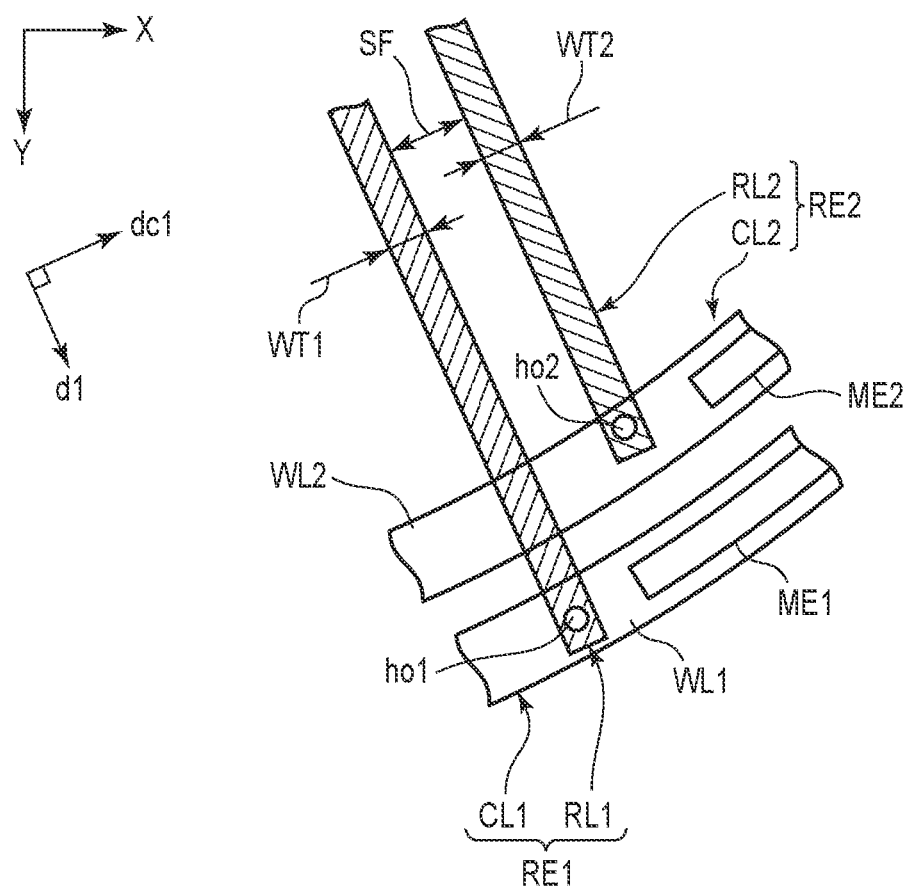
FIG. 40 is a plan view showing a first control electrode structure and a second control electrode structure of a liquid crystal panel of an electronic device according to a fourth embodiment.

Next is a description of a fourth embodiment. The electronic device 100 is configured in the same manner as in the first embodiment except for the configuration described in the fourth embodiment. FIG. 40 is a plan view showing a first control electrode structure RE1 and a second control electrode structure RE2 of a liquid crystal panel PNL of the electronic device 100 according to the fourth embodiment. The first and second control electrode structures RE1 and RE2 are formed of the same conductive layer. Note that FIG. 40 shows only the configuration necessary for the description.

As shown in FIG. 40, a first wiring line WL1, a first control electrode RL1, a second wiring line WL2 and a second control electrode RL2 are each formed of a transparent conductive material such as ITO. An insulating layer 13 is interposed between one or more conductors among the first wiring line WL1, first control electrode RL1, second wiring line WL2 and second control electrode RL2 and the remaining conductors among them (FIG. 10).

The one or more conductors are provided on the same layer as one of a pixel electrode PE and a common electrode CE and formed of the same material as the one of the electrodes (FIG. 7). The remaining conductors are provided on the same layer as the other of the electrodes and formed of the same material as the other of the electrodes (FIG. 7).

In the fourth embodiment, the insulating layer 13 is interposed between a wiring line group of the first and second wiring lines WL1 and WL2 and an electrode group of the first and second control electrodes RL1 and RL2 (FIG. 10). In other words, the wiring line WL and the control electrode RL are formed in different layers with the insulating layer 13 therebetween.

The first and second wiring lines WL1 and WL2 are provided on the same layer as the common electrode CE, formed of the same transparent conductive material as the common electrode CE, and arranged with a gap therebetween (FIG. 7). The first and second control electrodes RL1 and RL2 are provided on the same layer as the pixel electrode PE, formed of the same transparent conductive material as the pixel electrode PE, and arranged with a gap therebetween in the orthogonal direction dc1 (FIG. 7). As is seen from the above, the first control electrode RL1, second control electrode RL2 and pixel electrode PE are formed of a first conductive layer (transparent conductive layer). The first wiring line WL1, second wiring line WL2 and common electrode CE are formed of a second conductive layer (transparent conductive layer).

The first control electrode structure RE1 further includes one or more first metal layers ME1. The first metal layers ME1 are located in a first light-shielding area LSA1 and are in contact with the first wiring line WL1 to constitute a first feed line CL1 together with the first wiring line WL1. The first metal layers ME1 contributes to reduction of resistance of the first feed line CL1.

The second control electrode structure RE2 further includes one or more second metal layers ME2. The second metal layers ME2 are located in the first light-shielding area LSA1 and are in contact with the second wiring line WL2 to constitute a second feed line CL2 together with the second wiring line WL2. The second metal layers ME2 contributes to reduction of resistance of the second feed line CL2.

In the fourth embodiment, the first and second metal layers ME1 and ME2 are provided on the same layer as the metal layer ML and formed of the same metal material as the metal layer ML.

The first control electrode RL1 is in contact with the first wiring line WL1 through a contact hole hot formed in the insulating layer 13. The second control electrode RL2 passes through a contact hole hot formed in the insulating layer 13 and is in contact with the second wiring line WL2. The first and second control electrodes RL1 and RL2 are alternately arranged in the orthogonal direction dc1. The first control electrode RL1 intersects the second wiring line WL2 and extends in the first extending direction d1.

In the orthogonal direction dc1, the width WT1 of the first control electrode RL1 is 2 μm, the width WT2 of the second control electrode RL2 is 2 μm, and a plurality of gaps SF are not constant. The gaps SF refer to gaps between the first and second control electrodes RL1 and RL2 and changes randomly in the first incident light control area TA1.

For example, the gaps SF randomly change in units of 0.25 μm with 8 μm as the center. The gaps SF aligned in the orthogonal direction dc1 change in the order of 7.75 μm, 6.25 μm, 10.25 μm, 8.75 μm, 7.25 μm, 5.75 μm, 6.75 μm, 9.25 μm, 8.25 μm and 9.75 μm.

The pitch between the first and second control electrodes RL1 and RL2 may be constant, but it is preferable that the pitch be set randomly as in the fourth embodiment. It is thus possible to prevent diffraction and interference of light from occurring when the pitch is made constant. Note that the gap SF may be randomly changed in units of 0.25 μm with the center of 8 μm to 18 μm.

The first and second control electrode structures RE1 and RE2 have been described above with reference to FIG. 40. The technique described with reference to FIG. 40 can also be applied to the fifth and sixth control electrode structures RE5 and RE6.

Figure 41:
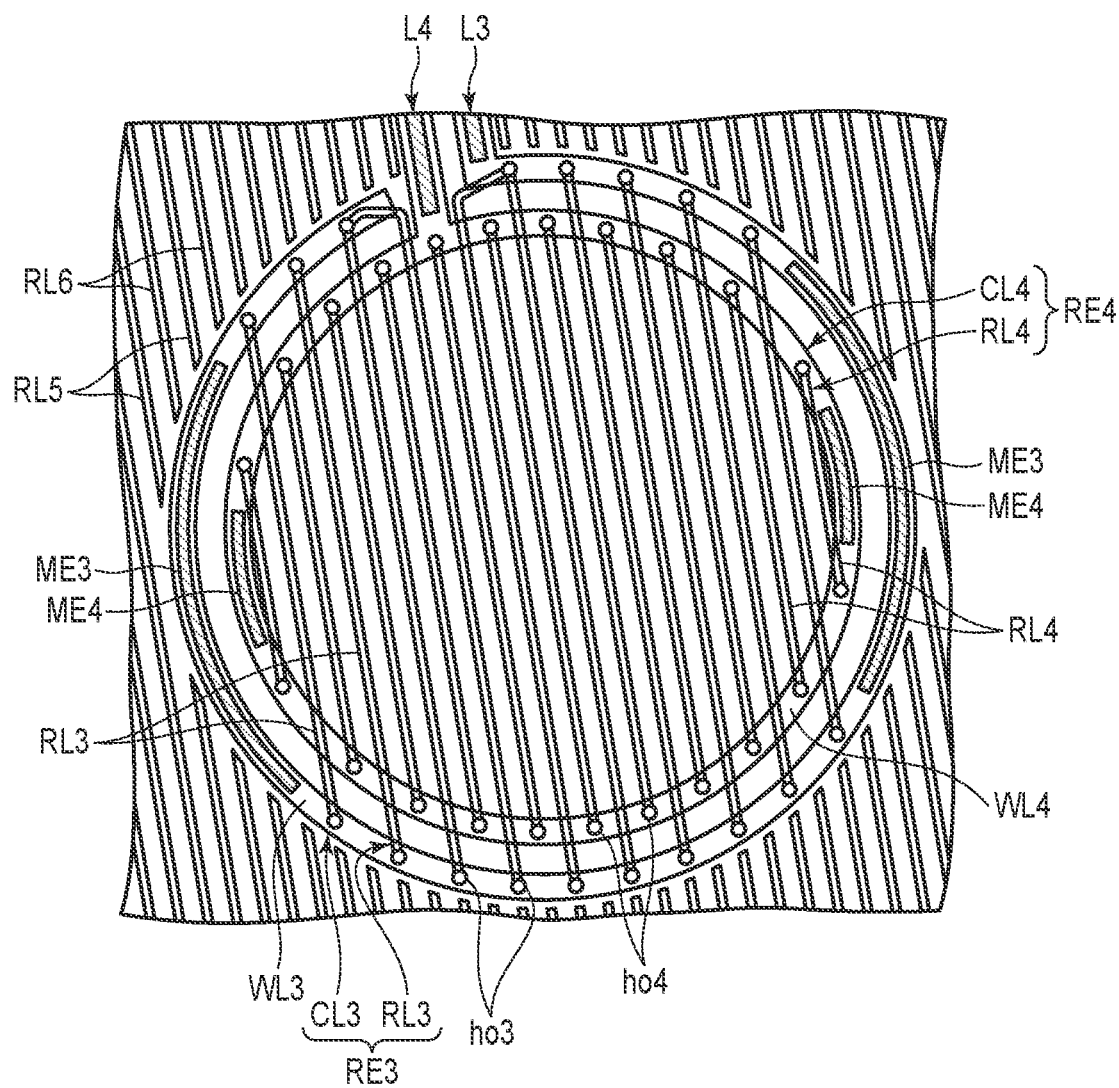
FIG. 41 is a plan view showing a third control electrode structure, a fourth control electrode structure, a fifth control electrode, a sixth control electrode, a third lead line and a fourth lead line according to the fourth embodiment.

FIG. 41 is a plan view showing a third control electrode structure RE3, a fourth control electrode structure RE4, a fifth control electrode RL5, a sixth control electrode RL6, a third lead line L3 and a fourth lead line L4 according to the fourth embodiment.

As shown in FIG. 41, the liquid crystal panel PNL has a configuration corresponding to an IPS mode even in a second incident light control area TA2.

The third control electrode structure RE3 includes a third feed line CL3 and a third control electrode RL3.

The third feed line CL3 is located in the second light-shielding area LSA2, and includes a third wiring line WL3 having an annular shape and a third metal layer ME3 (FIG. 8). In the fourth embodiment, the third wiring line WL3 is C-shaped shape and is formed to be divided in an area through which the fourth lead line L4 passes. The third metal layer ME3 is located in the second light-shielding area LSA2 and is in contact with the third wiring line WL3 to constitute the third feed line CL3 together with the third wiring line WL3. The third metal layer ME3 contributes to reduction of resistance of the third feed line CL3.

A plurality of third control electrodes RL3 are located in the second light-shielding area LSA2 and the second incident light control area TA2, electrically connected to the third wiring line WL3, extended linearly in the first extending direction d1, and arranged at intervals in the orthogonal direction dc1 (FIG. 8).

The third control electrodes RL3 are connected to the third wiring line WL3 at both ends. However, the third control electrodes RL3 may include a third control electrode RL3 connected to the third wiring line WL3 at one end and not connected to the third wiring line WL3 at the other end.

The fourth control electrode structure RE4 includes a fourth feed line CL4 and a fourth control electrode RL4.

The fourth feed line CL4 is located in the second light-shielding area LSA2 and includes a fourth wiring line WL4 having an annular shape and a fourth metal layer ME4 (FIG. 8). The fourth wiring line WL4 is adjacent to the third wiring line WL3. In the fourth embodiment, the fourth wiring line WL4 is located inside the third wiring line WL3, but may be located outside the third wiring line WL3. The fourth metal layer ME4 is located in the second light-shielding area LSA2 and is in contact with the fourth wiring line WL4 to constitute the fourth feed line CL4 together with the fourth wiring line WL4. The fourth metal layer ME4 contributes to reduction of resistance of the fourth feed line CL4.

A plurality of fourth control electrodes RL4 are located in the second light-shielding area LSA2 and the second incident light control area TA2, electrically connected to the fourth wiring line WL4, extended linearly in the first extending direction d1 and arranged at intervals in the orthogonal direction dc1 (FIG. 8).

The fourth control electrodes RL4 are connected to the fourth wiring line WL4 at both ends. However, the fourth control electrodes RL4 may include a fourth control electrode RL4 connected to the fourth wiring line WL4 at one end and not connected to the fourth wiring line WL4 at the other end.

The third control electrodes RL3 intersect the fourth wiring line WL4. The third control electrodes RL3 and the fourth control electrodes RL4 are alternately arranged in the orthogonal direction dc1. The third wiring line WL3, third control electrodes RL3, fourth wiring line WL4 and fourth control electrodes RL4 are each formed of a transparent conductive material such as ITO. The insulating layer 13 is interposed between one or more conductors among the third wiring line WL3, third control electrodes RL3, fourth wiring line WL4 and fourth control electrodes RL4 and the remaining conductors among the third wiring line WL3, third control electrode RL3, fourth wiring line WL4 and fourth control electrode RL4 (FIG. 10).

The one or more conductors are provided on the same layer as one of the pixel electrode PE and common electrode CE, and are formed of the same material as the one of the electrodes (FIG. 7). The remaining conductors are provided on the same layer as the other of the pixel electrode PE and common electrode CE, and are formed of the same material as the other electrodes (FIG. 7).

In the fourth embodiment, the insulating layer 13 is interposed between a wiring line group of the third and fourth wiring lines WL3 and WL4 and an electrode group of the third and fourth control electrodes RL3 and RL4 (FIG. 10).

The third and fourth wiring lines WL3 and WL4 are provided on the same layer as the common electrode CE, formed of the same transparent conductive material as the common electrode CE and arranged with a gap therebetween (FIG. 7). The third and fourth control electrodes RL3 and RL4 are provided on the same layer as the pixel electrode PE and formed of the same transparent conductive material as the pixel electrode PE (FIG. 7).

The third control electrode RL3 is in contacts with the third wiring line WL3 through a contact hole ho3 formed in the insulating layer 13. The fourth control electrode RL4 is in contact with the fourth wiring line WL4 through a contact hole ho4 formed in the insulating layer 13.

In the fourth embodiment, the inner diameter DI4 of a second light-shielding portion BM2 is 200 μm (FIG. 8). In the orthogonal direction dc1, the third and fourth control electrodes RL3 and RL4 are arranged at random pitches with 10 μm at the center.

In the fourth embodiment, the third and fourth lead lines L3 and L4 are configured by a laminated layer body of a transparent conductive layer and a metal layer.

According to the liquid crystal display device DSP and electronic device 100 according to the fourth embodiment configured as described above, the light transmissive area of the incident light control area PCA can be controlled. In addition, an image can be captured satisfactorily.

Fifth Embodiment

Figure 42:
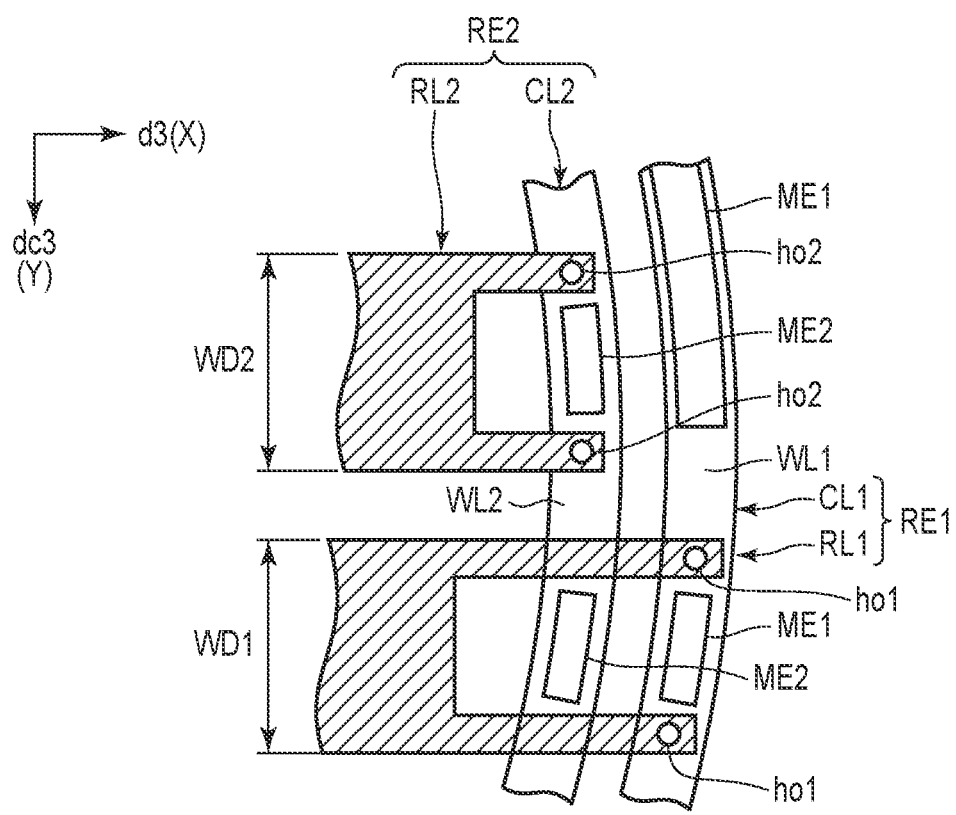
FIG. 42 is a plan view showing a first control electrode structure and a second control electrode structure of a liquid crystal panel of an electronic device according to a fifth embodiment.

Next is a description of a fifth embodiment. The electronic device 100 is configured in the same manner as that in the third embodiment (FIG. 32) except for the configuration described in the fifth embodiment. FIG. 42 is a plan view showing a first control electrode structure RE1 and a second control electrode structure RE2 of a liquid crystal panel PNL of the electronic device 100 according to the fifth embodiment. Here is a description of a connecting portion of each of the first and second control electrode structures RE1 and RE2 in the electrode structure of a longitudinal electric field mode shown in FIG. 32. Note that FIG. 42 shows only the configuration necessary for the description.

As shown in FIG. 42, a first wiring line WL1, a first control electrode RL1, a second wiring line WL2 and a second control electrode RL2 are each formed of a transparent conductive material such as ITO. An insulating layer 13 is interposed between one or more conductors of the first wiring line WL1, first control electrode RL1, second wiring line WL2 and second control electrode RL2 and the remaining conductors (FIG. 10).

The one or more conductors are provided on the same layer as one of a pixel electrode PE and a common electrode CE and formed of the same material as the one of the electrodes (FIG. 7). The remaining conductors are provided on the same layer as the other electrode and formed of the same material as the other electrode (FIG. 7).

In the fifth embodiment, the insulating layer 13 is interposed between a wiring line group of the first and second wiring lines WL1 and WL2 and an electrode group of the first and second control electrodes RL1 and RL2 (FIG. 10).

The first and second wiring lines WL1 and WL2 are provided on the same layer as the common electrode CE provided in the pixel PX shown in FIG. 7, formed of the same transparent conductive material as the common electrode CE, and arranged with a gap therebetween (FIG. 7). The first and second control electrodes RL1 and RL2 are provided on the same layer as the pixel electrode PE, formed of the same transparent conductive material as the pixel electrode PE, and arranged with a gap between them in the orthogonal direction dc3 (FIG. 7).

The first control electrode structure RE1 further includes one or more first metal layers ME1. The first metal layer ME1 is located in the first light-shielding area LSA1 and is in contact with the first wiring line WL1 to constitute a first feed line CL1 together with the first wiring line WL1 (FIG. 31). The first metal layer ME1 contributes to reduction of resistance of the first feed line CL1.

The second control electrode structure RE2 further includes one or more second metal layers ME2. The second metal layers ME2 are located in the first light-shielding area LSA1 and is in contact with the second wiring line WL2 to constitute a second feed line CL2 together with the second wiring line WL2 (FIG. 31). The second metal layers ME2 contributes to reduction of resistance of the second feed line CL2.

In the fifth embodiment, the first and second metal layers ME1 and ME2 are provided on the same layer as the metal layer ML and formed of the same metal material as the metal layer ML.

The first control electrode RL1 is located in the first range TA1a, intersects the second wiring line WL2 and extends in the third extending direction d3. The second control electrode RL2 is located in the second range TA1b and extends in the third extension direction d3.

The first control electrode RL1 is in contact with the first wiring line WL1 through a contact hole ho1 formed in the insulating layer 13. The second control electrode RL2 is in contact with the second wiring line WL2 through a contact hole hot formed in the insulating layer 13. In the fifth embodiment, the first and second control electrodes RL1 and RL2 are in contact with the corresponding wiring line WL at two positions.

It has been described that the first feed line CL1 includes the first metal layers ME1 and the second feed line CL2 includes the second metal layers ME2. If, however, the control electrode structure RE or the lead line L is not covered with the light-shielding layer BM, the first feed line CL1, second feed line CL2 and lead line L may be formed of only a transparent conductive layer.

The first and second control electrode structures RE1 and RE2 have been described above with reference to FIG. 42. The technique described with reference to FIG. 42 can also be applied to the fifth and sixth control electrode structures RE5 and RE6.

Figure 43:
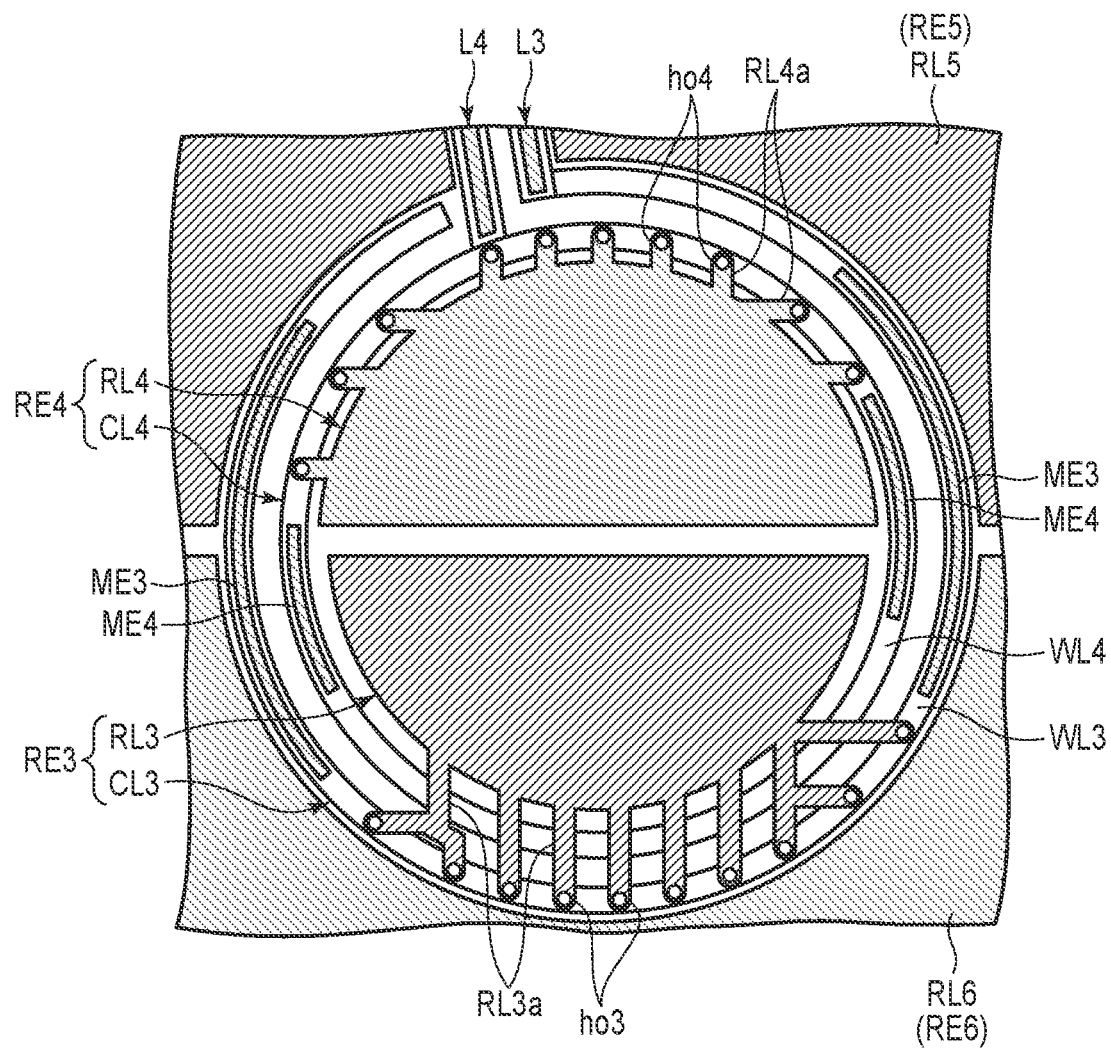
FIG. 43 is a plan view showing a third control electrode structure, a fourth control electrode structure, a fifth control electrode structure, a sixth control electrode structure, a third lead line and a fourth lead line according to the fifth embodiment.

FIG. 43 is a plan view showing a third control electrode structure RE3, a fourth control electrode structure RE4, a fifth control electrode structure RE5, a sixth control electrode structure RE6, a third lead line L3 and a fourth lead line L4 according to the fifth embodiment.

As shown in FIG. 43, the liquid crystal panel PNL has a configuration corresponding to the longitudinal electric field mode even in the second incident light control area TA2.

The third control electrode structure RE3 includes a third feed line CL3 and a third control electrode RL3.

The third feed line CL3 is located in the second light-shielding area LSA2 and includes a third wiring line WL3 having an annular shape and a third metal layer ME3 (FIG. 31). In the fifth embodiment, the third wiring line WL3 is C-shaped shape and formed to be divided in an area through which the fourth lead line L4 passes. The third metal layer ME3 is located in the second light-shielding area LSA2 and is in contact with the third wiring line WL3 to constitute a third feed line CL3 together with the third wiring line WL3. The third metal layer ME3 contributes to reducing the resistance of the third feed line CL3. The third control electrode RL3 is located in the second light-shielding area LSA2 and the third range TA2a and is electrically connected to the third wiring line WL3 (FIG. 31).

The fourth control electrode structure RE4 includes a fourth feed line CL4 and a fourth control electrode RL4.

The fourth feed line CL4 is located in the second light-shielding area LSA2 and includes a fourth wiring line WL4 having an annular shape and a fourth metal layer ME4 (FIG. 31). In the fifth embodiment, the fourth wiring line WL4 is located inside the third wiring line WL3, but may be located outside the third wiring line WL3. The fourth metal layer ME4 is located in the second light-shielding area LSA2 and is in contact with the fourth wiring line WL4 to constitute a fourth feed line CL4 together with the fourth wiring line WL4. The fourth metal layer ME4 contributes to reduction of resistance of the fourth feed line CL4. The fourth control electrode RL4 is located in the second light-shielding area LSA2 and the fourth range TA2b and is electrically connected to the fourth wiring line WL4 (FIG. 31).

The third wiring line WL3, third control electrode RL3, fourth wiring line WL4 and fourth control electrode RL4 are each formed of a transparent conductive material such as ITO. The insulating layer 13 is interposed between one or more conductors of the third wiring line WL3, third control electrode RL3, fourth wiring line WL4 and fourth control electrode RL4 and the remaining conductors thereof (FIG. 10).

The one or more conductors are provided on the same layer as one of the pixel electrode PE and the common electrode CE, and are formed of the same material as the one of the electrodes (FIG. 7). The remaining conductors are provided on the same layer as the other of the electrodes, and are formed of the same material as the other electrodes (FIG. 7).

In the fifth embodiment, the insulating layer 13 is interposed between a wiring line group of the third and fourth wiring lines WL3 and WL4 and an electrode group of the third and fourth control electrodes RL3 and RL4 (FIG. 10).

The third and fourth wiring lines WL3 and WL4 are provided on the same layer as the common electrode CE, formed of the same transparent conductive material as the common electrode CE, and arranged with a gap therebetween (FIG. 7). The third and fourth control electrodes RL3 and RL4 are provided on the same layer as the pixel electrode PE and formed of the same transparent conductive material as the pixel electrode PE (FIG. 7).

Note that in the fifth embodiment, the inner diameter (DI4) of a second light-shielding portion BM2 is 200 µm. The widths WD1 and WD2 shown in FIG. 42 are substantially 400 µm as described above. Therefore, in the third range TA2a, the third control electrode RL3 is not divided or does not have a slit. Similarly, in the fourth range TA2*b*, the fourth control electrode RL4 is not divided or does not have a slit.

The third control electrode RL3 includes an extended portion RL3*a*. In the fifth embodiment, the third control electrode RL3 includes a plurality of extended portions RL3*a*. Each of the extended portions RL3*a* intersects the fourth wiring line WL4, passes through a contact hole ho3 formed in the insulating layer 13, and is in contact with the third wiring line WL3.

The fourth control electrode RL4 includes an extended portion RL4*a*. In the fifth embodiment, the fourth control electrode RL4 includes a plurality of extended portions RL4*a*. Each of the extended portions RL4*a* passes through a contact hole ho4 formed in the insulating layer 13 and is in contact with the fourth wiring line WL4.

In the fifth embodiment, the third and fourth lead lines L3 and L4 are formed of a laminated layer body of a transparent conductive layer and a metal layer.

According to the liquid crystal display device DSP and electronic device 100 according to the fifth embodiment configured as described above, the light transmissive area of the incident light control area PCA can be controlled. In addition, an image can be captured satisfactorily.

Sixth Embodiment

Figure 44:
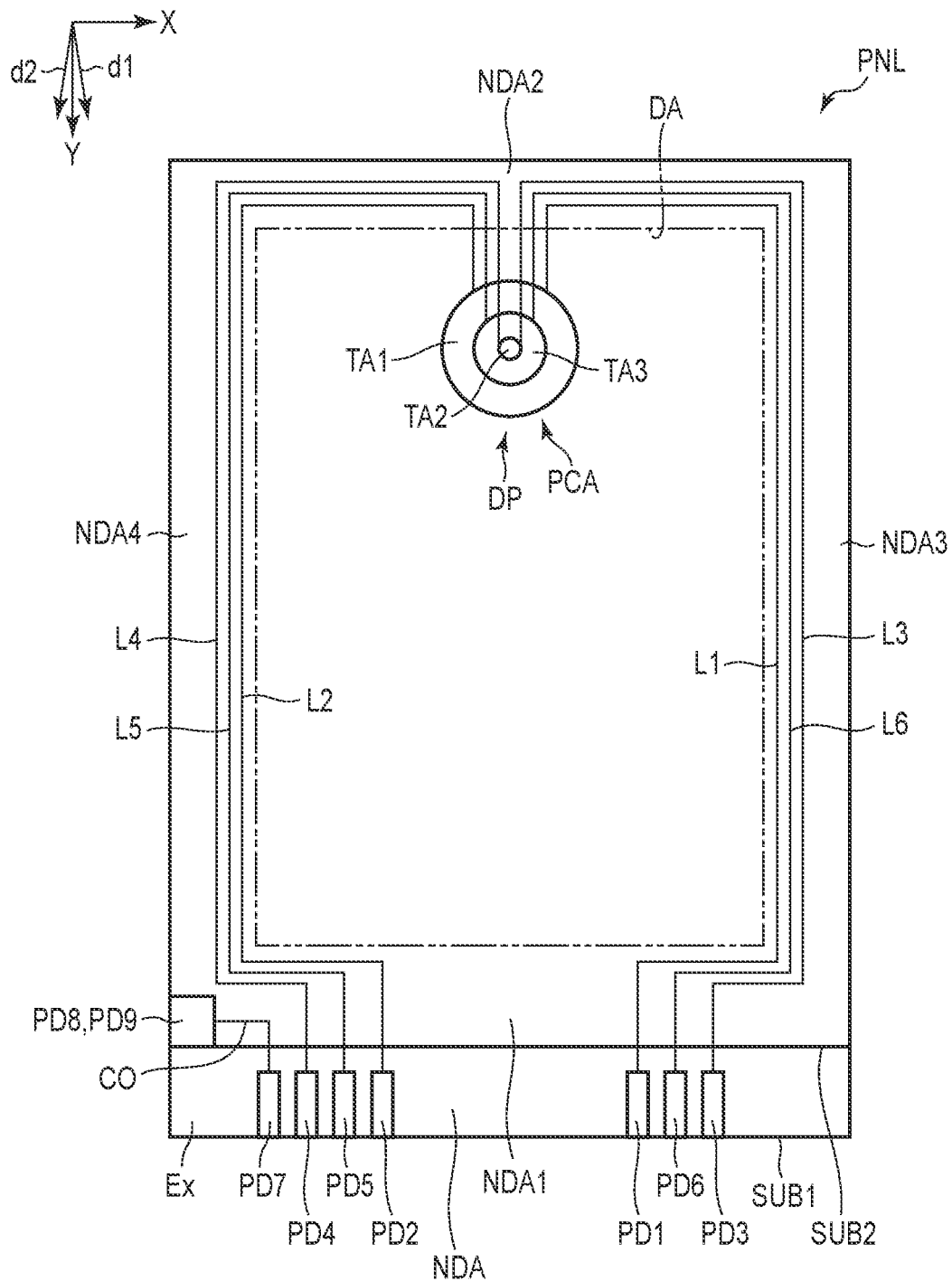
FIG. 44 is a plan view showing a liquid crystal panel of an electronic device according to a sixth embodiment.

Next is a description of a sixth embodiment. The electronic device 100 is configured in the same manner as that of the third embodiment (FIG. 30) except for the configuration described in the sixth embodiment. FIG. 44 is a plan view showing a liquid crystal panel PNL of the electronic device 100 according to the sixth embodiment. FIG. 44 shows only the configuration necessary for the description.

As shown in FIG. 44, a non-display area NDA includes a first non-display area NDA1 including an area where an extended portion Ex of a first substrate SUB1 is located, a second non-display area NDA2 located on the opposite side of the first non-display area NDA1 with a display area DA therebetween, a third non-display area NDA3 located between the first and second non-display areas NDA1 and NDA2, and a fourth non-display area NDA4 located on the opposite side of the third non-display area NDA3 with the display area DA therebetween.

In the sixth embodiment, the first non-display area NDA1 is located on the lower side of the figure, the second non-display area NDA2 is located on the upper side thereof, the third non-display area NDA3 is located on the right side thereof, and the fourth non-display area NDA4 is located on the left side thereof.

The first substrate SUB1 further includes a plurality of pads PD including a first pad PD1, a second pad PD2, a third pad PD3, a fourth pad PD4, a fifth pad PD5, a sixth pad PD6, a seventh pad PD7 and the like. These pads PD are located in the extended portion Ex of the first non-display area NDA1 of the first substrate SUB1 and aligned in the direction X.

A first lead line L1, a second lead line L2, a third lead line L3, a fourth lead line L4, a fifth lead line L5 and a sixth lead line L6 extend on an incident light control area PCA, the display area DA and non-display area NDA. In the sixth embodiment, a diaphragm DP (incident light control area PCA) is provided in close to the second non-display area NDA2 of the first to fourth non-display areas NDA1 to NDA4. Thus, the first to sixth lead lines L1 to L6 bypass the display area DA and extend on the non-display area NDA so that the distance by which the display area DA extends is as short as possible.

Here is a description of the relationship in connection between the control electrode structure RE and a pad (connection terminal) PD.

As shown in FIGS. 44 and 32, the first lead line L1 electrically connects a first control electrode structure RE1 located in a first incident light control area TA1 to a first pad PD1. The second lead line L2 electrically connects a second control electrode structure RE2 located in the first incident light control area TA1 to a second pad PD2.

The third lead line L3 electrically connects a third control electrode structure RE3 located in a second incident light control area TA2 to a third pad PD3. The fourth lead line L4 electrically connects a fourth control electrode structure RE4 located in the second incident light control area TA2 to a fourth pad PD4.

The fifth lead line L5 electrically connects a fifth control electrode structure RE5 located in a third incident light control area TA3 to a fifth pad PD5. The sixth lead line L6 electrically connects a sixth control electrode structure RE6 located in the third incident light control area TA3 to a sixth pad PD6.

In the sixth embodiment, the first, third and sixth lead lines L1, L3 and L6 extend on the second, third and first non-display areas NDA2, NDA3 and NDA1, respectively. The second, fourth and fifth lead lines L2, L4 and L5 extend on the second, fourth and first non-display areas NDA2, NDA4 and NDA1, respectively.

In the incident light control area PCA, the third and fourth lead lines L3 and L4 are interposed between the fifth and sixth lead lines L5 and L6. The fifth and sixth lead lines L5 and L6 are interposed between the first and second lead lines L1 and L2.

In the second, third and first non-display areas NDA2, NDA3 and NDA1, the first lead line L1 is located closer to the display area DA side than the sixth lead line L6, and the sixth lead line L6 is located closer to the display area DA than the third lead line L3.

In the second, fourth and first non-display areas NDA2, NDA4 and NDA1, the second lead line L2 is located closer to the display area DA side than the fifth lead line L5, and the fifth lead line L5 is located closer to the display area DA side than the fourth lead line L4.

In each of the first to sixth lead lines L1 to L6 described above, a portion located in the display area DA between the non-display area NDA and the incident light control area PCA may be referred to as a lead line, and a portion located in the non-display area NDA between them may be referred to as a peripheral line. In this case, the lead line is connected to its corresponding control electrode RL via its corresponding wiring line WL. In addition, the peripheral line extends from its corresponding pad PD to its corresponding lead line in the non-display area NDA, and is connected to its corresponding pad PD and lead line.

Note that the diaphragm DP (incident light control area PCA) need not be provided at a position near the second non-display area NDA2. For example, the diaphragm DP (incident light control area PCA) may be provided at a position near the third non-display area NDA3 among the first to fourth non-display areas NDA1 to NDA4. In this case, the first to sixth lead lines L1 to L6 may extend only on the third and first non-display areas NDA3 and NDA1 of the non-display area NDA.

As described above, in the sixth embodiment, the lead line L is used to apply a voltage to the control electrode structure RE, but the liquid crystal panel PNL has only to be configured without the lead line L as long as a voltage can be applied the control electrode structure RE. For example, the control electrode structure RE and the IC chip 6 may be electrically connected using some of the signal lines S (FIG. 3) to drive the control electrode structure RE through a signal line S dedicated to the control electrode structure RE.

The first substrate SUB1 further includes an eighth pad PD8 located in the non-display area NDA and a connection line CO located in the non-display area NDA and electrically connecting the eighth pad PD8 to the seventh pad PD7. The second substrate SUB2 further includes a ninth pad PD9 located in the non-display area NDA and overlapping the eighth pad PD8. The ninth pad PD9 is electrically connected to a lead line Lo (FIG. 33).

Like the second lead line L2, for example, the lead line Lo extends on the second, fourth and first non-display areas NDA2, NDA4 and NDA1 and electrically connects a counter-electrode OE to the ninth pad PD9. The eighth and ninth pads PD8 and PD9 are electrically connected by a conductive member (not shown). Thus, a counter voltage can be applied to the counter-electrode OE via the seventh pad PD7, connection line CO, eighth pad PD8, ninth pad PD9, lead line Lo and the like.

Here is a description of the relationship between the counter-voltage applied to the counter-electrode OE and first to sixth control voltages applied to the first to sixth control electrode structures RE1 to RE6.

As shown in FIGS. 44, 35, 37 and 39, under the first condition, the first to sixth control voltages are each the same as the counter-voltage. For example, during an optional period under the first condition, the first to sixth control voltages and the counter-voltage are each 0 V. The liquid crystal panel PNL can set the first to third incident light control areas TA1 to TA3 in a transmissive state.

In this case, there is no substantial influence of the voltage applied to the third non-display area NDA3 by the first, third and sixth lead lines L1, L3 and L6 or there is no substantial influence of the voltage applied to the fourth non-display area NDA4 by the second, fourth and fifth lead lines L2, L4 and L5.

Under the second condition, the polarity of the first control voltage and that of the second control voltage are different from each other with respect to the counter-voltage. That is, the polarity of the first control voltage and that of the second control voltage are opposite to each other. The polarity of the fifth control voltage and that of the sixth control voltage are different from each other with respect to the counter-voltage. The third control voltage and the fourth control voltage are the same as the counter voltage. For example, during an optional period under the second condition, the third and fourth control voltages and the counter-voltage are each 0 V, the first and fifth control voltages are each $+\alpha V$, and the second and sixth control voltages are each $-\alpha V$. The liquid crystal panel PNL can set the second incident light control area TA2 in a transmissive state and set the first and third incident light control areas TA1 and TA3 in a non-transmissive state.

In this case, the first and sixth lead lines L1 and L6 are set to reversed polarities, and the second and fifth lead lines L2 and L5 are set to reversed polarities. Accordingly, compared with the case where the polarities of the first and sixth lead lines L1 and L6 are the same and the polarities of the second and fifth lead lines L2 and L5 are the same, the influence of a voltage upon the third and fourth non-display areas NDA3 and NDA4 can be suppressed.

Under the third condition, the polarity of the first control voltage and that of the second control voltage are different from each other with respect to the counter-voltage. The third, fourth, fifth and sixth control voltages are the same as the counter-voltage. For example, during an optional period under the third condition, the third, fourth, fifth and sixth control voltages and the counter-voltage are each 0 V, the first control voltage is $+\alpha V$, and the second control voltage is $-\alpha V$. The liquid crystal panel PNL can set the second and third incident light control areas TA2 and TA3 in a transmissive state and set the first incident light control area TA1 in a non-transmissive state.

In this case, the third and sixth lead lines L3 and L6 are set to 0 V, and the fourth and fifth lead lines L4 and L5 are set to 0 V. Therefore, even under the third condition, the influence of a voltage at which the lead lines L can exert on the third and fourth non-display areas NDA3 and NDA4 is small.

Under the fourth condition, the polarity of the first control voltage and that of the second control voltage are different from each other with respect to the counter-voltage. The polarity of the fifth control voltage and that of the sixth control voltage are different from each other with respect to the counter-voltage. The polarity of the third control voltage and the that of the fourth control voltage are different from each other with respect to the counter-voltage. For example, during an optional period under the fourth condition, the first, third and fifth control voltages are each $+\alpha V$, and the second, fourth and sixth control voltages are each $-\alpha V$. The liquid crystal panel PNL can set the first to third incident light control areas TA1 to TA3 in a non-transmissive state.

In this case, the polarities of the first, third and sixth lead lines L1, L3 and L6 are not the same, nor are the polarities of the second, fourth and fifth lead lines L2, L4 and L5. Thus, compared with the case where the polarities are the same, the influence of a voltage upon the third and fourth non-display areas NDA3 and NDA4 can be suppressed.

As described above, the capacitance caused by the lead lines L is balanced each of the third and fourth non-display areas NDA3 and NDA4. For example, bad influences on the circuits located in the third and fourth non-display areas NDA3 and NDA4 can be suppressed.

According to the liquid crystal display device DSP and electronic device 100 according to the sixth embodiment configured as described above, the light transmissive area of the incident light control area PCA can be controlled. In addition, an image can be captured satisfactorily.

Seventh Embodiment

Next is a description of a seventh embodiment. FIG. 45 is a plan view showing scanning lines G and signal lines S in an incident light control area PCA of a liquid crystal panel PNL of an electronic device 100 according to the seventh embodiment. In FIG. 45, the scanning lines G are indicated by solid lines, the signal lines S are indicated by dashed lines, and the inner and outer peripheries of the first light-shielding area LSA1 are indicated by two-dot chain lines. Note that FIG. 45 shows only the configuration necessary for the description. The electronic device 100 of the seventh embodiment is configured in the same manner as the electronic device 100 of any of the first to sixth embodiments described above, except for the scanning lines G and signal lines S in the incident light control area PCA.

As shown in FIG. 45, the scanning lines G are arranged in the direction Y at intervals of 60 μm to 180 μm in the display area DA. The signal lines S are arranged in the direction X at intervals of 20 μm to 60 μm. The scanning lines G and signal lines S also extend in the incident light control area PCA.

Of the scanning lines G and signal lines S, one or more wiring lines extending on the display area DA toward the first incident light control area TA1 bypass the first incident light control area TA1 and extend on a first light-shielding area LSA1 of the incident light control area PCA. Accordingly, when the diameter of the outer periphery of the first light-shielding area LSA1 (first light-shielding portion BM1) is 6 mm to 7 mm, 30 to 120 scanning lines G and 100 to 350 signal lines S are arranged in the first light-shielding area LSA1 covered with the first light-shielding portion BM1 to avoid the first incident light control area TA1. Therefore, even in the presence of the incident light control area PCA surrounded by the display area DA, the scanning lines G, signal lines S and the like can be well formed.

According to the liquid crystal display device DSP and the electronic device 100 according to the seventh embodiment configured as described above, the electronic device 100 is configured in the same manner as the electronic devices 100 of the above-described embodiments. The same advantages as described above can thus be obtained. In addition, an image can be captured satisfactorily.

Eighth Embodiment

Next is a description of an eighth embodiment. Here is a description of a case where the diaphragm DP is used as a shutter. First is a description of the relationship between the gap Ga of a liquid crystal layer LC and the transmittance and response speed. FIG. 46 is a graph showing a change in the transmittance of light (visible light) to the gap Ga of the liquid crystal layer LC and a change in the response speed of liquid crystal to the gap Ga in the liquid crystal panel PNL of the electronic device 100 according to the eighth embodiment. The electronic device 100 is configured in the same manner as that of the third embodiment (FIG. 30) except for the configuration described in the eighth embodiment.

FIG. 46 shows the relationship between the gap Ga shown in FIG. 30 and the response speed of liquid crystal. It can be seen that the smaller the gap Ga, the faster the response speed of liquid crystal. In the present specification, the response speed of liquid crystal refers to the speed at which the liquid crystal molecules shift from the initial alignment to a predetermined state, i.e., the speed at the time of rising. Therefore, in the eighth embodiment, a second gap Ga2 is set to be less than a first gap Ga1 (Ga2<Ga1). By way of example, the second gap Ga2 can be half of the first gap Ga1 (Ga2=Ga1/2).

Thus, the response speed of liquid crystal in each of the first, second and third control liquid crystal layers LC1, LC2 and LC3 of the incident light control area PCA can be made higher than that of liquid crystal in the display liquid crystal layer LCI of the display area DA. For example, the incident light control area PCA (diaphragm DP) of the liquid crystal panel PNL can be caused to function as a liquid crystal shutter.

The shutter speed is sometimes required to be 0.001 seconds or less. In order to function as a liquid crystal shutter, the period for which a voltage is applied to the control electrode RL is shorter than the period for which a voltage is applied to the pixel electrode PE. It is thus required to increase the response speed of liquid crystal driven by the control electrode RL.

However, the following should be noted. The narrower the second gap Ga2, the lower the transmittance of light in the incident light control area PCA.

Note that the first gap Ga1 may be narrowed to increase the response speed of liquid crystal in the display liquid crystal layer LCI. However, it should be noted that the transmittance of light in the display area DA is lowered and the display image is darkened.

Next is a description of the relationship between a voltage applied to the liquid crystal layer LC and the response speed. FIG. 47 is a graph showing change in response speed of liquid crystal with respect to a voltage applied to the liquid crystal layer LC in the eighth embodiment. In FIG. 47, the second gap Ga2 is set to 1.7 μm.

As is seen from FIG. 47, the larger the potential difference between the control electrode structure RE and the counter-electrode OE, the higher the response speed of liquid crystal. When the incident light control area PCA (diaphragm DP) is caused to function as a liquid crystal shutter, the response speed of liquid crystal is preferably 1.0 ms or less. It can be seen that in order to obtain a response speed of liquid crystal of 1.0 ms or less, a voltage (absolute value of the voltage) to be applied between the control electrode structure RE and the counter-electrode OE must be 13 V or more.

For example, when the first, second and third incident light control areas TA1, TA2 and TA3 are each changed from a transmissive state to a non-transmissive state at high speed, a voltage of 13 V or more has only to be applied to the first, second and third control liquid crystal layers LC1, LC2 and LC3.

When the incident light control area PCA (diaphragm DP) is caused to function as a liquid crystal shutter, the absolute value of a voltage applied to the first control liquid crystal layer LC1, that of a voltage applied to the second control liquid crystal layer LC2, and that of a voltage applied to the third control liquid crystal layer LC3 are each higher than the absolute value of a voltage applied to the display liquid crystal layer LCI.

As is seen from the above, the response speed of liquid crystal in each of the first, second and third control liquid crystal layers LC1, LC2 and LC3 of the incident light control area PCA can be made higher than the response speed of liquid crystal in the display liquid crystal layer LCI of the display area DA by the voltage.

The incident light control area PCA (diaphragm DP) of the liquid crystal panel PNL can be caused to function as a first liquid crystal shutter by returning to the fourth condition from the fourth condition through the first condition. The liquid crystal panel PNL can switch the first, second and third incident light control area TA1, TA2 and TA3 simultaneously from a non-transmissive state to a transmissive state and then return them to the non-transmissive state to obtain the first liquid crystal shutter.

When the first, second and third incident light control area TA1, TA2 and TA3 are returned from the transmissive state to the non-transmissive state as described above, the liquid crystal panel PNL applies a voltage of 13 V or more to the first, second and third control liquid crystal layers LC1, LC2 and LC3 simultaneously to drive the first, second and third control liquid crystal layers LC1, LC2 and LC3 simultaneously.

The incident light control area PCA (diaphragm DP) of the liquid crystal panel PNL can be caused to function as a second liquid crystal shutter by returning to the fourth condition from the fourth condition through the second condition. The liquid crystal panel PNL can switch the second incident light control area TA2 from the non-transmissive state to the transmissive state and then return it to the non-transmissive state while holding the first and third incident light control areas TA1 and TA3 in the non-transmissive state to obtain the second liquid crystal shutter. In the second liquid crystal shutter, the diaphragm DP can be caused to have both a pinhole function and a shutter function.

Note that a voltage applied to the first and third control liquid crystal layers LC1 and LC3 may be less than 13 V during a period in which the first and third incident light control areas TA1 and TA3 are held in the non-transmissive state. For example, the voltage to be applied to the first and third control liquid crystal layers LC1 and LC3 in order to hold the first and third incident light control areas TA1 and TA3 in the non-transmissive state may have the same level as that of a voltage to be applied to the display liquid crystal layer LCI.

When the second incident light control area TA2 is returned from the transmissive state to the non-transmissive state as described above, the liquid crystal panel PNL applies a voltage of 13 V or more to the second control liquid crystal layer LC2 to drive the second control liquid crystal layer LC2.

The incident light control area PCA (diaphragm DP) of the liquid crystal panel PNL can be caused to function as a third liquid crystal shutter by returning to the fourth condition from the fourth condition through the third condition. The liquid crystal panel PNL can switch the second and third incident light control areas TA2 and TA3 simultaneously from the non-transmissive state to the transmissive state and then return them to the non-transmissive state while holding the first incident light control area TA1 in the non-transmissive state to obtain the third liquid crystal shutter. In the third liquid crystal shutter, the diaphragm DP can be caused to have both a function of narrowing the incident light and a function of the shutter.

Since it is necessary to adjust a diaphragm and a shutter speed in order to obtain a desired image, the voltage applied to the first control liquid crystal layer LC1 may be less than 13 V during a period in which the first incident light control area TA1 is held in a non-transmissive state.

When the second and third incident light control area TA2 and TA3 are returned from the transmissive state to the non-transmissive state as described above, the liquid crystal panel PNL applies a voltage of 13 V or more to the second and third control liquid crystal layers LC2 and LC3 simultaneously to drive the second and third control liquid crystal layers LC2 and LC3 simultaneously.

If, as described above, the incident light control area PCA (diaphragm DP) of the liquid crystal panel PNL is caused to function as a liquid crystal shutter, not only a stationary subject but also a moving subject can be captured satisfactorily. The liquid crystal panel PNL can cause the incident light control area PCA to function as a liquid crystal shutter while controlling the light transmission area concentrically in the incident light control area PCA.

According to the electronic device 100 of the eighth embodiment configured as described above, an image can be captured satisfactorily.

The technique of the eighth embodiment can be applied to other embodiments. For example, the technique of the eighth embodiment can be applied to the first embodiment. In the first embodiment, the mode of the incident light control area PCA of the liquid crystal panel PNL is a normally black mode. Therefore, when the non-transmissive state is changed to the transmissive state, the liquid crystal panel PNL has only to apply a voltage of 13 V or more to the first, second and third control liquid crystal layers LC1, LC2 and LC3.

Ninth Embodiment

Figure 48:
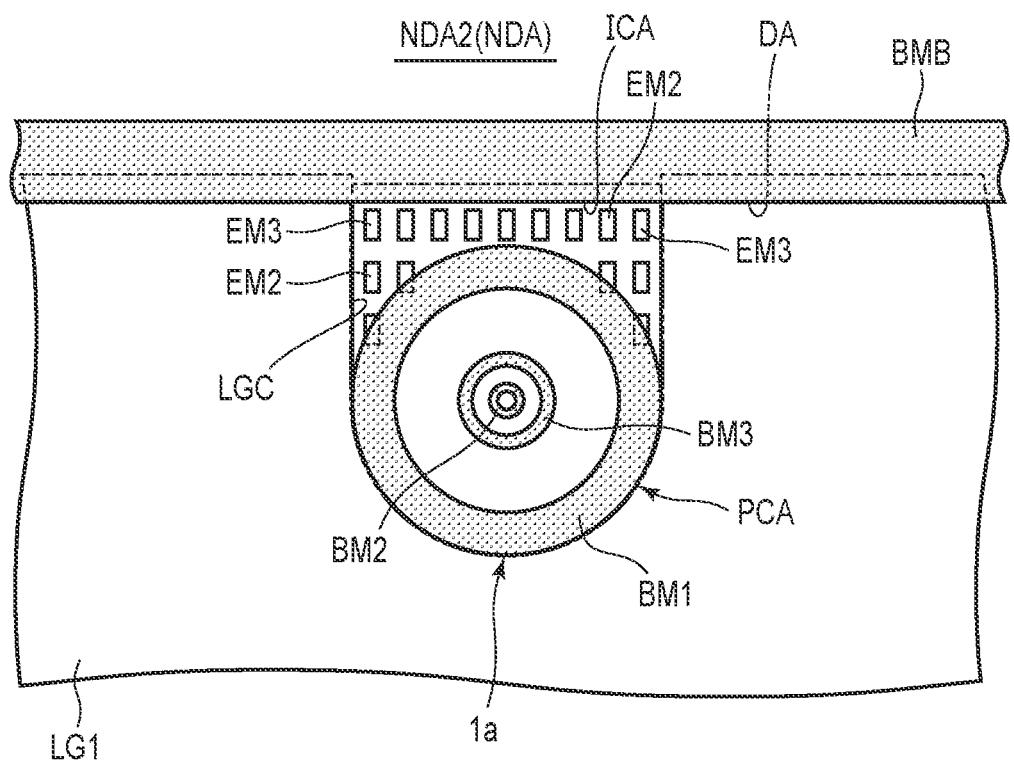
FIG. 48 is a plan view showing a light guide and a camera of an electronic device according to a ninth embodiment.

Next is a description of a ninth embodiment. The electronic device 100 is configured in the same manner as that of the first embodiment except for the configuration described in the ninth embodiment. FIG. 48 is a plan view showing a liquid crystal panel PNL, a light guide LG1 and a camera 1a of the electronic device 100 according to the ninth embodiment. As for the liquid crystal panel PNL, first to third light-shielding portions BM1, BM2 and BM3 and a light shielding portion BMB are shown.

As shown in FIG. 48, the liquid crystal panel PNL includes a display area DA, an incident light control area PCA with an outer periphery that is in contact with the display area DA, an emitted light control area ICA adjacent to the incident light control area PCA, and a non-display area NDA. Except for a color filter CF, the liquid crystal panel PNL is configured by the display area DA and the emitted light control area ICA. A plurality of pixels PX are arranged in the display area DA and the emitted light control area ICA. The colored layer of the color filter CF is provided in the display area DA, and is not provided in the incident light control area PCA or the emitted light control area ICA.

The incident light control area PCA is provided near a second non-display area NDA2. In the ninth embodiment, the emitted light control area ICA is surrounded by the display area DA, incident light control area PCA and second non-display area NDA2 (light-shielding portion BMB).

The camera 1a includes at least one light source EM2 and at least one light source EM3. In the present embodiment, the camera 1a includes a plurality of light sources EM2 and a plurality of light sources EM3. The light sources EM3 are arranged in the emitted light control area ICA. Although the light sources EM2 also overlap the emitted light control area ICA, they may overlap the light-shielding portion BMB and the like.

The light guide LG1 has a concavity LGC which overlaps the incident light control area PCA and the emitted light control area ICA and which is recessed in the direction Y. The light guide LG1 overlaps the display area DA and does not overlap the incident light control area PCA or the emitted light control area ICA. The illumination device IL is configured to illuminate the display area DA of the liquid crystal panel PNL.

Note that the light sources EM3 of the camera 1a are configured to illuminate the emitted light control area ICA of the liquid crystal panel PNL. The liquid crystal panel PNL is configured to selectively transmit visible light mitted from the light sources EM3 in the emitted light control area ICA. The emitted light control area ICA of the liquid crystal panel PNL and the light sources EM3 are combined to display white or black.

The light sources EM2 and EM3 and the like behind the liquid crystal panel PNL can be hidden by setting the emitted light control area ICA of the liquid crystal panel PNL to black (non-transmissive state). If the emitted light control area ICA of the liquid crystal panel PNL is set to white (transmissive state), visible light can be emitted from the light sources EM3 to take a photograph of a fingerprint by the camera 1a.

In addition, when the need arises, infrared light is emitted from the light sources EM2, and the camera 1a receives the infrared light to take a photograph of the front of the screen of the liquid crystal display device DSP.

Note that various modifications can be made to the configuration of the emitted light control area ICA of the liquid crystal panel PNL.

For example, the colored layer of the color filter CF may be provided in the emitted light control area ICA. Thus, the emitted light control area ICA of the liquid crystal panel PNL can be adapted to the color display together with the light sources EM3. However, there is a strong possibility that the boundary between the display area DA and the emitted light control area ICA is conspicuous. In this case, the light guide LG1 should overlap the emitted light control area ICA. The light guide LG1 is located between the emitted light control area ICA of the liquid crystal panel PNL and the light sources EM2 and EM3. Since both the display area DA and the emitted light control area ICA of the liquid crystal panel PNL can be illuminated with the light emitted from the light guide LG1, the color display can be performed while making the boundary between the display area DA and the emitted light control area ICA inconspicuous.

Alternatively, in the emitted light control area ICA, the liquid crystal panel PNL may include one or more adjustment electrodes instead of the pixel electrodes PE. In this case, the shape and size of the adjustment electrode of the emitted light control area ICA may be different from the shape and size of the pixel electrode PE, or may be different from the shape and size of the control electrode of the incident light control area PCA.

According to the electronic device 100 of the ninth embodiment configured as described above, an image can be captured satisfactorily.

Tenth Embodiment

Figure 49:
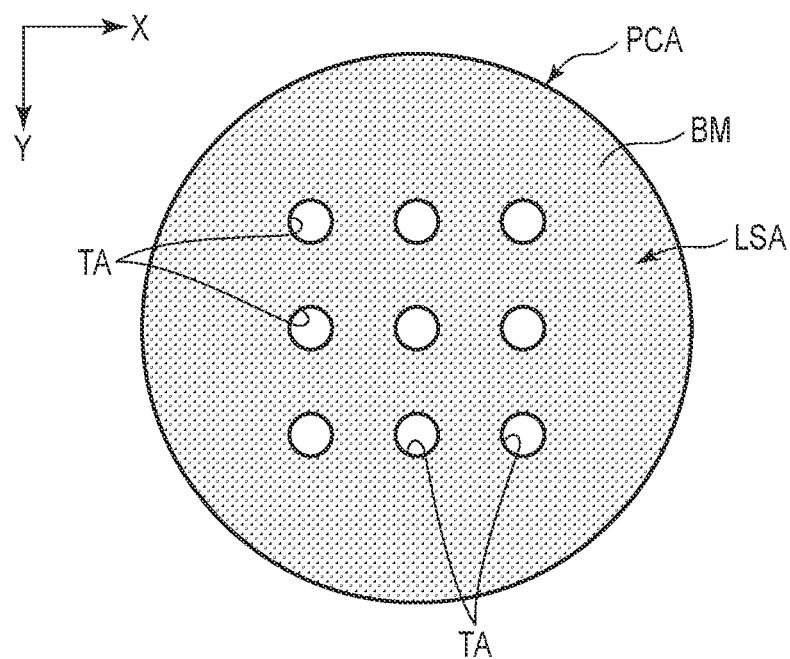
FIG. 49 is a plan view showing a light-shielding layer in an incident light control area of a liquid crystal panel of an electronic device according to a tenth embodiment.

Next is a description of a tenth embodiment. The electronic device 100 is configured in the same manner as that of the first embodiment except for the configuration described in the tenth embodiment. FIG. 49 is a plan view showing a light-shielding layer BM in an incident light control area PCA of a liquid crystal panel PNL of the electronic device 100 according to the tenth embodiment.

As shown in FIG. 49, the incident light control area PCA includes a plurality of circular incident light control areas TA and a light-shielding area LSA surrounding the incident light control areas TA. In the incident light control area PCA, the light-shielding layer BM is provided in the light-shielding area LSA and is not provided in the incident light control areas TA. In the present embodiment, the emitted light control area ICA is an area outside the light-shielding area LSA. The incident light control areas TA are regularly arranged, for example, in a matrix in the directions X and Y.

The first substrate SUB1 includes a plurality of control electrodes located in each of the incident light control areas TA. The liquid crystal panel PNL is configured to selectively transmit visible light from the outside in each of the incident light control areas TA. Each of the incident light control areas TA can function as a pinhole that adjusts the amount of light incident upon the camera 1a. In the incident light control area PCA, the incident light control areas TA can function as compound-eye pinholes.

For example, the control electrodes of the incident light control area PCA may be electrically connected to each other. In this case, the incident light control areas TA can collectively be set in a transmissive state or a non-transmissive state in response to one control signal.

Alternatively, the control electrodes of the incident light control area PCA may be electrically independent of each other. In this case, each of the incident light control areas TA can be individually set in a transmissive state or a non-transmissive state.

Figure 50:
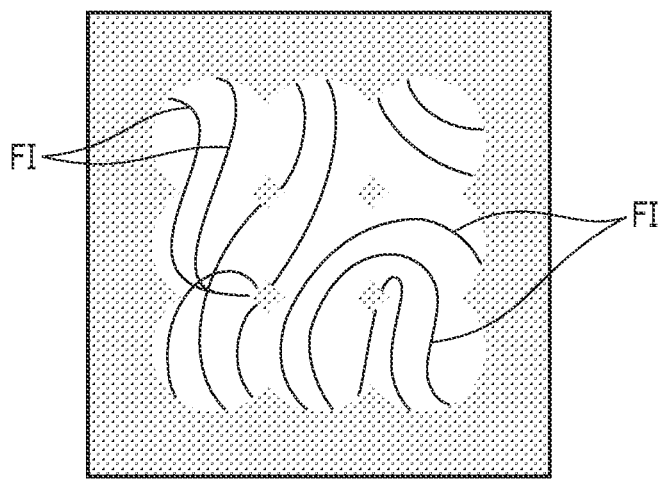
FIG. 50 is a plan view illustratively showing a fingerprint whose image is captured by the electronic device according to the tenth embodiment.

Using the compound-eye pinholes, for example, an image of the fingerprint FI shown in FIG. 50 can be captured. Since the image is not a photo, the incident light control areas TA have only to be arranged so as to capture image data of the fingerprint FI. As shown in FIG. 50, the captured image may have a gap. That is, if the accuracy of individual authentication is maintained, the image may be filled with gaps.

Figure 51:
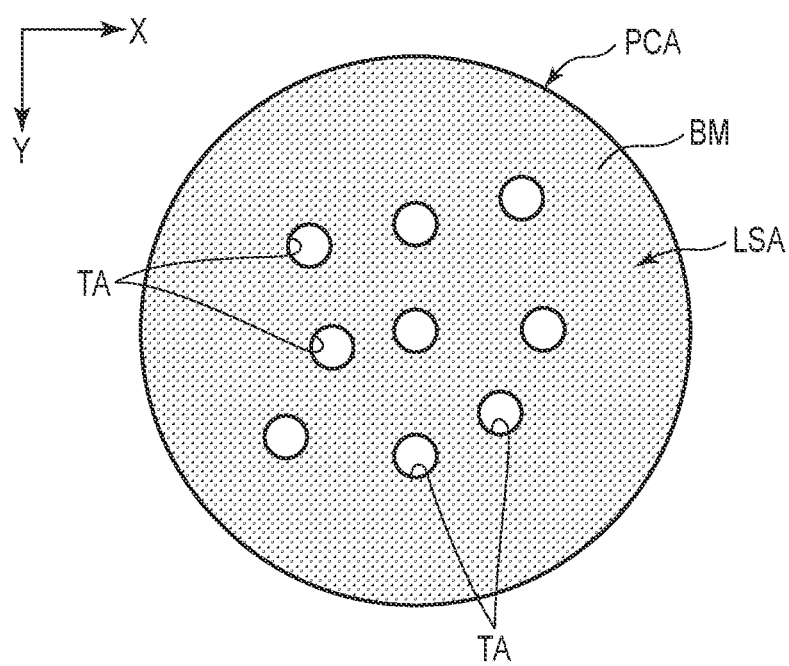
FIG. 51 is a plan view showing a modification to the light-shielding layer in the incident light control area of the liquid crystal panel of the electronic device according to the tenth embodiment.

As shown in FIG. 51, the incident light control areas TA may be arranged irregularly. The incident light control areas TA are not arranged in a matrix in the directions X and Y. The camera 1a can thus capture an image depending on the arrangement of the incident light control areas TA. The electronic device 100 can associate the captured image data with an arrangement pattern of the incident light control areas TA (the number and locations of incident light control areas TA). For example, when the image data is stored in the memory of the electronic device 100, if the arrangement pattern of the incident light control areas TA of the electronic device 100 does not correspond to the image data (they are not associated with each other), authentication can be disabled. Thus, for example, the electronic device 100 can be improved in its security. As described above, a plurality of electronic devices 100 may have individual differences in the arrangement pattern of the incident light control areas TA.

According to the electronic device 100 of the tenth embodiment configured as described above, an image can be captured satisfactorily.

Eleventh Embodiment

Figure 52:
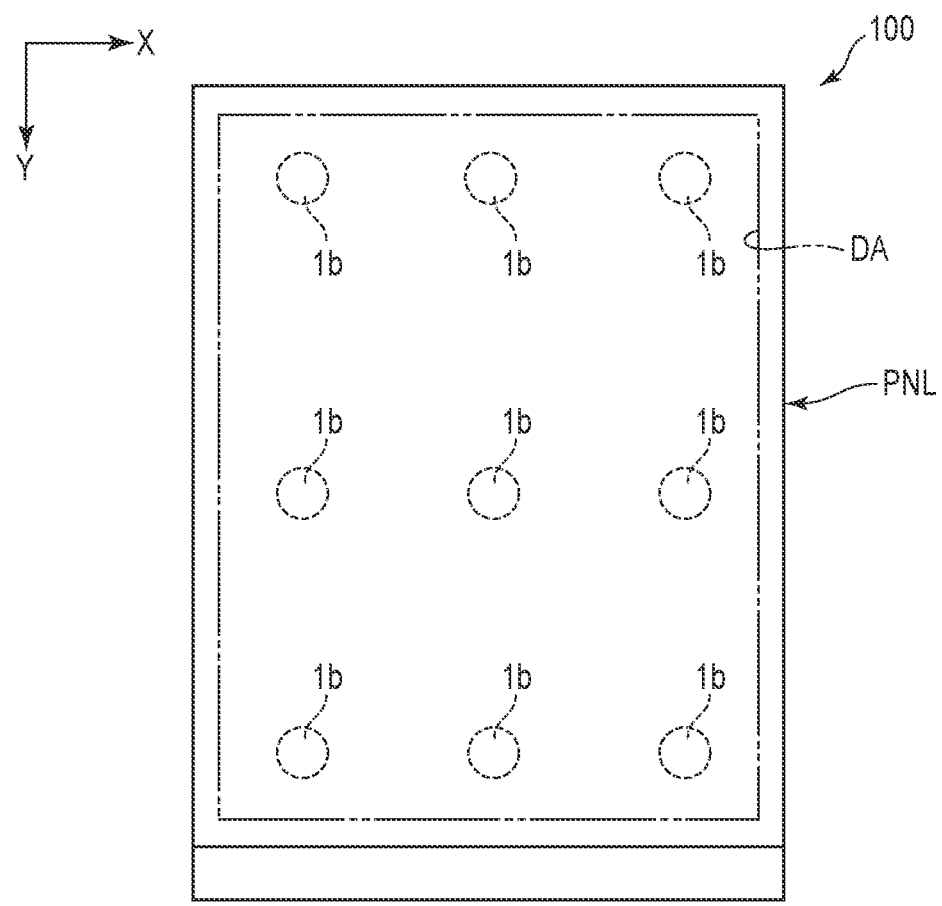
FIG. 52 is a plan view showing the liquid crystal panel, the arrangement of a plurality of cameras, and the like of the electronic device according to an eleventh embodiment.

Next is a description of an eleventh embodiment. The electronic device 100 is configured in the same manner as that of the first embodiment except for the configuration described in the eleventh embodiment. FIG. 52 is a plan view showing a liquid crystal panel PNL, the arrangement of a plurality of cameras 1b and the like of the electronic device 100 according to the eleventh embodiment.

As shown in FIG. 52, the electronic device 100 includes a liquid crystal panel PNL, a plurality of cameras 1b and the like. The liquid crystal panel PNL includes no incident light control areas PCA. The cameras 1b are configured to overlap the display area DA and receive infrared light from outside through the liquid crystal panel PNL. The cameras 1b includes a light source EM2 configured to emit infrared light toward the liquid crystal panel PNL. A subject located on the screen side (first surface S1) can be illuminated with infrared light from the light source EM2.

Since the cameras 1b are hidden in the display area DA of the liquid crystal panel PNL, the user of the electronic device 100 cannot see the cameras 1b. When the user uses the electronic device 100, his or her sense of caution can be lowered. Since an image of a subject is captured by the cameras 1b using infrared light, monitoring security can be improved. In addition, the threshold of the user side for hardware can be lowered as a human interface.

Figure 53:
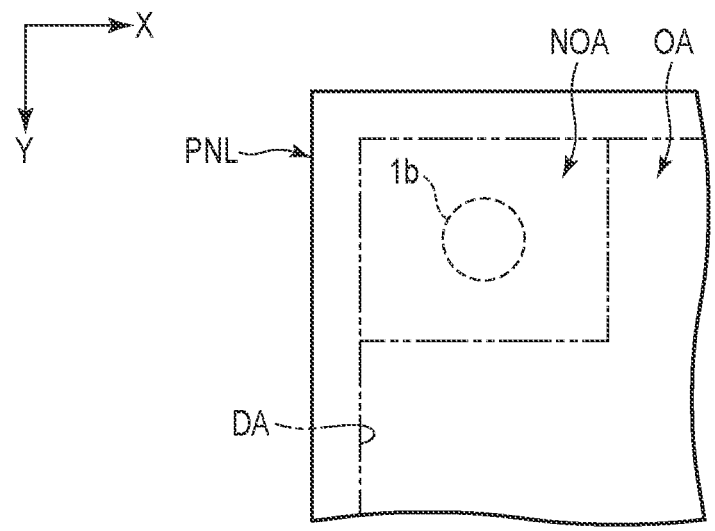
FIG. 53 is a plan view showing part of the liquid crystal panel and a camera according to the eleventh embodiment.

As shown in FIG. 53, the display area DA of the liquid crystal panel PNL includes a target area OA and one or more non-target areas NOA other than the target area. A plurality of pixels PX are located in the target area OA and non-target area NOA. The pixels PX include pixels of a plurality of colors. The pixels PX are arranged uniformly in the display area DA. The arrangement of the pixels PX in the target area OA and that of the pixels PX in the non-target area NOA are the same. For example, the shape of the pixel electrode PE located in the target area OA is the same as that of the pixel electrode PE located in the non-target area NOA.

The cameras 1b overlap the non-target area NOA. The liquid crystal panel PNL may be configured to display an image in the target area OA and to display an image of a color other than white in the non-target area NOA. Thus, the cameras 1b can be arranged in accordance with the design of the screen, and the cameras 1b can be made more invisible to the user.

The liquid crystal panel PNL may be configured to always display black in the non-target area NOA.

For example, in a liquid crystal panel of a VA mode and a lateral electric field mode, a so-called normally black mode panel is used in which black is displayed with no voltage applied. In this liquid crystal panel, the pixel electrodes PE or the electrodes of the control electrode structure RE is not formed in the non-target area NOA, which makes it possible to configured to always display black. Since the non-target area NOA transmits infrared light, the cameras 1b can receive the infrared light for infrared imaging. When the non-target area NOA is always displayed in black, there is no adverse effect on the visibility of images even though a through-hole is formed in a bottom plate BP, a light guide LG1 and a reflection sheet RS.

Thus, the cameras 1b can be made more invisible to the user. The electronic device 100 can collect IR-related information (face authentication, vein authentication, etc.) in parallel with a screen operation with little awareness of the user. In this case, the electronic device 100 can simultaneously collect a plurality of types of authentication data.

In addition, imaging requiring a diaphragm effect can be performed by not providing the pixel electrode PE in the non-target area NOA but providing the electrodes of the control electrode structure RE and arranging the camera 1b behind the non-target area NOA of the liquid crystal panel PNL.

According to the electronic device 100 of the eleventh embodiment configured as described above, an image can be captured satisfactorily. In the case where the imaging by the electronic device 100 is only IR imaging as in the eleventh embodiment, the display panel is not limited to the liquid crystal panel PNL, but may be a display panel other than the liquid crystal panel PNL, such as an organic EL display panel.

As shown in FIG. 9, the control electrode RL extending linearly can be referred to as a linear electrode, and the feed line CL having an annular shape can be referred to as an annular wiring line.

The insulating layer described above can be referred to as an insulating film.

The incident light control area described above can be referred to as an incident light restriction area.

The non-display area NDA described above can be referred to as a peripheral area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is possible to combine two or more the embodiments with each other if needed.

What is claimed is:

1. An electronic device comprising:
  a liquid crystal panel including a display area, an incident light control area including an outer periphery that is in contact with the display area, and an emitted light control area; and
  a camera including a light-entering surface overlapping the incident light control area and a light source overlapping the emitted light control area,
  wherein
  the liquid crystal panel is configured to selectively transmit visible light from the light source in the emitted light control area and to selectively transmit visible light emitted from outside in order to cause visible light to enter the camera from the outside in the incident light control area,
  the incident light control area includes:
    a first annular light-shielding area;
    a first annular incident light control area including an outer periphery that is in contact with the first annular light-shielding area;
    a second annular light-shielding area located inside the first annular incident light control area; and
    a circular incident light control area including an outer periphery that is in contact with the second annular light-shielding area; and
  the emitted light control area is an area overlapping the first annular incident light control area or an area adjacent to the incident light control area.

2. The electronic device of claim 1, wherein the incident light control area further includes:
  a third annular light-shielding area including an outer periphery that is in contact with the first annular incident light control area; and
  a second annular incident light control area including an outer periphery that is in contact with the third annular light-shielding area and an inner periphery that is in contact with the second annular light-shielding area.

3. The electronic device of claim 1 wherein the light source includes a first light source that emits infrared light and a second light source that emits visible light.

4. The electronic device of claim 3, wherein the liquid crystal panel is configured to transmit visible light from the outside in the incident light control area during a first detection period in which visible light is detected without emitting infrared light from the first light source, and to cause infrared light to enter the camera during a second detection period which differs from the first detection period and in which infrared light emitted from the first light source is detected.

5. The electronic device of claim 4, wherein the liquid crystal panel is configured to:
  allow visible light to be emitted from the emitted light control area to the outside during the first detection period; and
  stop visible light from being emitted from the emitted light control area to the outside and during the second detection period, and prevent visible light from being transmitted from the outside in the incident light control area.

6. The electronic device of claim 1, wherein:
  the liquid crystal panel further includes a first surface on which an image is displayed and a second surface opposed to the first surface; and the light source is located on the second surface side of the liquid crystal panel.

7. An electronic device comprising:
a liquid crystal panel including a first substrate, a second substrate, a liquid crystal layer held between the first substrate and the second substrate, a display area, an incident light control area including an outer periphery that is in contact with the display area, and an emitted light control area; and
a camera including an light-entering surface overlapping the incident light control area and a light source overlapping the emitted light control area,
wherein
the display area, the incident light control area, and the emitted light control area each overlaps the first substrate, the second substrate and the liquid crystal layer,
the liquid crystal panel is configured to selectively transmit visible light emitted from the light source in the emitted light control area and to selectively transmit visible light from outside in order to cause visible light to enter the camera from the outside in the incident light control area, and
the first substrate includes:
an annular wiring line located in the incident light control area; and
a control electrode located in the incident light control area and electrically connected to the annular wiring line.

8. The electronic device of claim 7, wherein:
the first substrate further includes a pixel electrode positioned in the display area; and
the control electrode has a shape that is different from a shape of the pixel electrode.

9. The electronic device of claim 7, wherein
the emitted light control area is adjacent to the incident light control area,
the first substrate further includes an adjustment electrode located in the emitted light control area, and
the adjustment electrode has a shape that is different from the shape of the control electrode.

10. The electronic device of claim 7, wherein
the annular wiring line includes a first annular wiring line and a second annular wiring line adjacent to an inside of the first annular wiring line,
the control electrode includes a first control electrode electrically connected to the first annular wiring line and a second control electrode electrically connected to the second annular wiring line, and
the first control electrode intersects the second annular wiring line.

11. The electronic device of claim 7, wherein:
the incident light control area includes:
a first annular light-shielding area;
a first annular incident light control area including an outer periphery that is in contact with the first annular light-shielding area;
a second annular light-shielding area located inside the first annular incident light control area; and
a circular incident light control area including an outer periphery that is in contact with the second annular light-shielding area;
the emitted light control area is an area overlapping the first annular incident light control area or an area adjacent to the incident light control area;
the annular wiring line includes:
a first annular wiring line located in the first annular light-shielding area; and
a third annular wiring line located in the second annular light-shielding area; and
the control electrode includes:
a first control electrode located in the first annular incident light control area and electrically connected to the first annular wiring line; and
a third control electrode located in the circular incident light control area and electrically connected to the third annular wiring line.

12. The electronic device according to claim 7, further comprising an illumination device including a light guide which overlaps the display area and which does not overlap the incident light control area or the emitted light control area,
wherein:
the liquid crystal panel includes colored layers of a plurality of colors; and
the colored layers are provided in the display area and not provided in the incident light control area or the emitted light control area.

13. The electronic device according to claim 7, wherein
the liquid crystal panel further includes a first surface on which an image is displayed and a second surface opposed to the first surface, and
the light source is located on the second surface side of the liquid crystal panel.

* * * * *